United States Patent
Nishino et al.

(10) Patent No.: US 7,502,014 B2
(45) Date of Patent: Mar. 10, 2009

(54) POINTING DEVICE

(75) Inventors: Takeshi Nishino, Tokyo (JP); Shuji Nakamura, Tokyo (JP); Koichi Kiryu, Iiyama (JP); Kazuo Kobayashi, Iiyama (JP)

(73) Assignee: Fujitsu Component Limited, Tokyo (JP)

( * ) Notice: Subject to any disclaimer, the term of this patent is extended or adjusted under 35 U.S.C. 154(b) by 548 days.

(21) Appl. No.: 10/988,573

(22) Filed: Nov. 16, 2004

(65) Prior Publication Data

US 2005/0088411 A1    Apr. 28, 2005

Related U.S. Application Data

(63) Continuation of application No. 10/050,973, filed on Jan. 22, 2002, now Pat. No. 6,831,629.

(30) Foreign Application Priority Data

Jan. 19, 2001  (JP) ............................... 2001-12082
Oct. 16, 2001  (JP) ............................... 2001-318509

(51) Int. Cl.
    G09G 5/08  (2006.01)
(52) U.S. Cl. ......................................... 345/157; 463/38
(58) Field of Classification Search ................. 345/156, 345/157, 160, 161, 163; 74/471; 463/37, 463/38
    See application file for complete search history.

(56) References Cited

U.S. PATENT DOCUMENTS 3,932,722 A    1/1976    Obata et al.

(Continued)

FOREIGN PATENT DOCUMENTS

JP    2-115921    4/1990

(Continued)

OTHER PUBLICATIONS

U.S. Appl. No. 10/986,983, filed Nov. 15, 2004, Takeshi Nishino.

(Continued)

*Primary Examiner*—Richard Hjerpe
*Assistant Examiner*—Tom V Sheng
(74) *Attorney, Agent, or Firm*—Staas & Halsey LLP

(57) ABSTRACT

A pointing device including a base section, an operating section shiftably supported on the base section, a magnet carried on one of the base section and the operating section, and a magneto-electro transducer carried on the other of the base section and the operating section at a location close to the magnet. The operating section includes a first part securely holding one of the magnet and the magneto-electro transducer and supported on the base section shiftably in a desired horizontal direction relative to the base section, and a second part connected to the first part and elastically biasing the first part toward a home position in a horizontal shifting range during a period when the first part is horizontally shifted along the base section. The second part of the operating section is provided integrally with a major portion substantially surrounding an entire circumference of the first part, a first connecting portion connected to the first part at one end of the major portion and a second connecting portion connected to the base section at another end of the major portion; the major portion exerting an even elastic biasing force irrespective of a shifting direction of the first part on the base section.

2 Claims, 60 Drawing Sheets

U.S. PATENT DOCUMENTS

| | | | |
|---|---|---|---|
| 4,366,463 | A | 12/1982 | Barker |
| 4,492,830 | A | 1/1985 | Kim |
| 4,533,899 | A | 8/1985 | Isaksson |
| 4,748,441 | A | 5/1988 | Brzezinski |
| 4,825,157 | A | 4/1989 | Mikan |
| 4,885,490 | A | 12/1989 | Takahara et al. |
| 5,349,263 | A | 9/1994 | Katayama et al. |
| 5,380,222 | A | 1/1995 | Kobayashi |
| 5,432,530 | A | 7/1995 | Arita et al. |
| 5,504,502 | A | 4/1996 | Arita et al. |
| 5,539,978 | A | 7/1996 | Vanbesien |
| 5,714,980 | A | 2/1998 | Niino |
| 5,831,596 | A | 11/1998 | Marshall et al. |
| 5,881,866 | A * | 3/1999 | Miyajima et al. ............ 200/513 |
| 5,959,557 | A | 9/1999 | Lim |
| 6,109,130 | A | 8/2000 | Will |
| 6,144,368 | A * | 11/2000 | Ooka et al. ................. 345/161 |
| 6,201,196 | B1 | 3/2001 | Wergen |
| 6,217,183 | B1 | 4/2001 | Shipman |
| 6,266,046 | B1 | 7/2001 | Arita |
| 6,285,356 | B1 | 9/2001 | Armstrong |
| 6,320,284 | B1 | 11/2001 | Fontana et al. |
| 6,320,569 | B1 | 11/2001 | Kinman |
| 6,326,948 | B1 | 12/2001 | Kobachi et al. |
| 6,356,256 | B1 | 3/2002 | Leftwich |
| 6,373,265 | B1 | 4/2002 | Morimoto et al. |
| 6,515,650 | B2 | 2/2003 | Arita et al. |
| 6,664,666 | B2 | 12/2003 | Corcoran |
| 6,707,446 | B2 | 3/2004 | Nakamura et al. |
| 6,738,043 | B2 | 5/2004 | Endo |
| 6,760,006 | B2 | 7/2004 | Arita et al. |
| 6,818,845 | B2 | 11/2004 | Portmann |
| 6,831,629 | B2 | 12/2004 | Nishino |
| 6,859,198 | B2 | 2/2005 | Onodera et al. |
| 6,906,700 | B1 | 6/2005 | Armstrong |
| 6,909,205 | B2 | 6/2005 | Corcoran et al. |
| 6,952,197 | B1 | 10/2005 | Nakamura et al. |
| 6,956,559 | B2 | 10/2005 | Hagiwara et al. |
| 7,047,826 | B2 | 5/2006 | Peshkin |
| 2002/0097224 | A1 | 7/2002 | Nishino et al. |
| 2005/0068134 | A1 | 3/2005 | Nishino et al. |
| 2005/0088411 | A1 | 4/2005 | Nishino et al. |
| 2005/0093822 | A1 | 5/2005 | Nishino et al. |
| 2005/0099391 | A1 | 5/2005 | Nishino et al. |

FOREIGN PATENT DOCUMENTS

| | | |
|---|---|---|
| JP | 4-125723 | 4/1992 |
| JP | 04-277816 | 10/1992 |
| JP | 04-307616 | 10/1992 |
| JP | 05-204539 | 8/1993 |
| JP | 7-84717 | 3/1995 |
| JP | 7-25420 | 5/1995 |
| JP | 7-117875 | 12/1995 |
| JP | 7-117876 | 12/1995 |
| JP | 08-152961 | 6/1996 |
| JP | 8-185257 | 7/1996 |
| JP | 08-272538 | 10/1996 |
| JP | 9-265347 | 10/1997 |
| JP | 10-049292 | 2/1998 |
| JP | 10-055250 | 2/1998 |
| JP | 10-207616 | 8/1998 |
| JP | 11-353109 | 12/1999 |
| JP | 2000-29622 | 1/2000 |
| JP | 2000-315138 | 11/2000 |

OTHER PUBLICATIONS

U.S. Appl. No. 10/986,858, filed Nov. 15, 2004, Takeshi Nishino.
U.S. Appl. No. 10/986,888, filed Nov. 15, 2004, Takeshi Nishino.
U.S. Appl. No. 10/986,859, filed Nov. 15, 2004, Takeshi Nishino.
Japanese Office Action issued for Patent Application No. 2003-435481; Mailing Date May 9, 2006 (5 pgs).
Japanese Office Action issued for Patent Application No. 2003-435237; Mailing Date May 9, 2006 (4 pgs).
Japanese Office Action issued for Patent Application No. 2003-435457; Mailing Date May 9, 2006 (4 pgs).
Japanese Office Action issued for Patent Application No. 2003-435282; Mailing Date May 9, 2006 (4 pgs).
Japanese Office Action issued for Patent Application No. 2001-318509; Mailing Date May 9, 2006 (4 pgs).
Japanese Office Action for Patent Application No. 2001-318509 mailed Jan. 9, 2007.

* cited by examiner

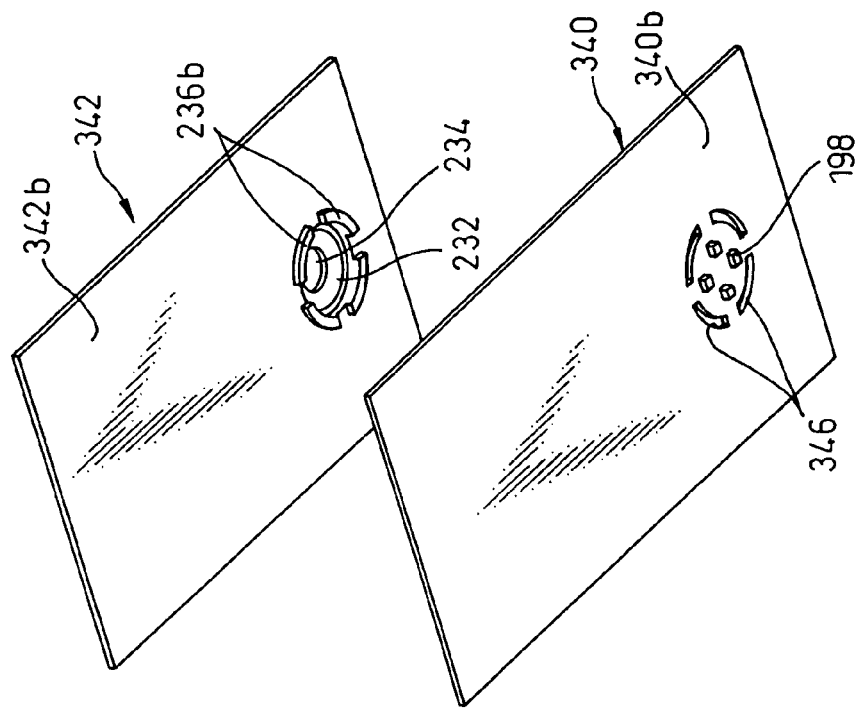
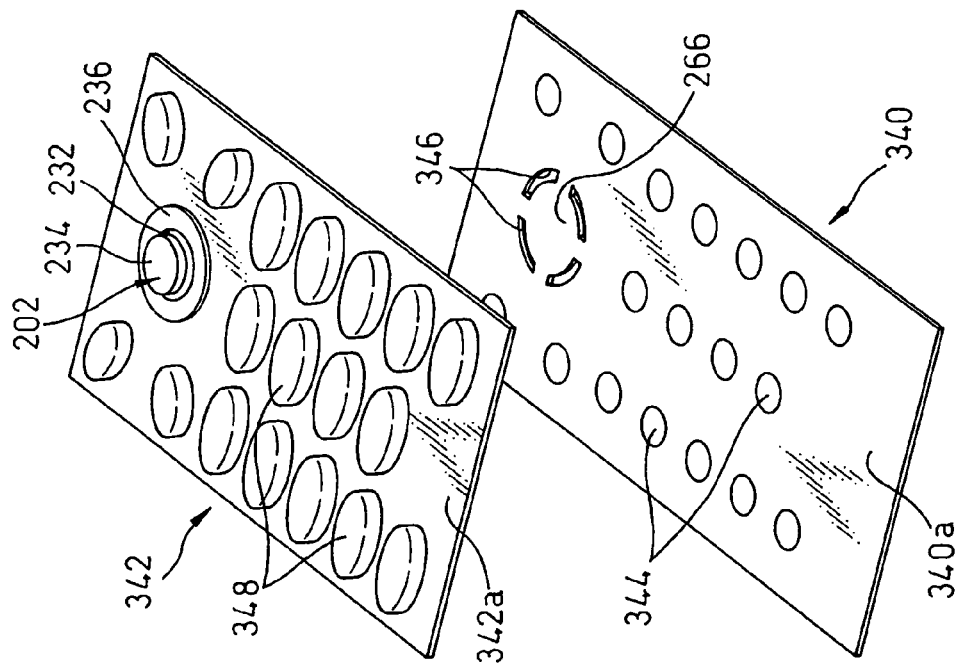

POINTING DEVICE

This application is a continuation application of U.S. Ser. No. 10/050,973 filed on Jan. 22, 2002 now U.S. Pat. No. 6,831,629.

BACKGROUND OF THE INVENTION

1. Field of the Invention

The present invention relates, generally, to an input device for electronic equipment and, more particularly, to a pointing device capable of being installed in data processors. The present invention also relates to a portable information apparatus incorporating therein a pointing device. The present invention further relates to a method of manufacturing an assembly of a circuit board and a connector, which may be provided in electronic equipment such as a pointing device.

2. Description of the Related Art

It is well known that, in digital data processors with displays and keyboards, such as personal computers, word processors, personal digital assistants (PDAs), etc., a pointing device as an auxiliary input device for enabling an operator to manually enter analogue-type information so as to direct two-dimensional coordinate data, such as cursor shifting data, on a display screen is incorporated. Particularly, a small-sized portable data processor generally incorporates the pointing device integrally in the casing of the processor.

The pointing device including a base section, an operating section shiftably supported on the base section, a magneto-electro transducer carried on the base section, and a magnet carried on the operating section to be arranged close to the magneto-electro transducer has been known in the art. In this pointing device, an operator manipulates the operating section to shift it in a desired convexly-curved direction on the base section, so as to change the positional correlation between the magnet and the magneto-electro transducer and thereby to vary the output voltage of the magneto-electro transducer. It is possible, through this operation, to enter analogue information corresponding to the shifting direction and shifting distance of the operating section.

Also, the pointing device including, in addition to the above-described components, a switch mechanism arranged between the base section and the operating section, wherein an operator manipulates the operating section to push it toward the base section so as to actuate the switch mechanism, has been known in the art (see, e.g., Japanese Examined Patent Publication (Kokoku) No. 7-117875 (JP-B-7-117875)). In this pointing device, the operator manipulates the operating section to push it down, so that it is possible to make the switch mechanism output a click signal in connection with, e.g., a pointer on a display screen of an apparatus to which the pointing device is installed, in addition to the analogue information entering operation.

It is generally understood that the pointing device with the magneto-electro transducer is particularly advantageously installed in various portable information apparatuses for hand-held operation, such as electronic notebooks, personal digital assistants (PDAs), mobile phones, etc., because of a relatively short displacement of the operating section required for a coordinate data entering operation and of a relatively low power consumption. However, in the above-described conventional pointing device with the magneto-electro transducer, the operating section is arranged to be shifted in a curved direction over the base section, so that it is necessary to provide a certain curved surface with desired curvature and area in a mutual engagement portion between the base section and the operating section. As a result, it has been difficult to reduce an outside dimension of the pointing device to such a degree as to permit the pointing device to be installed into a portable information apparatus.

For example, in a folding-type portable information apparatus in which a display is connected, through a hinge, with a keyboard, it is desirable to substantially eliminate the protrusions of switches or the like, provided in the keyboard, from the upper surface of the keyboard, in order to reduce a thickness of the apparatus in a folded condition and to improve the portability. Therefore, in the case where the pointing device with the magneto-electro transducer is installed into the keyboard of such a portable information apparatus, it is required to reduce the dimensions of the pointing device, especially in a height direction, as much as possible.

Also, in the case where the pointing device is installed into a portable information apparatus, it is required to stably and effectively connect the pointing device with a main circuit board (or a mounting board) of the information apparatus in both an electrical and a mechanical way, in a relatively narrow interior space of a casing of the apparatus. Furthermore, in the case where the pointing device with the magneto-electro transducer is installed into a portable information apparatus, various miniaturized components of the pointing device may make the handling thereof troublesome, and thereby the operability of the entire assembling process of the information apparatus may be deteriorated.

Moreover, in the pointing device with the magneto-electro transducer and having a click function, when the operating section is pushed to actuate the switch mechanism, the positional correlation between the magnet and the magneto-electro transducers is inevitably changed. In this operation, the output voltages of the magneto-electro transducers may vary, and thus the signal of analogue data, such as cursor shifting data, may be output from the pointing device, just before a click operation is effected, in a certain shifting direction of the magnet relative to the magneto-electro transducers. Therefore, in order to perform an accurate click operation, it is necessary to push down the operating section accurately in a vertical direction in relation to the base section, which in turn requires the provision of an additional guide mechanism or otherwise the skillfulness of the operator.

SUMMARY OF THE INVENTION

It is therefore an object of the present invention to provide a pointing device with a magneto-electro transducer, capable of reducing an outside dimension of the pointing device to such a degree as to permit the pointing device to be installed into a portable information apparatus, without deteriorating the operability of an operating section.

It is another object of the present invention to provide a pointing device with a magneto-electro transducer, capable of being stably and effectively connected with an external circuit board, in both an electrical and a mechanical way, even in a narrow space.

It is a further object of the present invention to provide a method of manufacturing an assembly of a circuit board and a connector, capable of stably and effectively connecting an electronic unit, such as a pointing device, with a mounting board even in a narrow space.

It is a yet further object of the present invention to provide a portable information apparatus having a pointing device with a magneto-electro transducer, which has a configuration for improving an operability of an assembling process.

It is a yet further object of the present invention to provide a pointing device with a magneto-electro transducer and having a click function, capable of easily performing a proper and accurate click operation without requiring an additional guiding mechanism or operator's skillfulness.

In accordance with the present invention, there is provided a pointing device, comprising a base section; an operating section shiftably supported on the base section; a magnet carried on one of the base section and the operating section; and a magneto-electro transducer carried on the other of the base section and the operating section at a location close to the magnet; wherein the operating section includes a first part securely holding one of the magnet and the magneto-electro transducer and supported on the base section shiftably in a desired horizontal direction relative to the base section, and a second part connected to the first part and elastically biasing the first part toward a home position in a horizontal shifting range during a time when the first part is horizontally shifted along the base section.

In this pointing device, it is preferred that the second part of the operating section is provided integrally with a major portion substantially surrounding an entire circumference of the first part, a first connecting portion connected to the first part at one end of the major portion and a second connecting portion connected to the base section at another end of the major portion; the major portion exerting an even elastic biasing force irrespective of a shifting direction of the first part on the base section.

In this arrangement, the base section may include a cover member covering the second connecting portion of the second part; the cover member being provided with a center opening for permitting the major and first connecting portions of the second part to be inserted through the opening in a horizontally shiftable manner.

It is also preferred that the base section may include a circuit board electrically connected to the magneto-electro transducer and a support member joined to the circuit board; the support member being provided at a position projecting from a surface of the circuit board with a generally flat support surface for supporting the first part slidably in the horizontal direction.

In this arrangement, the support member may include a wall projecting to a position higher than the support surface in relation to the surface of the circuit board and extending in such a direction as to surround the support surface; the second part being abutted at a desired portion thereof onto the wall to be attached to the support member.

Alternatively, the support member may include a groove recessed to a position lower than the support surface in relation to the surface of the circuit board and extending in such a direction as to surround the support surface; the second part being inserted at a desired portion thereof into the groove to be attached to the support member.

Alternatively, the support member may include a support portion provided at a position spaced from the circuit board, the support portion defining the support surface.

In this case, the pointing device may further comprise a switch mechanism mounted onto the circuit board within a space defined between the circuit board and the support portion of the support member; the switch mechanism being actuated by pressing the first part against the support portion.

In this arrangement, the support member may include a plurality of elastic beams cooperating with each other to form the support portion; the elastic beams being elastically bent by pressing the first part against the support portion so that at least one of the elastic beams actuates the switch mechanism.

Also, the pointing device may further comprise a separate elastic member interposed between the circuit board and the support member; the separate elastic member being elastically bent by pressing the first part against the support portion so that the support portion actuates the switch mechanism.

One of the magnet and the magneto-electro transducer may be mounted onto the circuit board within a space defined between the circuit board and the support portion of the support member.

Alternatively, one of the magnet and the magneto-electro transducer may be mounted onto the circuit board on a back side opposite to a side on which the support member is placed.

It is also preferred that the base section includes a circuit board electrically connected to the magneto-electro transducer; the circuit board being provided in a surface thereof with a generally flat support surface for supporting the first part slidably in the horizontal direction.

In this arrangement, one of the magnet and the magneto-electro transducer may be mounted onto the circuit board on a side opposite to the support surface.

Also, a desired portion of the second part may be directly attached to the circuit board.

The first and second parts may be formed separately from and assembled to each other.

Alternatively, the first and second parts may be formed integrally with each other from mutually different materials.

Alternatively, the first and second parts may be formed integrally with each other from mutually identical materials.

The second part may include a portion covering the first part and an operating surface formed on the portion for a shifting operation of the operating section.

The pointing device may further comprises a key top fitted to the first part independently from the second part, wherein an operating surface is formed on the key top for a shifting operation of the operating section.

Also, the pointing device may further comprise an auxiliary part arranged between the base section and the operating section for elastically biasing the first part toward the home position in cooperation with the second part.

Also, the pointing device may further comprise a switch mechanism arranged between the base section and the operating section, wherein the operating section includes an actuating part disposed independently of the first part on the base section and shiftable in a vertical direction generally orthogonal to the horizontal direction; the switch mechanism being actuated by pressing the actuating part against the switch mechanism.

In this arrangement, the actuating part may be separated from the second part and carried on the switch mechanism.

Alternatively, the actuating part may be joined integrally with the second part.

The base section may include a guide mechanism for guiding the actuating part in the vertical direction directly above the switch mechanism.

The actuating part may include a key top separate from the second part and a press-operating surface formed on the key top for a pressing operation of the operating section in the vertical direction.

The base section may include a circuit board carrying the switch mechanism thereon; one of the magnet and the magneto-electro transducer being mounted onto the circuit board on a back side opposite to a side on which the switch mechanism is carried.

It is also preferred that the base section includes a circuit board electrically connected to the magneto-electro transducer and a connector for connecting the circuit board to another mounting board, and wherein the connector includes an insulating member and a plurality of terminals carried in an array on the insulating member; the terminals being individually secured to a plurality of through holes formed in a region adjacent to an outer periphery of the circuit board.

In this arrangement, the circuit board may be provided on a surface thereof with a land adjacent to an opening edge of each of the through holes; a portion of the land, disposed between the opening edge and the outer periphery of the circuit board, having a width dimension smaller than that of a remaining portion of the land.

The present invention also provides a pointing device, comprising a base section; an operating section supported on the base section and shiftable in a desired direction relative to the base section; a magnet carried on one of the base section and the operating section; and a magneto-electro transducer carried on the other of the base section and the operating section at a location close to the magnet; wherein the base section includes a circuit board connected to the magneto-electro transducer and a connector for connecting the circuit board to another mounting board; and wherein the connector includes an insulating member and a plurality of terminals carried in an array on the insulating member; the terminals being individually secured to a plurality of through holes formed in a region adjacent to an outer periphery of the circuit board.

In this pointing device, it is advantageous that the circuit board is provided on a surface thereof with a land adjacent to an opening edge of each of the through holes; a portion of the land, disposed between the opening edge and the outer periphery of the circuit board, having a width dimension smaller than that of a remaining portion of the land.

The present invention also provides a portable information apparatus, comprising a pointing device as set forth in claim 1; and a component provided integrally with at least desired portions of the base section and the operating section of the pointing device.

The present invention also provides a pointing device, comprising a base section; an operating section arranged shiftably in a desired direction relative to the base section; a signal generating part for detecting a relative displacement between the base section and the operating section to generate an analogue signal; a switch mechanism capable of being actuated by a relative motion between the base section and the operating section in a direction different from the relative displacement to generate a signal; and a processing part for processing signals generated from the signal generating part and the switch mechanism as input data; wherein the processing part suspends processing of the analogue signal generated from the signal generating part during a time when the switch mechanism is actuated.

In this pointing device, it is advantageous that the processing part suspends processing the analogue signal generated from the signal generating part during a predetermined time after the switch mechanism is shifted from an actuated condition to a non-actuated condition.

The present invention also provides a method of manufacturing an assembly of a circuit board and a connector, the connector being attached to an outer periphery of the circuit board, comprising providing a circuit board including a mounting region on which electrical parts are capable of being mounted and a disposal region adjacent to the mounting region; providing a connector including an insulating member and a plurality of terminals carried in an array on the insulating member; forming a plurality of through holes with lands in the mounting region of the circuit board, each of the lands extending continuously from the mounting region to the disposal region; individually inserting the terminals of the connector into the through holes with lands in the circuit board, and soldering the terminals to the lands; and separating the disposal region from the mounting region along a boundary between the disposal and mounting regions, while leaving the connector attached to the mounting region of the circuit board.

The present invention also provides a pointing device, comprising an assembly of a circuit board and a connector, manufactured by a method as set forth above.

BRIEF DESCRIPTION OF THE DRAWINGS

The above and other objects, features and advantages of the present invention will become more apparent from the following description of preferred embodiments in connection with the accompanying drawings in which:

FIG. 45A is a top-side exploded perspective view of main components in a portable information apparatus according to an embodiment of the present invention;

FIG. 45B is a bottom-side exploded perspective view of the main components of FIG. 45A;

DESCRIPTION OF THE PREFERRED EMBODIMENT

Figure 1:
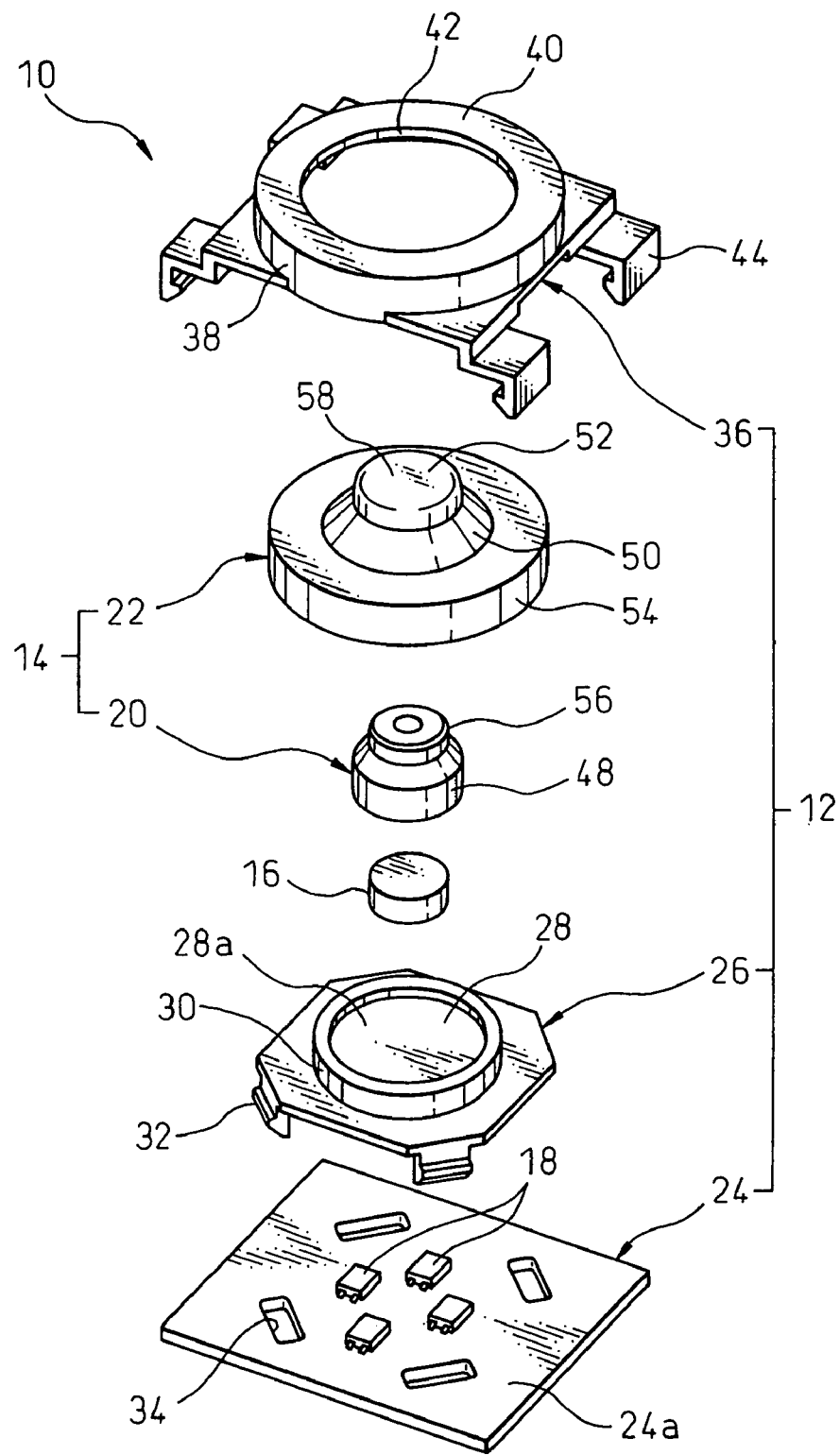
FIG. 1 is an exploded perspective view of a pointing device according to a first embodiment of the present invention.
Figure 2:
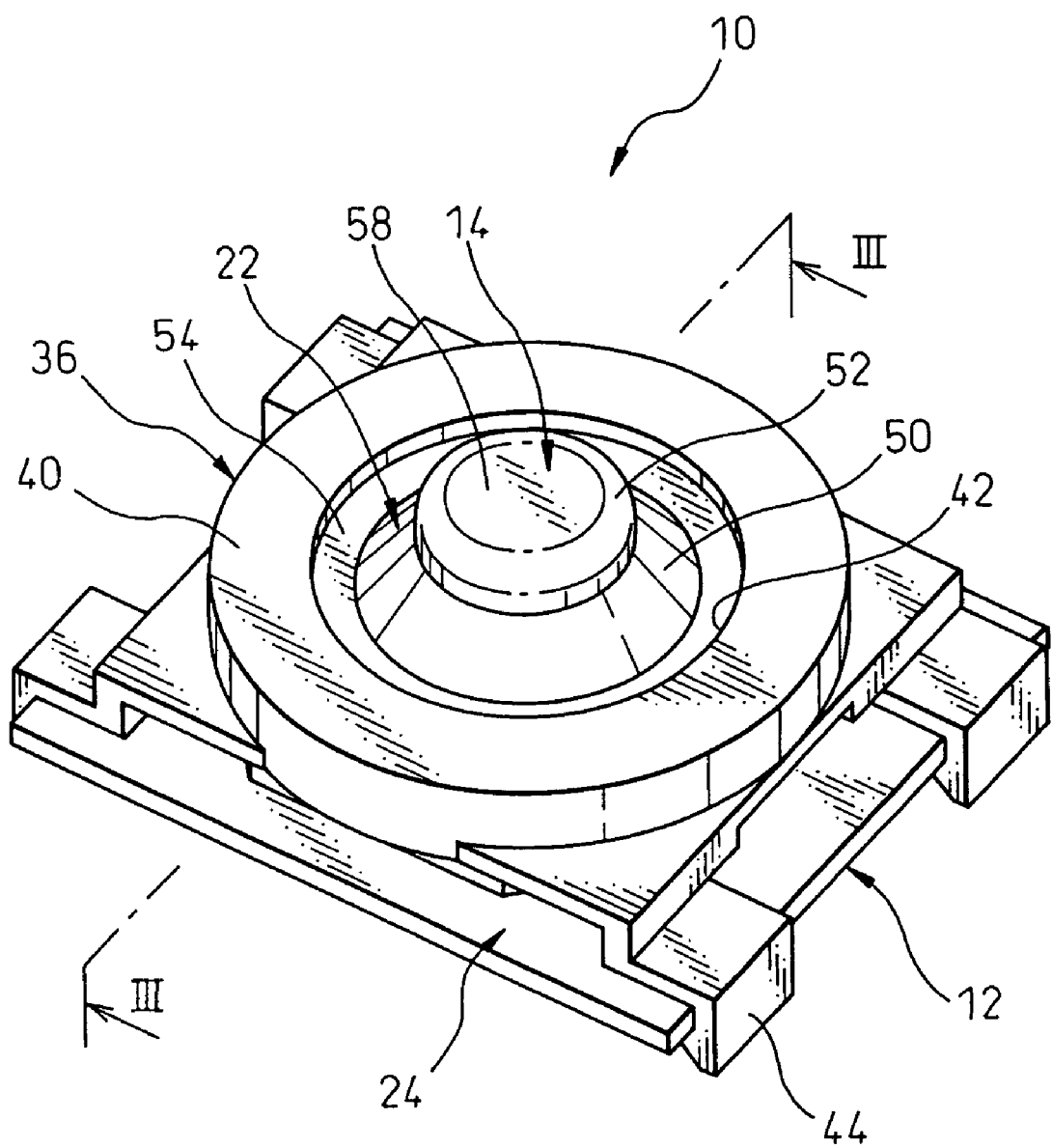
FIG. 2 is an assembled perspective view of the pointing device of FIG. 1.
Figure 3:
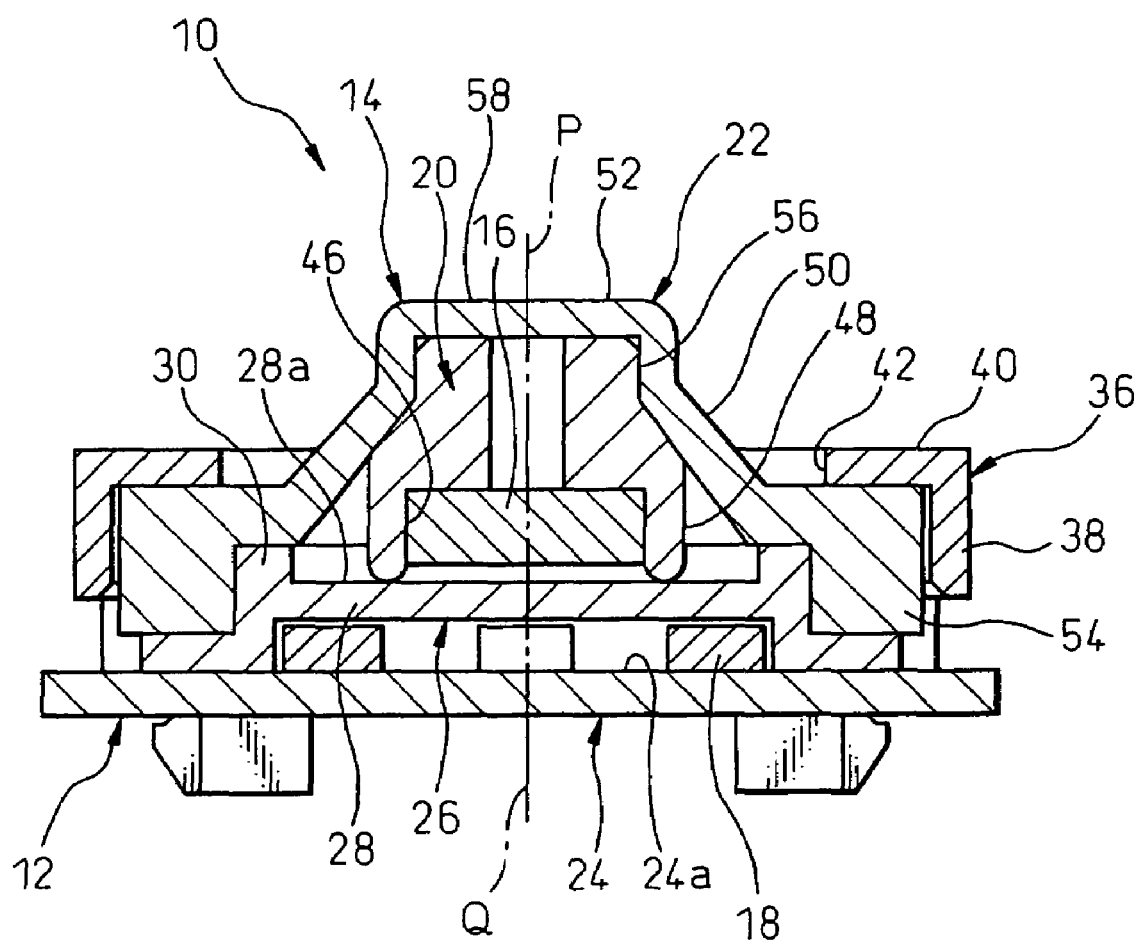
FIG. 3 is a vertical sectional view of the pointing device, taken along a line III-III in FIG. 2, showing an operating section at a home position.

Referring now to the drawings, in which the same or similar components are denoted by common reference numerals, FIG. 1 shows a pointing device 10, according to the first embodiment of the present invention, in an exploded perspective view, FIG. 2 shows the pointing device 10 in an assembled perspective view, and FIG. 3 shows the pointing device 10 in a vertical sectional view in the assembled state. The pointing device 10 is capable of being used in various data processors, such as personal computers, word processors, etc., as well as various portable information apparatuses, such as electronic notebooks, personal digital assistants (PDAs), mobile phones, etc., as an auxiliary input device for directing two-dimensional coordinate data on a display screen, and capable of being integrally incorporated in a casing of such a data processor or a portable information apparatus.

The pointing device 10 includes a base section 12, an operating section 14 supported on the base section 12 and shiftable in a desired horizontal direction in relation to the base section 12, a disk-shaped magnet (such as a permanent magnet) 16 arranged in or carried on the operating section 14, and a plurality of magneto-electro transducers (such as Hall-effect elements) 18 arranged in or carried on the base section 12 at locations close to the magnet 16. The operating section 14 includes a first or holding part 20 securely holding the magnet 16, supported on the base section 12 and shiftable in a desired horizontal direction relative to the base section 12, and a second or elastic part 22 connected to the holding part 20 and elastically biasing the holding part 20 toward a home position in a horizontal shifting range during a time when the holding part 20 is horizontally shifted along the base section 12.

The base section 12 includes a circuit board 24, on which electronic components including a CPU (not shown) are mounted, and a support member 26 fixedly joined to the circuit board 24. The circuit board 24 has a generally flat major surface 24a. The support member 26 includes a support portion 28 located at a position spaced from the surface 24a of the circuit board 24, for supporting the holding part 20 of the operating section 14 slidably in the desired horizontal direction. In the illustrated embodiment, the "horizontal direction" means a direction substantially parallel to the surface 24a of the circuit board 24, and thus the support portion 28 of the support member 26 is provided on an upper side thereof, facing away from the circuit board 24, with a flat circular support surface 28a extending substantially parallel to the surface 24a of the circuit board 24. The support surface 28a serves to support the holding part 20 slidably in the desired horizontal direction at a position projecting from the surface 24a of the circuit board 24.

The support member 26 further includes a cylindrical wall 30 extending in such a direction as to surround the support surface 28a, the wall 30 defining a horizontal shifting range of the holding part 20 of the operating section 14. The wall 30 is formed integrally with the support portion 28 to project to a position higher than the support surface 28a in relation to the surface 24a of the circuit board 24. The elastic part 22 is fitted to the support member 26 with a peripheral portion of the elastic part 22 surrounding the cylindrical wall 30, as described later. A center axis of the cylindrical wall 30, passing through a geometrical center of the support surface 28a, constitutes a center axis P of the pointing device 10 and defines a home position in the horizontal shifting range of the holding part 20 along the support surface 28a. The support member 26 is further provided integrally at an outer periphery thereof with a plurality (four, in the drawing) of elastic hooks 32 extending opposite to the wall 30. The support member 26 is securely assembled with the circuit board 24 at a predetermined position thereon, with the elastic hooks 32 being respectively fitted in a snap-fit manner into a plurality of apertures 34 formed in the circuit board 24 at locations corresponding to the hooks 32.

Four magneto-electro transducers 18 are mounted on the surface 24a of the circuit board 24 at regular intervals in a circumferential direction about the center axis P, within a space defined between the circuit board 24 and the support portion 28 of the support member 26. This configuration of the magneto-electro transducers 18 is provided for allowing the pointing device 10 to output an analog data signal in a two-dimensional coordinate system.

The base section 12 further includes a cover member 36 fixedly joined to the circuit board 24 so as to substantially cover or hide an outer peripheral region of the support member 26. The cover member 36 is provided integrally with a cylindrical outer circumferential wall 38 and an annular end wall 40 extending radially inward from one axial end of the outer circumferential wall 38. The end wall 40 defines by an inner edge thereof a center opening 42, through which a major operating portion of the operating section 14, as described later, is inserted in a horizontally shiftable manner. The cover member 36 is further provided integrally at an outer periphery thereof with a plurality (four, in the drawing) of elastic hooks 44 extending from the other axial end of the circumferential wall 38 opposite to the end wall 40. The cover member 36 is securely assembled with the circuit board 24 at a predetermined position thereon, with the elastic hooks 44 being respectively fitted in a snap-fit manner on a pair of opposite outer edges of the rectangular plate-shaped circuit board 24. The cover member 36 serves to retain the operating section 14 so as to prevent the latter from being removed from the base section 12, in a condition where the major operating portion of the operating section 14 projects outward through the center opening 42.

In the illustrated embodiment, the holding part 20 and the elastic part 22 of the operating section 14 are produced independently from each other as separate members, and are securely assembled together. The holding part 20 is a stepped cylindrical member, and has rigidity for substantially eliminating a deformation thereof during a time when the operating section 14 is operated to shift in the horizontal direction on the base section 12. The holding part 20 is provided in a larger diameter portion, at one axial end of a stepped cylindrical profile thereof, with a recess 46 for accommodating the magnet 16, defined by a cylindrical circumferential wall 48.

The magnet 16 may be fixed in the recess 46 of the holding part 20 by adhering or press-fitting the magnet 16. The holding part 20 is capable of shifting, in a parallel-translation manner, on the support surface 28a of the support member 26 of the base section 12 so as to be two-dimensionally slidable over 360 degrees about the center axis P, with a distal or lower end of the circumferential wall 48 being uniformly abutted to the support surface 28a. This configuration can advantageously reduce friction in an interface between the holding part 20 and the support surface 28a, and thereby improves the horizontal shifting operability of the operating section 14.

The elastic part 22 is a basin-shaped member, and has elasticity for permitting a relatively easy elastic deformation thereof during a time when the operating section 14 is operated to shift in the horizontal direction on the base section 12. The elastic part 22 is provided integrally with a major portion 50 extending around the holding part 20 with a gap defined therebetween, a first connecting portion 52 connected to the holding part 20 at one end of the major portion 50 and a second connecting portion 54 connected to the base section 12 at another end of the major portion 50. The major portion 50 of the elastic part 22 has a truncated conical or dome-shaped profile for substantially surrounding an entire circumference of the holding part 20 and is disposed coaxially with the holding part 20 during a non-load condition of the elastic part 22. Accordingly, the elastic part 22 is elastically deformed in the major portion 50 due to the horizontal shifting motion of the holding part 20 on the base section 12, and thereby exerts, in the major portion 50, an even elastic biasing force irrespective of the horizontal shifting direction of the holding part 20.

The first connecting portion 52 of the elastic part 22 extends integrally and projects axially convexly from a smaller diameter end of the major portion 50 having a truncated conical profile, so as to form a recess inside the first connecting portion 52, into which a smaller diameter portion 56 of the holding part 20 at another axial end of the stepped cylindrical profile thereof is securely fitted. The first connecting portion 52 of the elastic part 22 may be fixed through an adhesive to the smaller diameter portion 56 of the holding part 20. The first connecting portion 52 extends to cover the smaller diameter portion 56 of the holding part 20 in close contact with the portion 56, and an operating surface 58, on which an operator touches with, e.g., his finger for the shifting operation of the operating section 14, is formed on the outer surface of the first connecting portion 52.

The second connecting portion 54 of the elastic part 22 extends integrally and projects axially and radially from a larger diameter end of the major portion 50 having a truncated conical profile, so as to form a thickened peripheral flange capable of being securely held and anchored between an outside region of the cylindrical wall 30 of the support member 26 and the circumferential and end walls 38, 40 of the cover member 36, the members 26, 36 constituting the base section 12. The first and second connecting portions 52, 54 serve to fixedly connect the elastic part 22 to the holding part 20 and the base section 12, respectively, without being substantially deformed during the horizontal shifting motion of the holding part 20 on the base section 12.

The elastic part 22 may be made from various elastic materials, such as a synthetic rubber or a natural rubber. In consideration of a reflow soldering performed in a mounting process of the pointing device 10 onto a main circuit board of electronic equipment, it is advantageous that the elastic part 22 is made from a material having a certain heat resistance, such as a silicone rubber, for preventing a quality deterioration thereof in a high temperature environment. On the other hand, the holding part 20 may be made of plastics, metals, and so forth.

When the above-described components are properly assembled with each other, the operating section 14 is arranged in such a configuration that the major portion 50 and the first connecting portion 52 of the elastic part 22 are inserted through the center opening 42 of the cover member 36 of the base section 12 in a horizontally shiftable manner, and that the smaller diameter portion 56 of the holding part 20 and the first connecting portion 52 covering the portion 56 are located to project outward from the end wall 40 of the cover member 36 of the base section 12. In this condition, an operator can manipulate the operating surface 58 provided in the first connecting portion 52 of the elastic part 22 with, e.g., his finger, so as to horizontally shift the holding part 20 on the base section 12.

Figure 4:
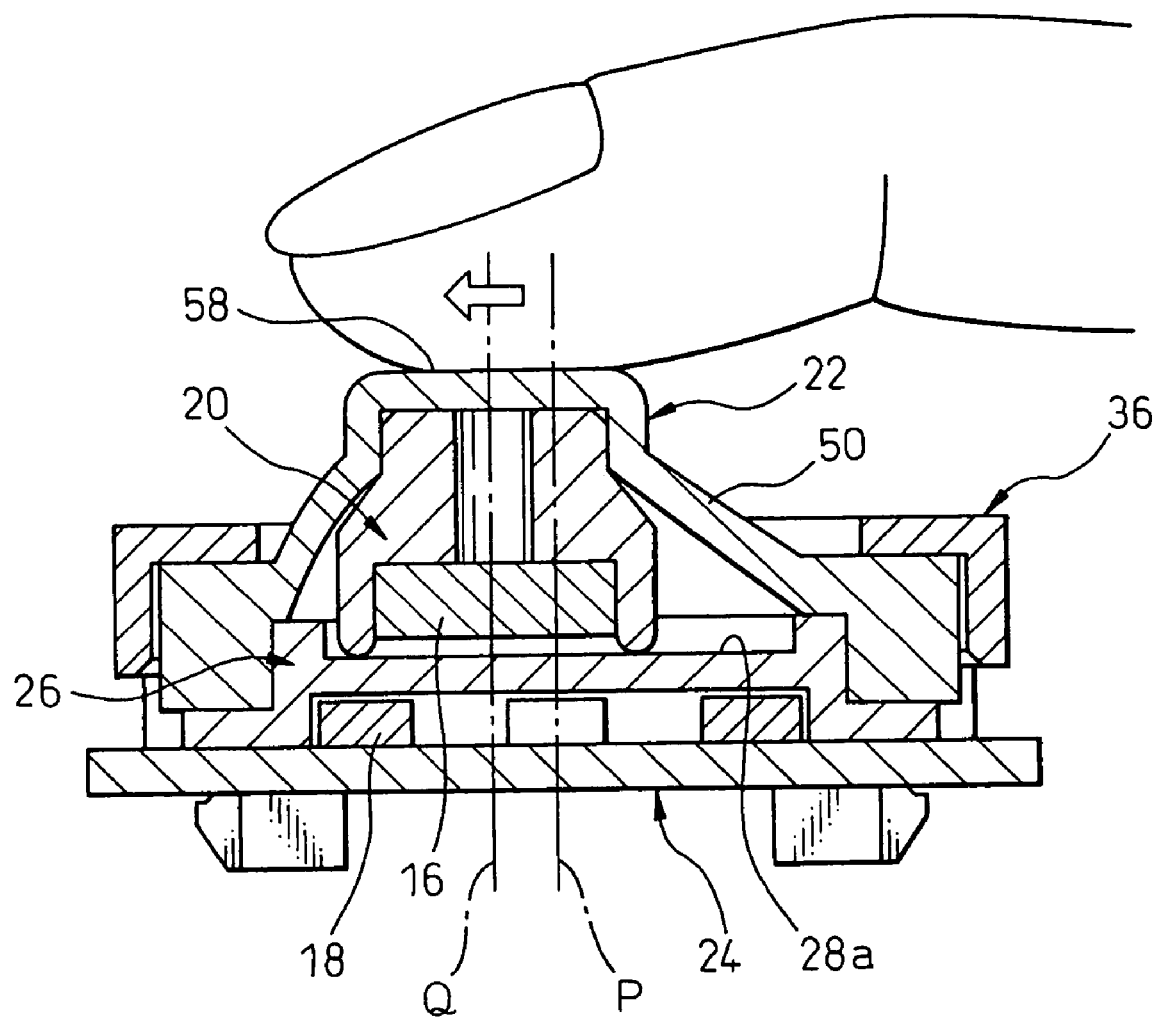
FIG. 4 is a vertical sectional view corresponding to FIG. 3, showing the operating section being shifted in a horizontal direction.

As shown in FIG. 3, during a time when the elastic part 22 of the operating section 14 is a non-loaded or balanced condition, a center axis Q of the holding part 20 and the magnet 16 held in the recess 46 coincides with the center axis P of the pointing device 10. In this state, the holding part 20 is located at a home position in the horizontal shifting range on the support member 26 of the base section 12, and four magneto-electro transducers 18 mounted on the circuit board 24 are positioned equidistantly from the magnet 16. From this state, as shown in FIG. 4, when the operator touches the operating surface 58 with his finger and shifts in a parallel translation manner the holding part 20 in a desired horizontal direction, the major portion 50 of the elastic part 22 is elastically deformed in correspondence with the shifting direction and shifting amount or distance of the holding part 20 in a circumferentially uneven mode. As a result, the elastic part 22 exerts a resultant elastic force in the major portion 50 in its entirety, so as to bias the holding part 20 in a direction opposite to the shifting direction. The operator thus manipulates the operating section 14 to horizontally shift it against a spring biasing force generated by the major portion 50 of the elastic part 22.

When the operating section 14 is horizontally shifted from the home position as shown in FIG. 3 to the position shown in FIG. 4, the positional correlation between the magnet 16 and the respective magneto-electro transducers 18 is changed, and thereby the output voltages from the respective magneto-electro transducers 18 are varied. The variation in the output voltages from the respective magneto-electro transducers 18 is processed as analog information in the CPU (not shown) on the circuit board 24, and is converted to digital coordinate data. The digital coordinate data as converted are then output via a connector section (not shown) provided in the circuit board 24 to a data processing circuit in electronic equipment (not shown) into which the pointing device 10 is installed. In this manner, it is possible to shift, e.g., a cursor or pointer on the display screen of the electronic equipment in a desired direction by a desired distance, in correspondence to the shifting direction and amount of the holding part 20 of the operating section 14.

From a data input position as shown in FIG. 4, when the operator takes his finger away from the operating section 14 to release an operating force, the holding part 20 together with the magnet 16 immediately starts to shift toward the home position, due to the spring biasing force generated in the major portion 50 of the elastic part 22, and thus returns to the home position at an instant when the major portion 50 of the elastic part 22 recovers the balanced form thereof. In this respect, the pointing device 10 may be constituted in such a manner that, during a return motion of the holding part 20 toward the home position, the rapid variation in the output voltages from the respective magneto-electro transducers 18, which may be generated due to the quick motion of the magnet 16, is cancelled in a processing flow in the CPU, so as not to convert it to digital coordinate data.

As described above, the pointing device 10 has a configuration wherein the holding part 20 of the operating section 14 is shifted on the flat support surface 28*a* provided in the support member 26 of the base section 12, so that it is possible to effectively reduce the dimension of the base section 12 in comparison with a conventional structure employing a curved support surface. Also, the operating section 14 is provided inherently with the elastic part 22 for elastically returning the holding part 20 to the home position in the horizontal shifting range, so that it is possible to readily and correctly return the holding part 20 to the home position, and thus to significantly improve the operability of the operating section 14. Moreover, the elastic part 22 is constructed to exert an even elastic biasing force irrespective of a horizontal shifting direction of the holding part 20 in the major portion 50 integrally formed to surround substantially an entire circumference of the holding part 20, so that it is possible to effectively reduce the dimension of the pointing device 10, especially in a height direction, without deteriorating the operability and response of the operating section 14, in comparison with a conventional structure employing a separate return spring interposed between base and operating sections. The first connecting portion 52 of the elastic part 22, covering the smaller diameter portion 56 of the holding part 20, provides the operating surface 58 at a position projecting outward from the cover member 36 of the base section 12, which causes a further advantage that the operator can readily recognize the location of the operating section 14 on the base section 12 by the tactile sense. Accordingly, the pointing device 10 is capable of reducing the outside dimension thereof to such a degree as to permit the pointing device 10 to be installed into various portable information apparatuses for hand-held operation, such as electronic notebooks, personal digital assistants (PDAs), mobile phones, etc., without deteriorating the operability of the operating section 14.

Figure 5:
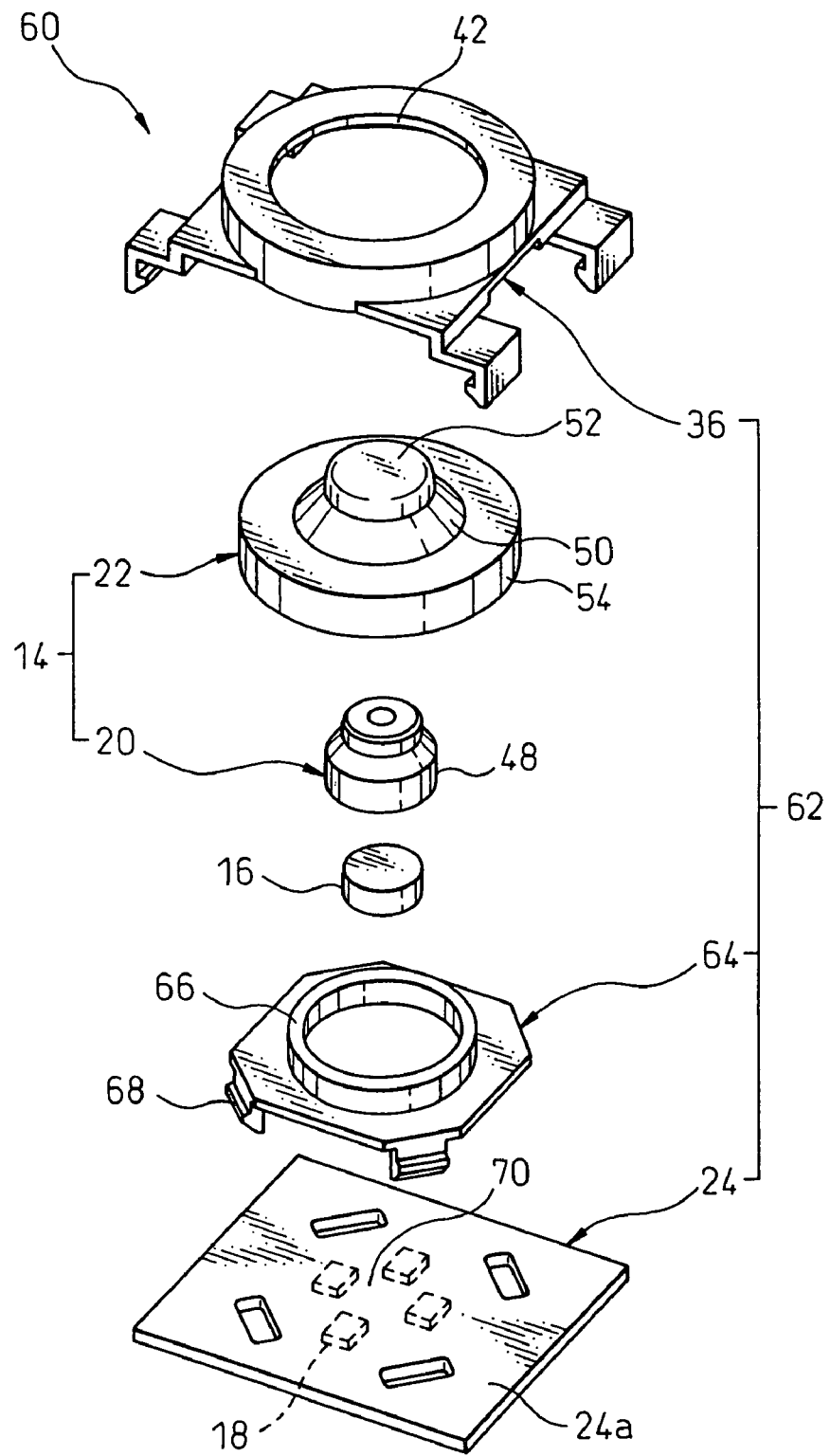
FIG. 5 is an exploded perspective view of a pointing device according to a second embodiment of the present invention.
Figure 6:
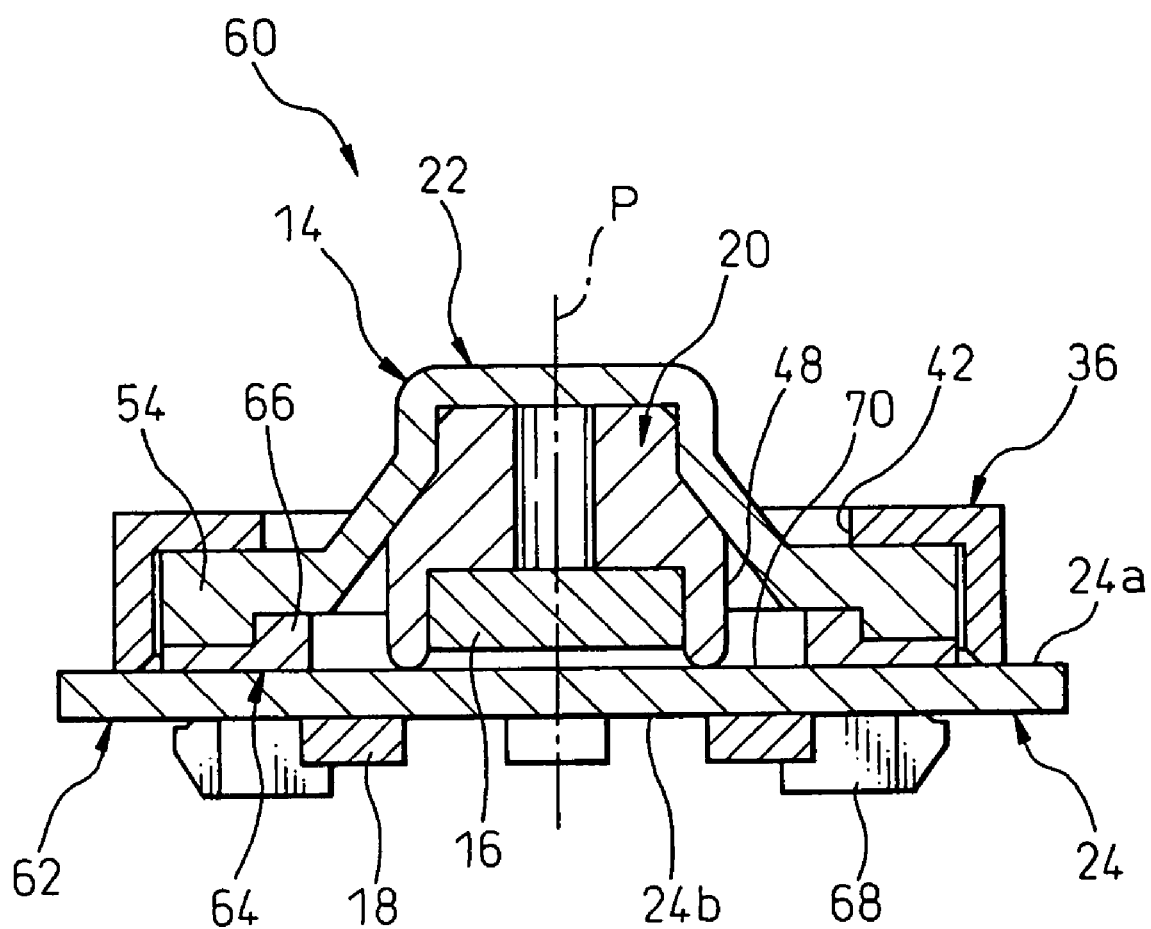
FIG. 6 is a vertical sectional view of the pointing device of FIG. 5, showing an operating section at a home position.

FIGS. 5 and 6 illustrate a pointing device 60, according to the second embodiment of the present invention, in an exploded perspective view and an assembled sectional view, respectively. The pointing device 60 has substantially the same structure as the pointing device 10 of the first embodiment, except for the constitution of a support member joined to a circuit board of a base section, and thus corresponding components are denoted by the common reference numerals and the explanation thereof is not repeated.

The pointing device 60 includes a base section 62, an operating section 14 supported on the base section 62 and shiftable in a desired horizontal direction in relation to the base section 62, a magnet 16 arranged in or carried on the operating section 14, and a plurality of magneto-electro transducers 18 arranged in or carried on the base section 62 at locations close to the magnet 16. The base section 62 includes a circuit board 24, on which electronic components including a CPU (not shown) are mounted, a support member 64 fixedly joined to the circuit board 24, and a cover member 36 fixedly joined to the circuit board 24 so as to substantially cover or hide the support member 64.

The support member 64 includes a hollow cylindrical wall 66 defining a circular center bore. The support member 64 is further provided integrally at an outer periphery thereof with a plurality (four, in the drawing) of elastic hooks 68 extending opposite to the wall 66. The support member 64 is securely assembled with the circuit board 24 at a predetermined position thereon, with the elastic hooks 68 being respectively fitted in a snap-fit manner into apertures formed in the circuit board 24. The circuit board 24 is thus provided in a circular area of the surface 24*a* thereof, encircled by the cylindrical wall 66 of the support member 64, with a flat support surface 70 for supporting the holding part 20, of the operating section 14, slidably in the desired horizontal direction.

The cylindrical wall 66 of the support member 64 defines a horizontal shifting range of the holding part 20 of the operating section 14 within the support surface 70 provided in the surface 24*a* of the circuit board 24. A center axis of the cylindrical wall 66, passing through a geometrical center of the support surface 70, constitutes a center axis P of the pointing device 60 and defines a home position in the horizontal shifting range of the holding part 20 along the support surface 70. The holding part 20 is capable of shifting, in a parallel translation manner, on the support surface 70 in the circuit board 24 so as to be two-dimensionally slidable over 360 degrees about the center axis P, with a distal or lower end of the circumferential wall 48 of the larger diameter portion being uniformly abutted to the support surface 70. Four magneto-electro transducers 18 are mounted on a back side 24*b* of the circuit board 24, opposite to the support surface 70, at regular intervals in a circumferential direction about the center axis P.

The pointing device 60 is capable of entering analogue data by operating the operating section 14 to horizontally shift it on the base section 62, in a way similar to the pointing device 10. In this respect, the elastic part 22 of the operating section 14 is capable of acting to readily and correctly return the holding part 20 to the home position in the horizontal shifting range. Particularly, in the pointing device 60, the holding part 20 of the operating section 14 is placed directly on the surface 24*a* of the circuit board 24 of the base section 12 and the magneto-electro transducers 18 are mounted onto the back side 24*b* of the circuit board 24, so that it is possible to more effectively reduce the dimension of the base section 12, especially in a height direction, in comparison with the pointing device 10.

Figure 7:
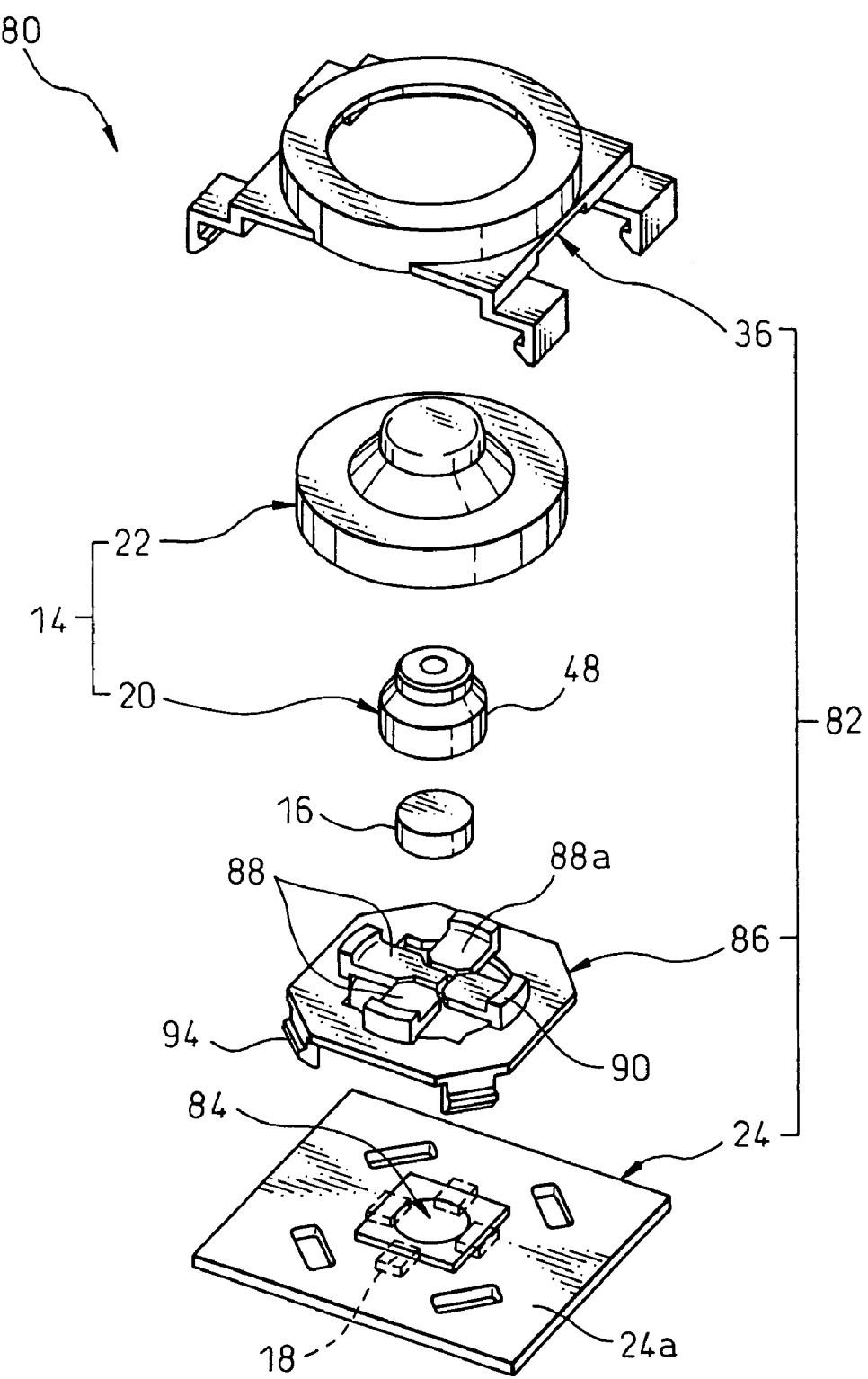
FIG. 7 is an exploded perspective view of a pointing device according to a third embodiment of the present invention.
Figure 8:
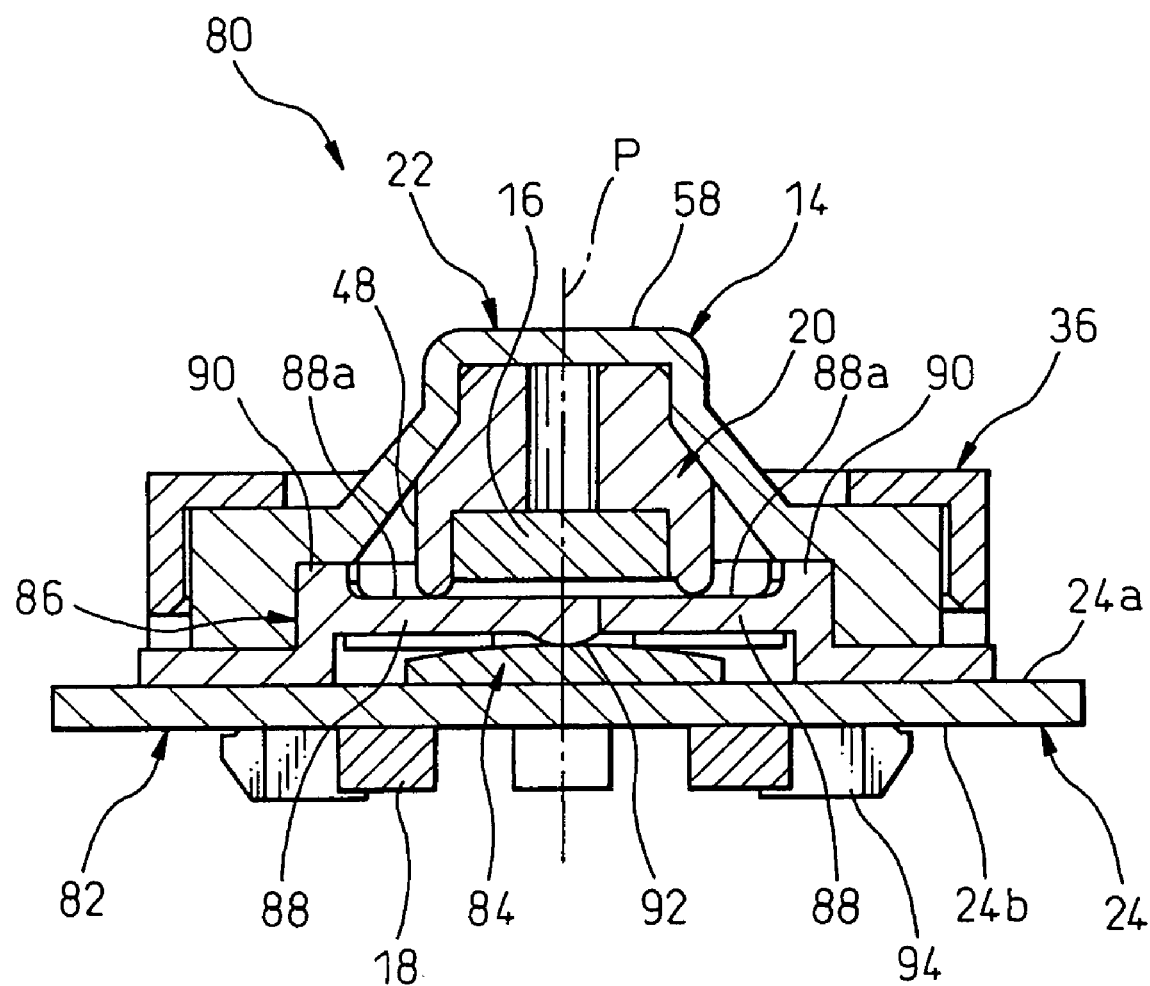
FIG. 8 is a vertical sectional view of the pointing device of FIG. 7, showing an operating section at a home position.

FIGS. 7 and 8 illustrate a pointing device 80, according to the third embodiment of the present invention, in an exploded perspective view and an assembled sectional view, respectively. The pointing device 80 has substantially the same structure as the pointing device 10 of the first embodiment, except for the constitution of a support member joined to a circuit board of a base section as well as the provision of a switch mechanism incorporated for an additional click operation, and thus corresponding components are denoted by the common reference numerals and an explanation thereof is not repeated.

The pointing device 80 includes a base section 82, an operating section 14 supported on the base section 82 and shiftable in a desired horizontal direction in relation to the base section 82, a magnet 16 arranged in or carried on the operating section 14, a plurality of magneto-electro transducers 18 arranged in or carried on the base section 82 at locations close to the magnet 16, and a switch mechanism 84 arranged between the base section 82 and the operating section 14. The base section 82 includes a circuit board 24, on which electronic components including a CPU (not shown) are mounted, a support member 86 fixedly joined to the circuit board 24, and a cover member 36 fixedly joined to the circuit board 24 so as to substantially cover or hide the outer peripheral region of the support member 86.

The support member 86 includes, integrally, a plurality (four, in the drawing) of elastic beams 88 located at a position spaced from the surface 24*a* of the circuit board 24. The elastic beams 88 cooperate with each other to constitute a support portion for supporting the holding part 20 of the operating section 14 slidably in the desired horizontal direction. The elastic beams 88 of the support member 86 are provided respectively on upper sides thereof, facing away from the circuit board 24, with flat support surfaces 88a extendable substantially parallel to the surface 24a of the circuit board 24 during non-loaded condition of the elastic beams 88. The support surfaces 88a serve to support the holding part 20 slidably in the desired horizontal direction at a position projecting from the surface 24a of the circuit board 24.

The elastic beams 88 of the support member 86 extend in a radial direction about the center axis P of the pointing device 80, and are capable of being elastically bent or displaced, independently from each other, with the radial outer ends thereof being fixed. The support member 86 is further provided at the radial outer or proximal ends of the elastic beams 88 with arcuate upright walls 90 respectively extending in such a direction as to surround the support surfaces 88a. The arcuate walls 90 are formed integrally with the beams 88 so as to project to a position higher than the support surfaces 88a in relation to the surface 24a of the circuit board 24, and thereby define a horizontal shifting range of the holding part 20 of the operating section 14. The arcuate walls 90 are located along a common circle about the center axis P, and thus the center axis P defines a home position in the horizontal shifting range of the holding part 20 on the support surfaces 88a. The holding part 20 is capable of shifting, in a parallel translation manner, on the support surfaces 88a of the elastic beams 88 so as to be two-dimensionally slidable over 360 degrees about the center axis P, with the distal or lower end of the circumferential wall 48 of the larger diameter portion being uniformly abutted to the support surfaces 88a.

A desired one of the elastic beams 88 is provided at the radial inner or free end thereof with a bump 92 as a pushing point, locally protruding from a back side opposite to the support surface 88a. The bump 92 is located on the center axis P of the pointing device 80. The support member 86 is further provided integrally at an outer periphery thereof with a plurality (four, in the drawing) of elastic hooks 94, and is securely assembled with the circuit board 24 at a predetermined position thereon by using the elastic hooks 94.

The switch mechanism 84 is mounted onto the surface 24a of the circuit board 24 within a space defined between the circuit board 24 and the elastic beams 88 of the support member 86, for additionally providing a click function. The switch mechanism 84 has a known make/break structure including a movable contact and a stationary contact, the contacts being located substantially on the center axis P of the pointing device 80. The movable contact of the switch mechanism 84 is thus positioned just under the bump or pushing point 92 formed on one elastic beam 88 of the supporting member 86. Then, four magneto-electro transducers 18 are mounted on the back side 24b of the circuit board 24, opposite to the switch mechanism 84, at regular intervals in a circumferential direction about the center axis P.

The switch mechanism 84 having the other various structures may be used, such as a mechanical switch including a spring-biased movable contact, a membrane switch including a pair of flexible circuit boards, and so forth. The switch mechanism 84 also may have a smaller dimension for enabling the magneto-electro transducers 18 being arranged in the space between the circuit board 24 and the elastic beams 88.

Figure 9:
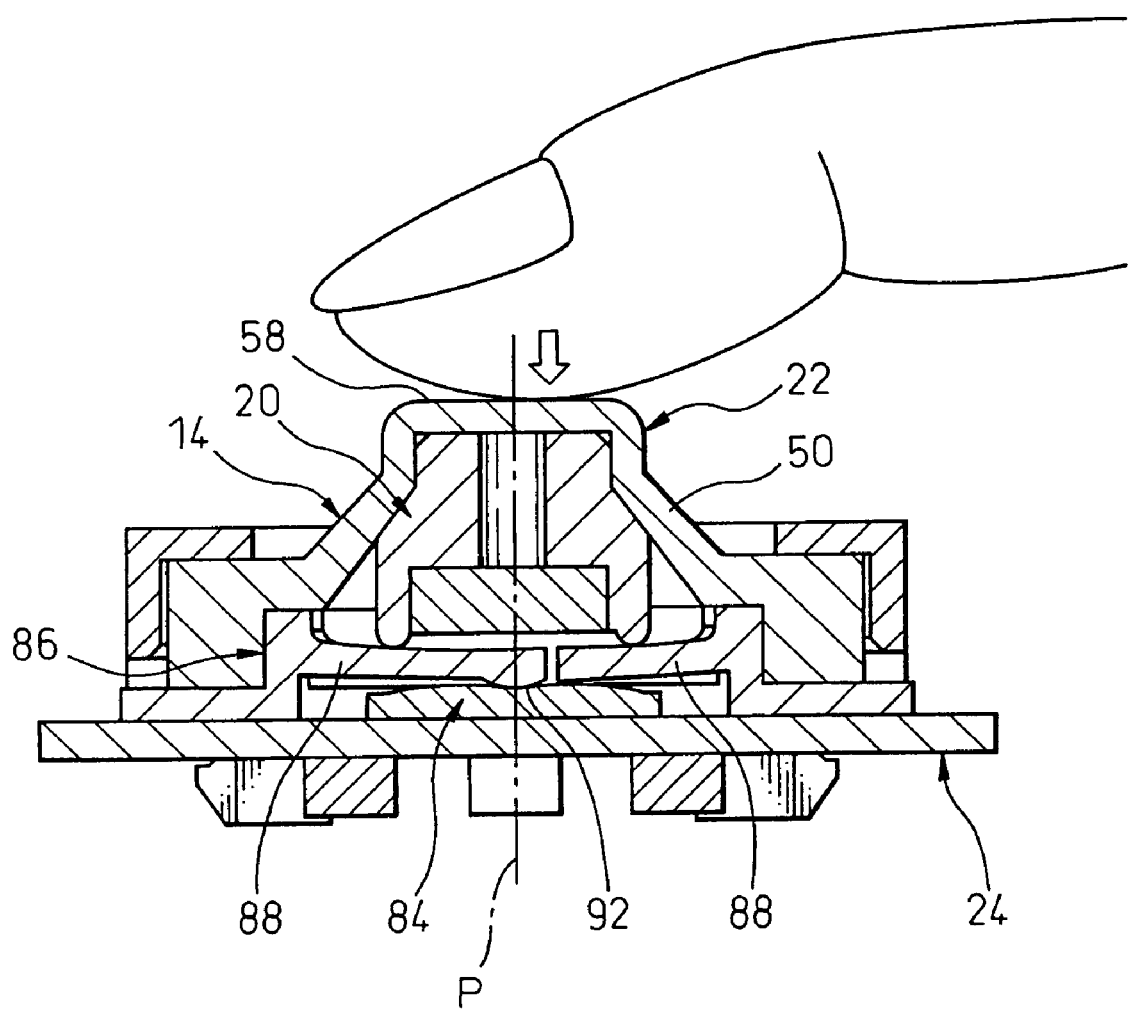
FIG. 9 is a vertical sectional view corresponding to FIG. 8, showing the operating section being shifted in a vertical direction.

The pointing device 80 is capable of entering analogue data by operating the operating section 14 to horizontally shift it on the base section 82, in a way similar to the pointing device 10. In this respect, the elastic part 22 of the operating section 14 is capable of acting to readily and correctly return the holding part 20 to the home position in the horizontal shifting range. Additionally, in the pointing device 80, it is possible for the operator to push the operating surface 58 of the operating section 14 downward with, e.g., his finger in the home position as shown in FIG. 8, and to force the bottom end of the circumferential wall 48 of the holding part 20 against the elastic beams 88, so as to make or close the switch mechanism 84 located beneath the elastic beams 88. In the illustrated embodiment, as shown in FIG. 9, when the operating section 14 is pressed downward, the respective elastic beams 88 are elastically bent about the radial outer or proximal fixed ends thereof, and thereby the bump 92 formed on one elastic beam 88 pushes the underlying switch mechanism 84 to actuate the latter.

When the switch mechanism 84 is actuated to make or close, the CPU on the circuit board 24 processes a click signal thus generated from the switch mechanism 84 and outputs the same to the data processing circuit in electronic equipment into which the pointing device 80 is installed. In this manner, it is possible to perform, e.g., a click operation for a pointer on a display screen in electronic equipment, by pressing the operating section 14 downward at the home position. When the operator releases a pressing force in the pushed-down position as shown in FIG. 9, the elastic beams 88 elastically recover the initial flat profiles, so that the switch mechanism 84 is broken or opened and the operating section 14 returns to the home position of FIG. 8. In this regard, to prevent the operator from unintentionally actuating the switch mechanism 84 during the horizontal shifting operation of the operating section 14 by an operating force applied to the operating section 14, it is preferred to properly select the materials of the support member 86 and/or the dimension of the elastic beams 88, so as to suitably adjust the elastic biasing force of the elastic beams 88.

Figure 10:
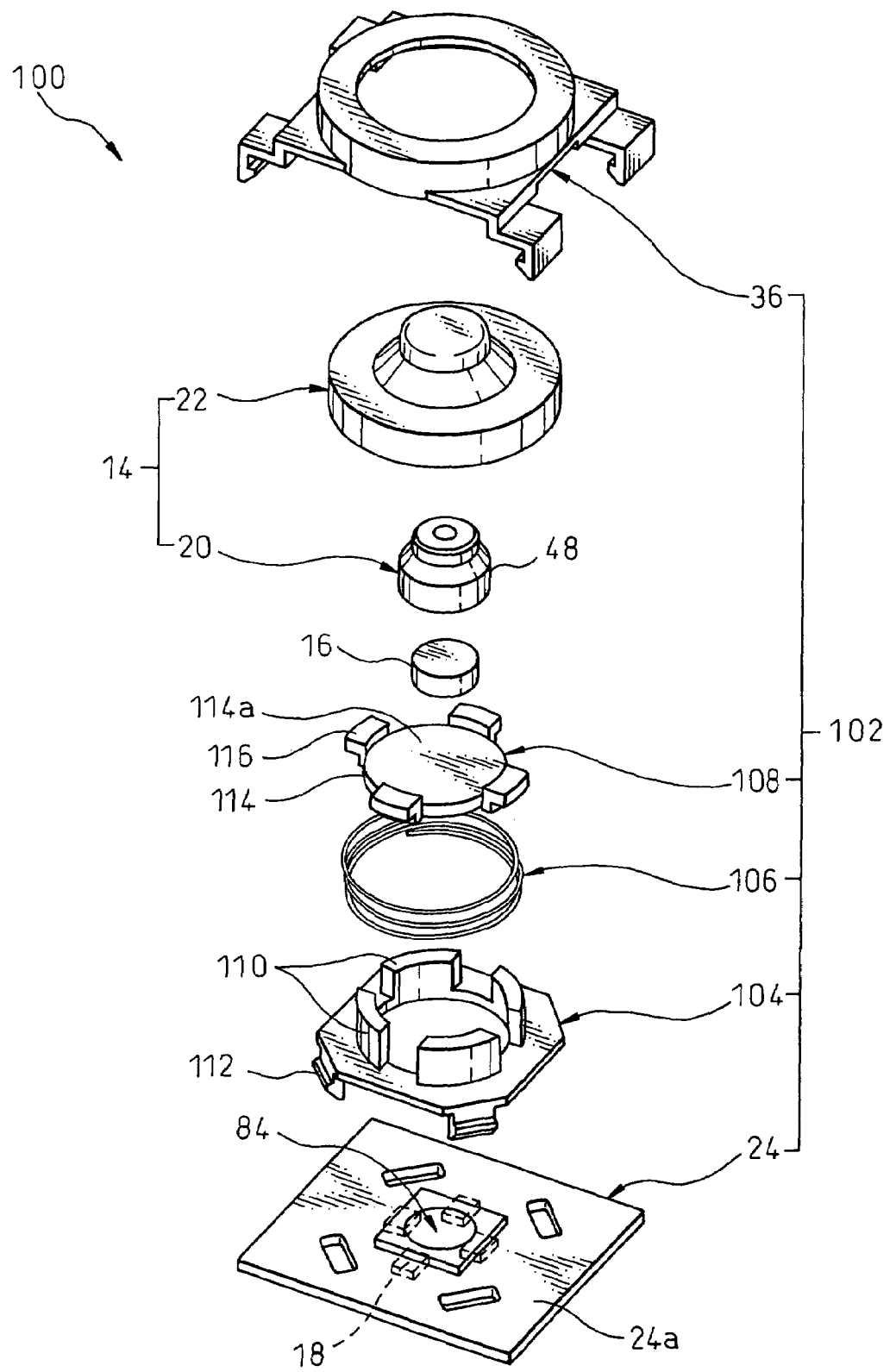
FIG. 10 is an exploded perspective view of a pointing device according to a fourth embodiment of the present invention.
Figure 11:
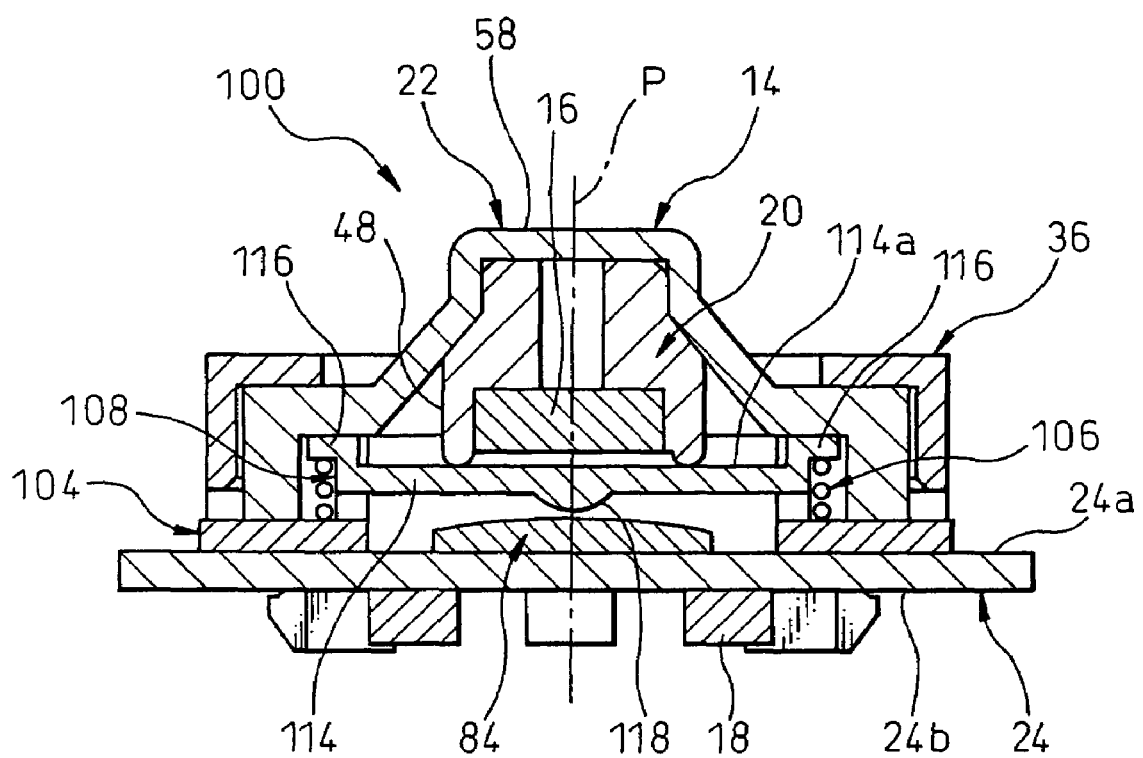
FIG. 11 is a vertical sectional view of the pointing device of FIG. 10, showing an operating section at a home position.

A pointing device including the above-described switch mechanism may be embodied in a different way. FIGS. 10 and 11 show such a pointing device 100, according to the fourth embodiment of the present invention, in an exploded perspective view and an assembled sectional view, respectively. The pointing device 100 has substantially the same structure as the pointing device 80 of the third embodiment, except for the constitution of a support member joined to a circuit board of a base section for actuating a switch mechanism, and thus corresponding components are denoted by common reference numerals and an explanation thereof is not repeated.

The pointing device 100 includes a base section 102, an operating section 14 supported on the base section 102 and shiftable in a desired horizontal direction in relation to the base section 102, a magnet 16 arranged in or carried on the operating section 14, a plurality of magneto-electro transducers 18 arranged in or carried on the base section 102 at locations close to the magnet 16, and a switch mechanism 84 arranged between the base section 102 and the operating section 14. The base section 102 includes a circuit board 24, on which electronic components including a CPU (not shown) are mounted, a first support member 104 fixedly joined to the circuit board 24, a second support member 108 supported on the first support member 106 through a separate elastic member 106 in an elastically movable manner, and a cover member 36 fixedly joined to the circuit board 24 so as to substantially cover or hide the first support member 104.

The first support member 104 includes integrally a plurality (four, in the drawing) of arcuate upright walls 110 respectively located along a common circle at regular circumferential intervals, the arcuate walls 110 defining a circular center opening. The first support member 104 is further provided integrally at an outer periphery thereof with a plurality (four, in the drawing) of elastic hooks 112 projecting away from the walls 110 and is securely assembled with the circuit board 24 at a predetermined position thereon by using the elastic hooks 112. The elastic member 106, formed from, e.g., a compression coil spring, is arranged to coaxially surround all of the arcuate walls 110 of the first support member 104.

The second support member 108 includes, integrally, a circular support portion 114 and a plurality (four, in the drawing) of radial flange portions 116 respectively extending outward from the outer periphery of the support portion 114 and located at regular circumferential intervals. The support portion 114 of the second support member 108 is shaped and dimensioned so as to be closely and smoothly received in the center opening defined by the arcuate walls 110 of the first support member 104 in an axially slidable manner. The flange portions 116 are shaped and dimensioned so as to be closely and smoothly received in circumferential gaps between the respective adjacent arcuate walls 110 of the first support member 104 in an axially slidable manner.

When the first and second support members 104, 108 are properly assembled together, the flange portions 116 of the second support member 108 are laid on the top of the elastic member 106 surrounding the arcuate walls 110 of the first support member 108. In this state, the support portion 114 of the second support member 108 is located at a position spaced from the surface 24*a* of the circuit board 24. The support portion 114 is provided on an upper side thereof, facing away from the circuit board 24, with a flat circular support surface 114*a* extending substantially parallel to the surface 24*a* of the circuit board 24 during non-load condition of the elastic member 106. The support surface 114*a* serves to support the holding part 20 slidably in the desired horizontal direction at a position projecting from the surface 24*a* of the circuit board 24.

The flange portions 116 of the second support member 108 are respectively provided on the radial inner ends thereof with arcuate faces respectively extending to surround the support surface 114*a*. The arcuate faces of the flange portions 116, as well as the arcuate walls 110 of the first support member 104, project to a position higher than the support surface 114*a* in relation to the surface 24*a* of the circuit board 24, and thereby define a horizontal shifting range of the holding part 20 of the operating section 14. The center axis of a generally cylindrical face formed by the arcuate faces of the flange portions 116 and the arcuate walls 110 passes through the geometrical center of the support surface 114*a*, defines a center axis P of the pointing device 100, and thus defines a home position in the horizontal shifting range of the holding part 20 on the support surface 114*a*. Also, the support portion 114 of the second support member 108 is provided with a bump 118 as a pushing point, locally protruding from a back side opposite to the support surface 114*a* on the center axis P. The holding part 20 is capable of shifting, in a parallel translation manner, on the support surface 114*a* of the second support member 108 so as to be two-dimensionally slidable over 360 degrees about the center axis P, with the distal or lower end of the circumferential wall 48 of the larger diameter portion being uniformly abutted to the support surface 114*a*.

The pointing device 100 is capable of entering analogue data by operating the operating section 14 to horizontally shift it on the base section 102, in a way similar to the pointing device 10. In this respect, the elastic part 22 of the operating section 14 is capable of acting to readily and correctly return the holding part 20 to the home position in the horizontal shifting range. Additionally, in the pointing device 100, it is possible for the operator to push the operating surface 58 of the operating section 14 downward with, e.g., his finger in the home position as shown in FIG. 11, and to force the bottom end of the circumferential wall 48 of the holding part 20 against the support portion 114 of the second support member 108, so as to make or close the switch mechanism 84 located beneath the support portion 114. In the illustrated embodiment, as shown in FIG. 12, when the operating section 14 is pressed downward, the separate elastic member 106 is elastically compressed through the flange portions 116 of the second support member 108, and thereby the bump 118 formed on the support portion 114 pushes the underlying switch mechanism 84 to actuate the latter.

Figure 12:
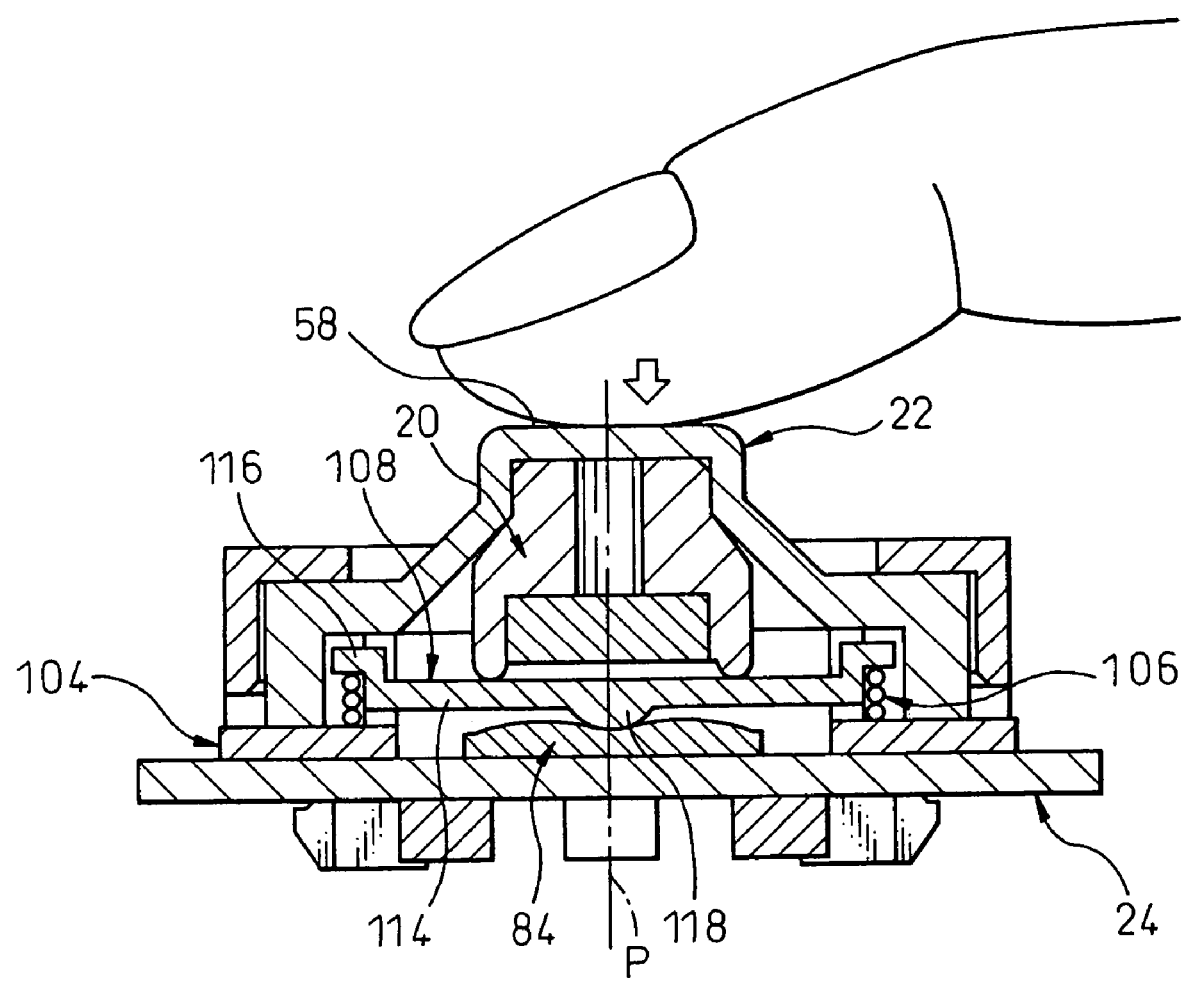
FIG. 12 is a vertical sectional view corresponding to FIG. 11, showing the operating section being shifted in a vertical direction.

When the operator releases a pressing force in the pushed-down position as shown in FIG. 12, the elastic member 106 elastically recovers the initial profile, so that the switch mechanism 84 is broken or opened and the operating section 14 returns to the home position of FIG. 11. In this regard, to prevent the operator from unintentionally actuating the switch mechanism 84 during the horizontal shifting operation of the operating section 14 by an operating force applied to the operating section 14, it is preferred to suitably adjust the spring constant of the elastic member 106.

Figure 13:
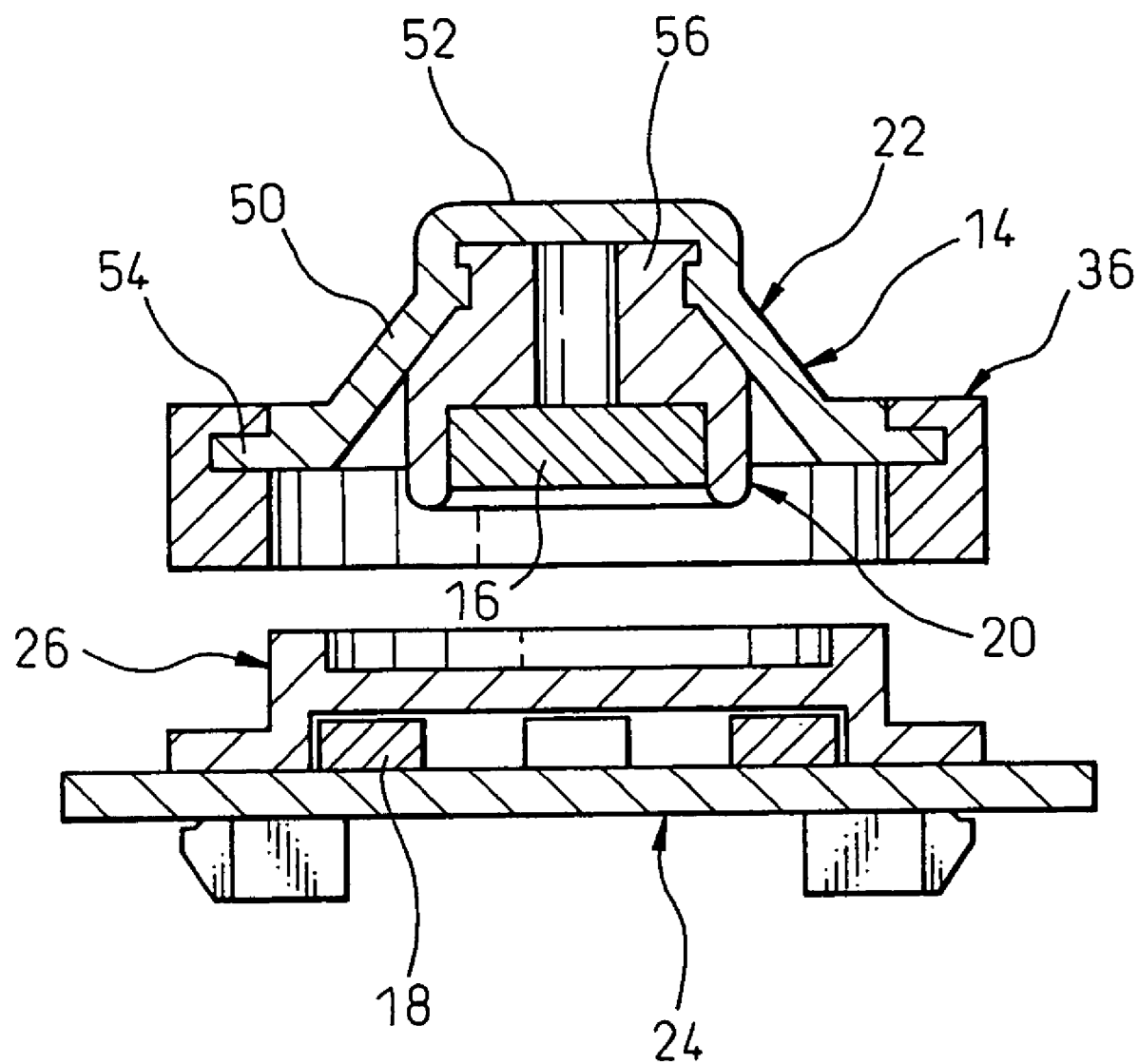
FIG. 13 is an exploded vertical sectional view showing a modification of a pointing device.

The pointing devices 10, 60, 80, 100, as several embodiments of the invention described above, may be variously changed and modified. For example, the operating section 14 may have a structure wherein the holding part 20 and the elastic part 22 are formed integrally with each other from mutually different materials, instead of the above-described structure wherein the holding and elastic parts 20, 22 are formed independently from each other as separate members of different materials and are securely assembled together. FIG. 13 shows such a modification of the pointing device 10, wherein the holding part 20 and the cover member 36 are individually produced from same or different resinous material(s), and the elastic part 22 is integrally molded from a rubber material on these parts 20, 36 through an insert molding process. This configuration possesses several advantages in that it is possible to improve a joint strength between the first connecting portion 52 of the elastic part 22 and the smaller diameter portion 56 of the holding part 20, and that it is possible to facilitate an assembling process of the pointing device because the elastic part 22 is formed integrally with the cover member 36 at the second connecting portion 54.

Figure 14:
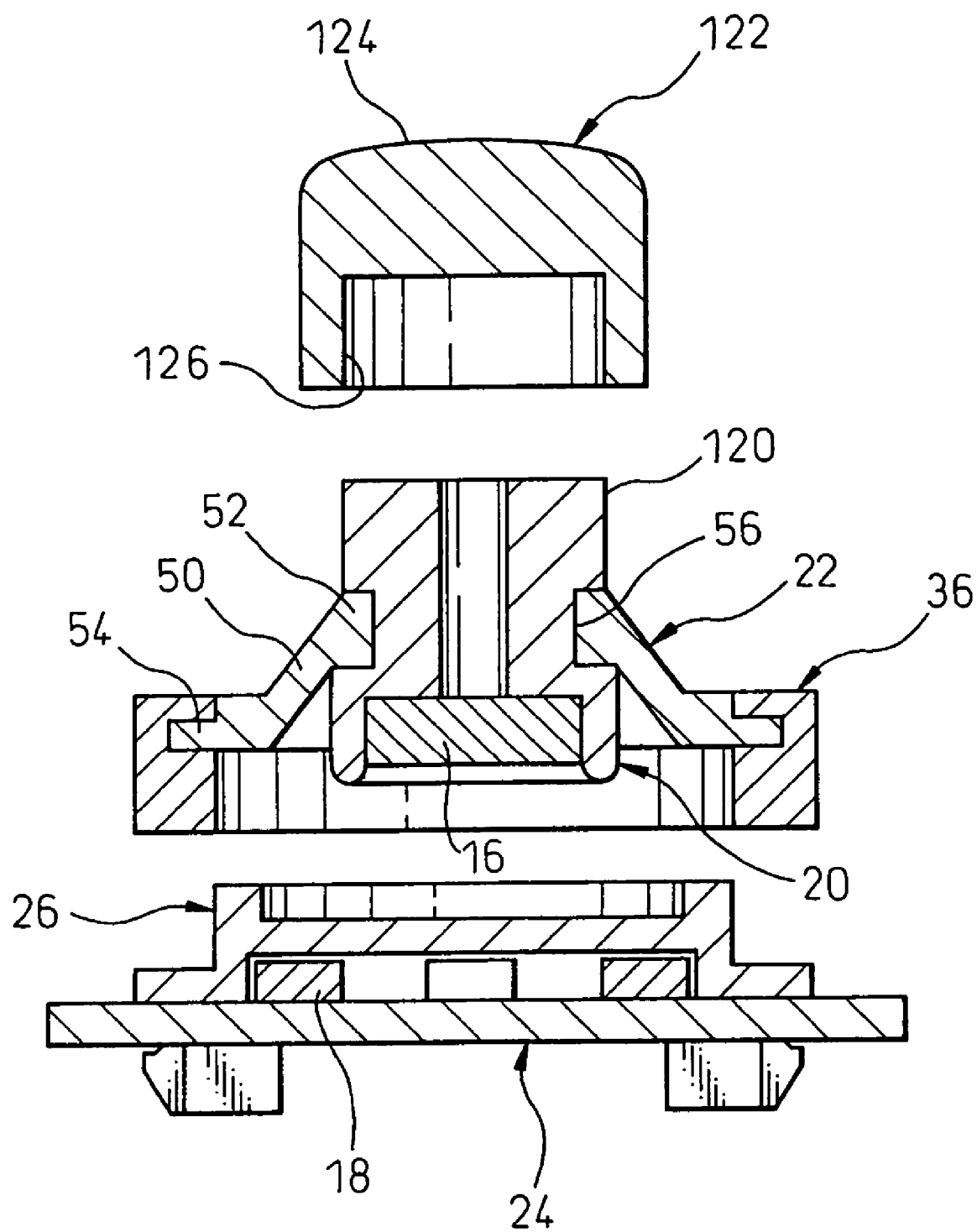
FIG. 14 is an exploded vertical sectional view showing another modification of a pointing device.

The above configuration may be further modified so that, as shown in FIG. 14, the holding part 20 is provided adjacent to the smaller diameter portion 56 with an extension 120 penetrating outward through the first connecting portion 52 of the elastic member 22, and that a key top 122 formed as a separate member is attached to the extension 120 independently from the elastic part 22. The key top 122 is provided on the outside thereof with an operating surface 124, on which an operator touches with, e.g., his finger for the shifting operation of the operating section 14. In this modification, when the holding and elastic parts 20, 22 are integrally molded as described above, it is possible to ensure a sufficient joint strength between the first connecting portion 52 of the elastic part 22 and the smaller diameter portion 56 of the holding part 20. Also, it is possible to firmly and securely couple the key top 122 to the holding part 20, by only press-fitting the extension 120 of the holding part 20 into a recess 126 formed in a bottom side of the key top 122. According to this configuration, it is possible to improve an appearance or design of the pointing device by printing various marks or patterns on the outer surface of the key top 122 and/or by coloring the key top 122.

Figure 15:
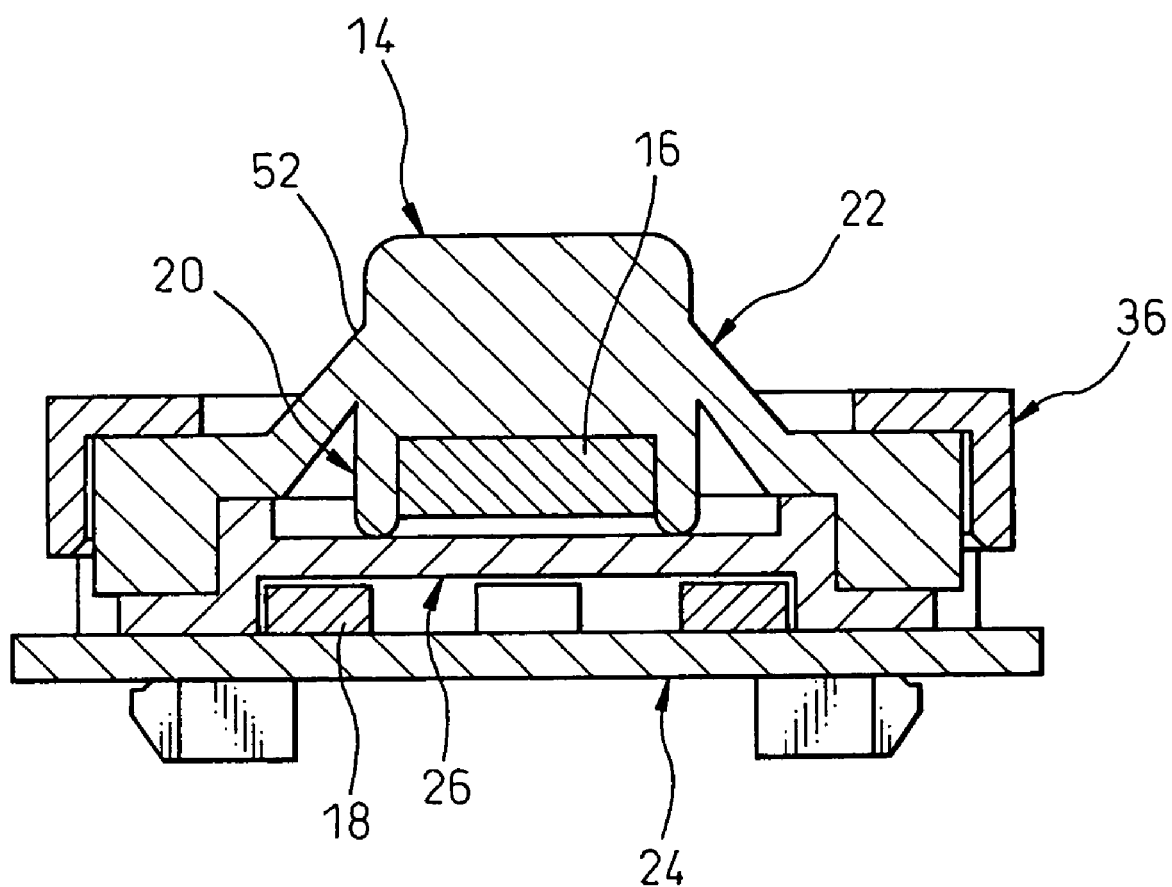
FIG. 15 is an exploded vertical sectional view showing a further modification of a pointing device.

Alternatively, as shown in FIG. 15, the operating section 14 may be structured so that the holding part 20 and the elastic part 22 are formed integrally with each other from mutually identical materials such as a rubber. This configuration serves to reduce the number of components of the operating section 14, and thus improves productivity for assembling the pointing device. Furthermore, it is not necessary to consider a joint strength between the first connecting portion 52 of the elastic part 22 and the holding part 20, so that it is possible to significantly reduce the dimension of the operating section 14.

Figure 16:
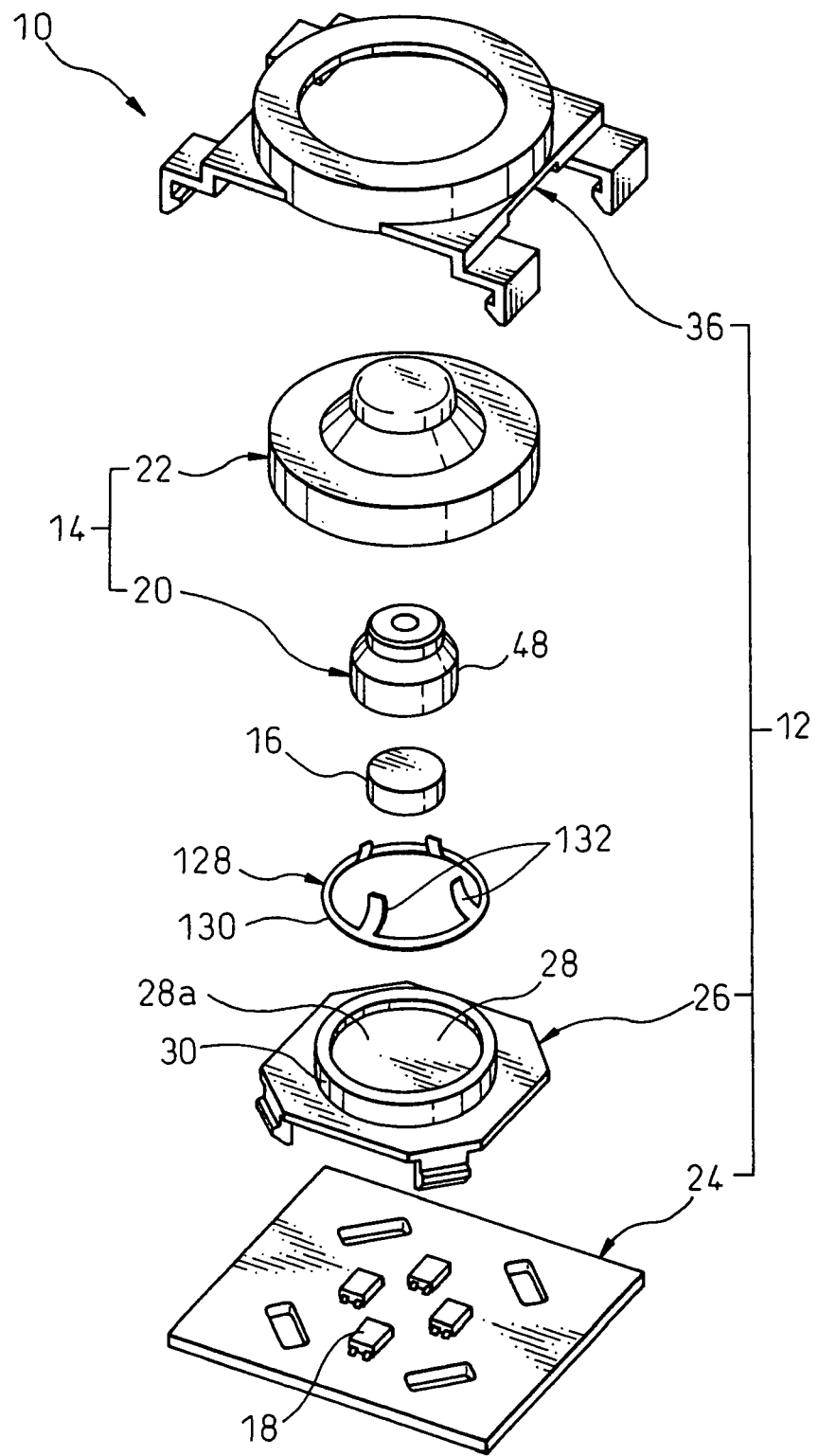
FIG. 16 is an exploded perspective view of a yet further modification of a pointing device.
Figure 17:
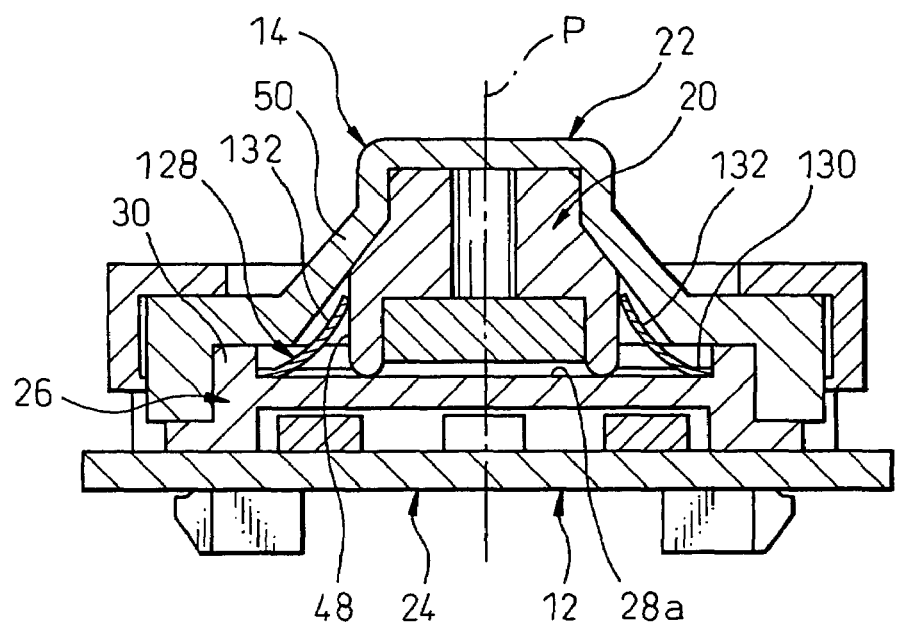
FIG. 17 is a vertical sectional view of the pointing device of FIG. 16, showing an operating section at a home position.
Figure 18:
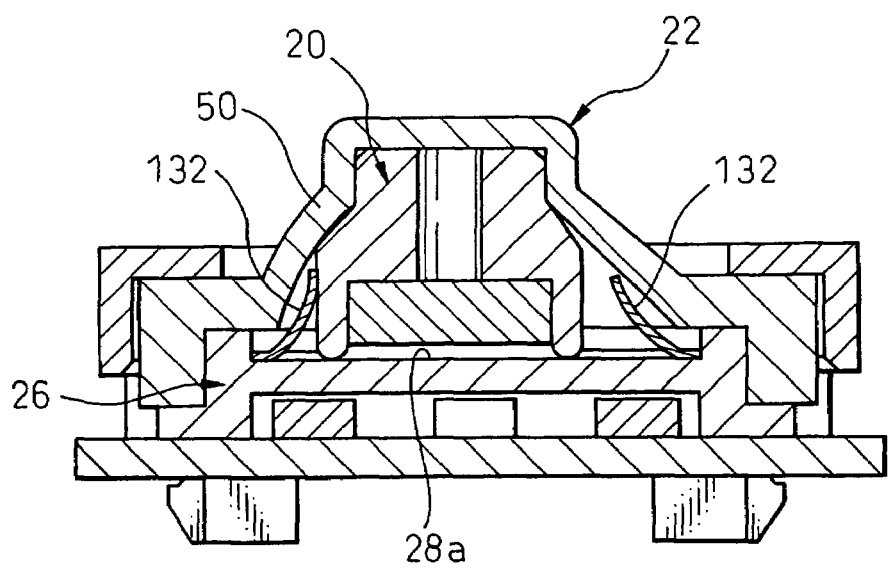
FIG. 18 is a vertical sectional view corresponding to FIG. 17, showing the operating section being shifted in a horizontal direction.

Moreover, as shown in FIGS. 16 to 20, an auxiliary elastic part may be arranged between the base section and the operating section for assisting the elastic part of the operating section in a home-position recovering function. For example, in the modification of the pointing device 10 as shown in FIGS. 16 to 18, a plate spring 128, acting as the auxiliary elastic part, is arranged between the support member 26 of the base section 12 and the holding part 20 of the operating section 14. The plate spring 128 includes an annular base portion 130 and a plurality (four, in the drawing) of arms 132 disposed at regular intervals along an inner peripheral edge of the base portion 130, the arms 132 extending radially inward from the base portion 130 while being convexly bent relative to the center axis P. The base portion 130 of the plate spring 128 is shaped and dimensioned so as to come into uniform contact with the inner face of the cylindrical wall 30 of the support member 26 and to be laid on the support surface 28a.

When the components of the modified pointing device 10 are properly assembled with each other, the arms 132 of the plate spring 128 are abutted at free ends thereof onto the circumferential wall 48 of the larger diameter portion of the holding part 20. During a condition where both of the elastic part 22 and the plate spring 128 are balanced, the operating section 14 is located at a home position on the base section 12 (FIG. 17). When the operating section 14 is horizontally shifted from the home position of FIG. 17, the major portion 50 of the elastic part 22 and the certain arm or arms 132 of the plate spring 128 are elastically deformed in correspondence to the shifting direction and amount of the holding part 20, and thereby elastically biasing, in cooperation with each other, the holding part 20 in a direction opposite to the shifting direction (FIG. 18).

From a data input position as shown in FIG. 18, when the operator takes his finger away from the operating section 14 to release an operating force, the holding part 20 together with the magnet 16 immediately start to shift toward the home position, due to the spring biasing force generated in both of the major portion 50 of the elastic part 22 and the certain arm(s) 132 of the plate spring 128, and thus return to the home position at an instant when the elastic part 22 and the plate spring 128 recover the balanced state thereof. In this manner, the provision of the plate spring 128 as the auxiliary elastic part may improve the response and accuracy of the returning motion of the holding part 20 toward the home position in the horizontal shifting range. The plate spring 128 also makes it possible to suppress the degradation of the operability due to age deterioration of the rubber elastic part 22.

Figure 19:
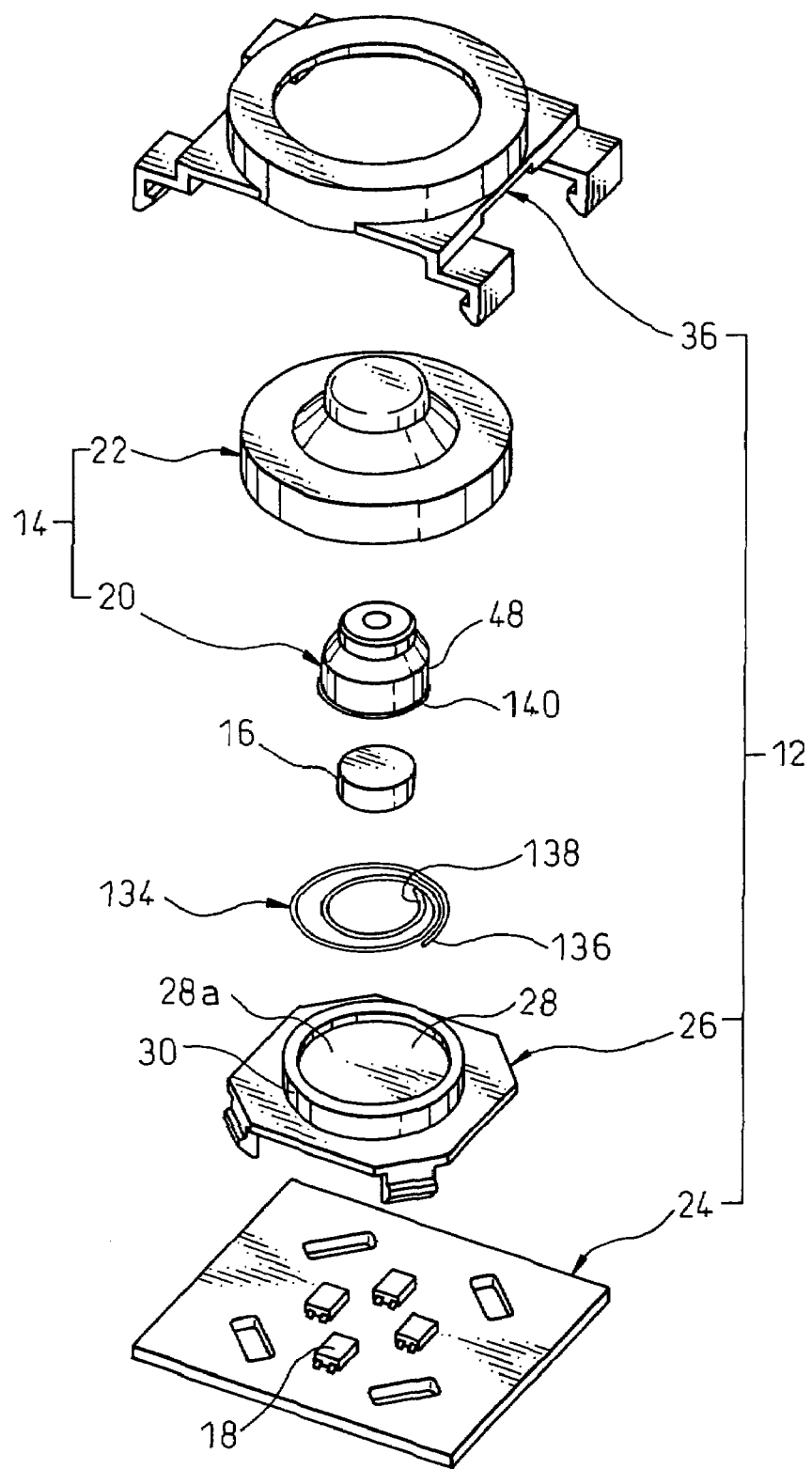
FIG. 19 is an exploded perspective view of a yet further modification of a pointing device.
Figure 20:
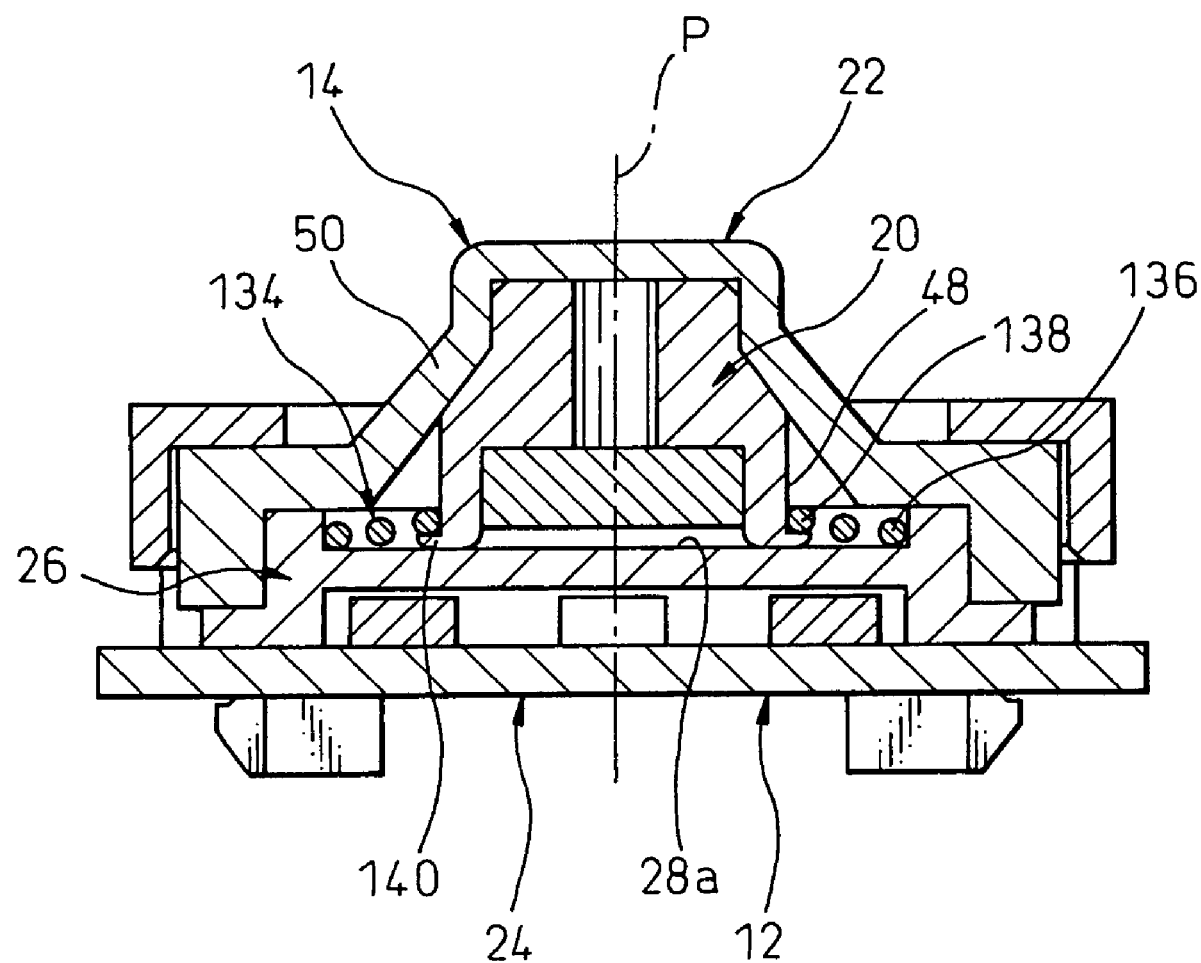
FIG. 20 is a vertical sectional view of the pointing device of FIG. 19, showing an operating section at a home position.

As shown in FIGS. 19 and 20, a coil spring 134 having a generally flat spiral shape may be used as the auxiliary elastic part, instead of the plate spring 128. In this arrangement, the coil spring 134 is snugly fitted at an outer end length 136 thereof inside the cylindrical wall 30 of the support member 26 and at an inner end length 138 thereof outside the circumferential wall 48 of the holding part 20. The circumferential wall 48 of the holding part 20 is provided at the bottom end thereof with a bead 140, onto which the inner end length 138 of the coil spring 134 is engaged. During a condition where both of the elastic part 22 and the coil spring 134 are balanced, the operating section 14 is located at a home position on the base section 12 (FIG. 20). When the operating section 14 is horizontally shifted from the home position of FIG. 20, the major portion 50 of the elastic part 22 and the coil spring 134 are elastically deformed in correspondence to the shifting direction and amount of the holding part 20, and thereby elastically biasing, in cooperation with each other, the holding part 20 in a direction opposite to the shifting direction.

As will be understood from the above description, the pointing device with a magneto-electro transducer, according to the invention, is capable of reducing the outside dimension thereof to such a degree as to permit the pointing device to be installed into various portable information apparatuses for hand-held operation, such as electronic notebooks, personal digital assistants (PDAs), mobile phones, etc., without deteriorating the operability of the operating section. In the case where the pointing device is installed in such a portable information apparatus, it is required to stably and effectively connect the pointing device with the main circuit board (or a mounting board) of the information apparatus in both electrical and mechanical way, regardless of the relatively narrow interior space of the casing of the portable apparatus.

Figure 21:
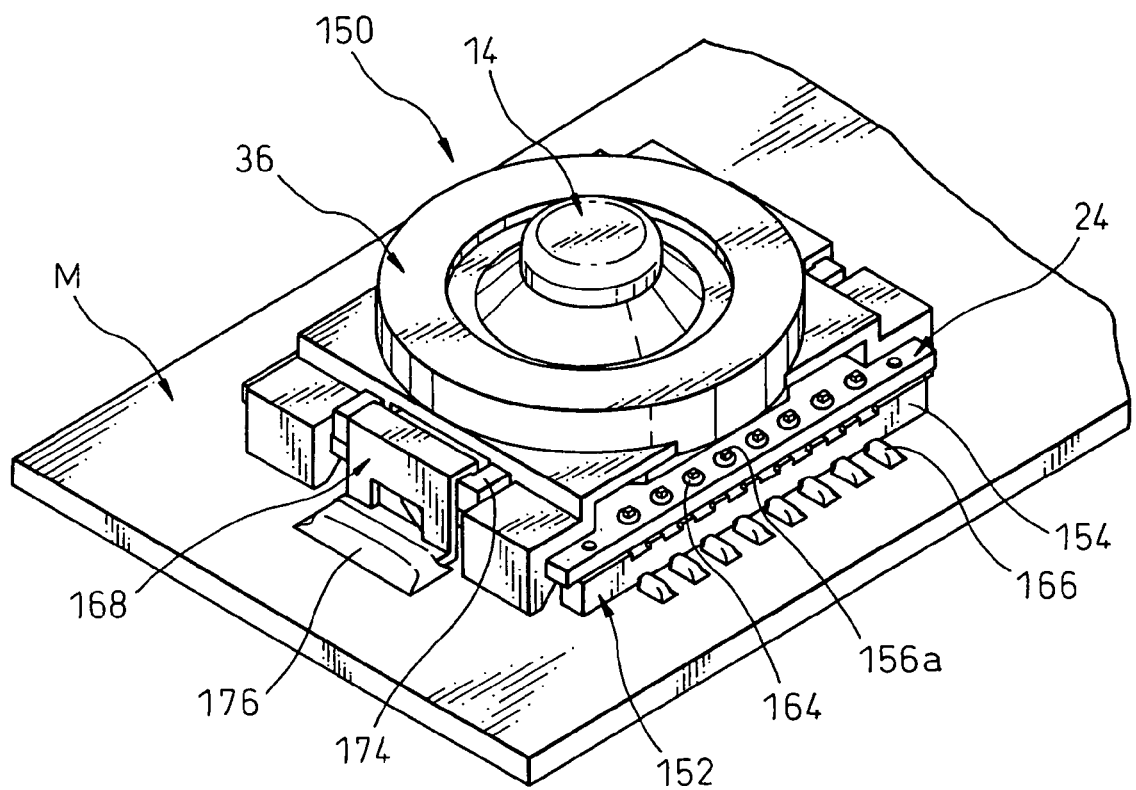
FIG. 21 is an assembled perspective view of a pointing device according to a fifth embodiment of the present invention, in a mounted condition on a mounting board.
Figure 22:
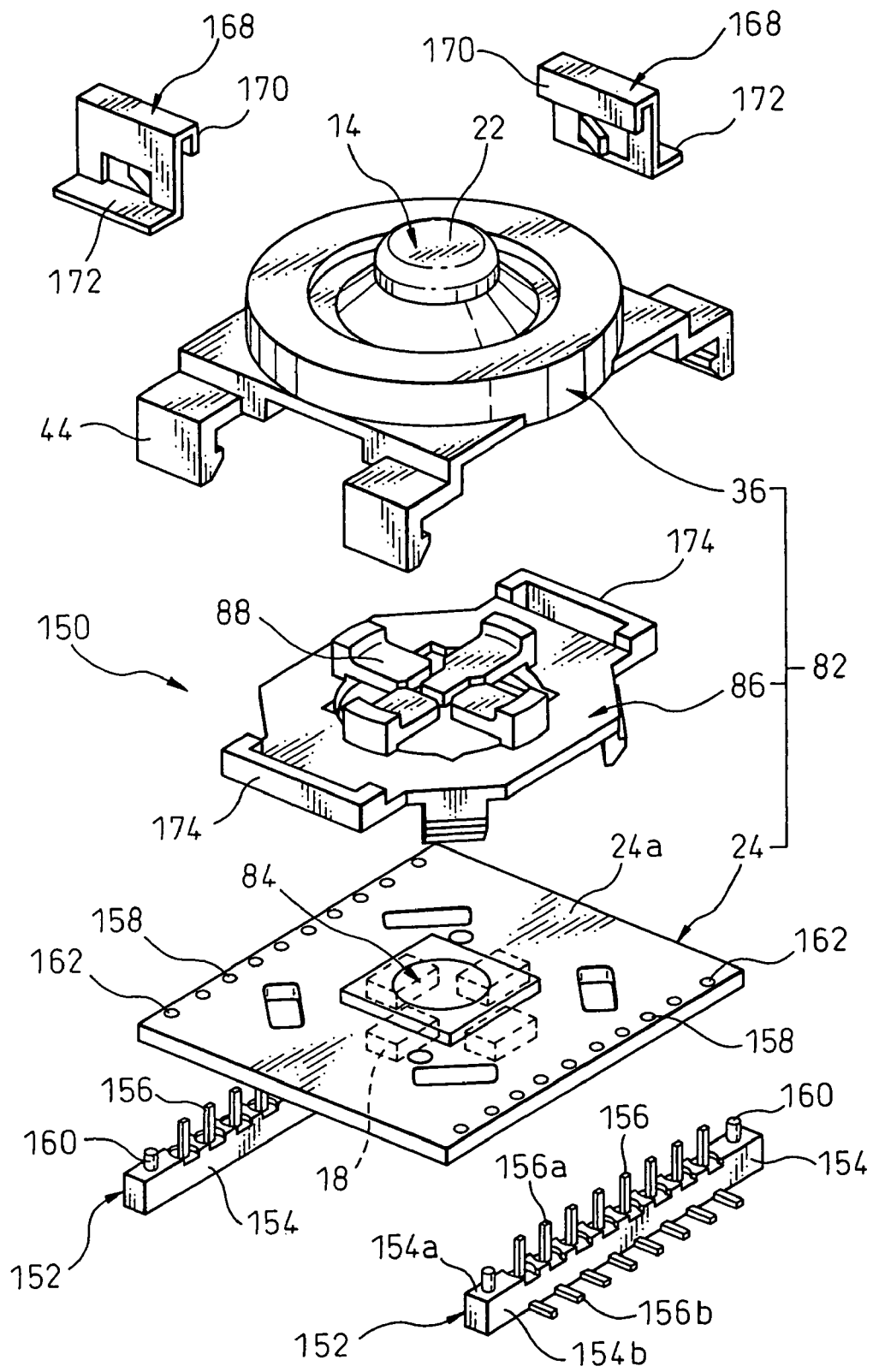
FIG. 22 is an exploded perspective view of the pointing device of FIG. 21.

FIGS. 21 and 22 show a pointing device 150, according to the fifth embodiment of the present invention, having superior properties in the electrical and mechanical connection structure. In this regard, the pointing device 150 has substantially the same construction as the pointing device 80 of the third embodiment as described, except for the electrical and mechanical connection structure, and the corresponding components are thus denoted by common reference numerals and an explanation thereof is not repeated.

The pointing device 150 includes two connectors 152 for electrically connecting magneto-electro transducers 18 and a switch mechanism 84, mounted on the circuit board 24 of the base section 82, with a main circuit board (or a mounting board) M of electronic equipment to which the pointing device 150 is installed. Each connector 152 includes an insulating member 154 and a plurality of terminals 156 carried in an array on the insulating member 154 and located at regular intervals. The circuit board 24 having a flat rectangular-plate shape is provided in a region adjacent to an outer periphery thereof with a plurality of through holes 158. The through holes 158 are formed and arranged on lines along a pair of opposed edges of the circuit board 24, to which the elastic hooks 44 of the cover member 36 are not engaged, at regular intervals corresponding to the arrays of the terminals 156 of the connectors 152. The through holes 158 are electrically connected with the magneto-electro transducers 18 and the switch mechanism 84 on the circuit board 24 via, e.g., a printed circuit.

The insulating member 154 of each connector 152 is a square bar-shaped member integrally molded from a resinous material through, e.g., an insert molding process so as to integrally embed the terminals 156 in the bar-shaped member. Each terminal 156 is formed from a pin-shaped metal piece stamped out through a press process by bending it into an L-shape. Each terminal 156 is securely supported in the insulating member 154 and positioned so that one end 156a thereof projects from a top face 154a of the insulating member 154 and another end 156b projects from a lateral face 154b of the insulating member 154. The insulating member 154 of each connector 152 is provided on the top face 154a with positioning pins 160 at respective opposite end regions outside of the array of terminals. On the other hand, the circuit board 24 is provided with positioning holes 162 for receiving the pins 160, at respective opposite end regions outside of each array of through holes 158.

Each connector 152 is mounted onto the circuit board 24 in a condition where the positioning pins 160 on the insulating member 154 are respectively fitted into the positioning holes 162 in the circuit board 24 and the ends 156a of the terminals 156 are individually inserted into the through holes 158 in the circuit board 24. The connector 152 is oriented so that the other ends 156b of the terminals 156 project outside of the circuit board 24. In this state, the respective terminals 156 are individually fixed at the ends 156a thereof to the corresponding through holes 158 by solders 164, so as to be electrically connected to the magneto-electro transducers 18 and the switch mechanism 84. Then, the connector 152 is mounted onto the mounting board M through solders 166 in a condition where the other ends 156b of the respective terminals 156 are individually laid on corresponding electrodes (not shown) formed on the surface of the mounting board M.

As will be understood from the above, the connector 152 has an extremely simple structure wherein the terminals 156 are embedded in the bar-shaped insulating member 154, which advantageously facilitates a reduction in a total size and a terminal pitch. Also, the structure in which the terminals 156 are individually fixed to the corresponding through holes 158 in the circuit board 24 effectively and advantageously reduces surface areas on the circuit board 24 required for the fixation of the terminals 156, in comparison with a structure wherein terminals are soldered with electrode pads. Accordingly, in the case where the pointing device 150 is installed into a portable information apparatus, it is possible to stably and effectively connect the pointing device 150 with the main circuit board of the information apparatus in an electrical way, in the relatively narrow interior space of the casing of the portable apparatus.

In the illustrated embodiment, the pointing device 150 further includes a pair of fitting members 168 acting as a mechanical connecting structure for reinforcing the electrical and mechanical connection through the solders between the connectors 152 and the mounting board M. Each fitting member 168, formed through, e.g., a stamping and bending process from a sheet metal, is integrally provided at one end with a hook portion 170 and at the other end with a leg portion 172. On the other hand, the support member 86 of the base section 82 is provided along opposed edges thereof with a pair of hook receptacles 174 extending outward.

When the pointing device 150 is mounted to the mounting board M, the fitting members 168 are fitted to the support member 86 with the respective hook portions 170 being hooked onto the corresponding hook receptacles 174, after the connectors 152 are soldered as described above. In this state, the leg portions 172 of the fitting members 168 are fixed by solders 176 to the surface of the mounting board M at desired positions thereon. In this manner, the pointing device 150 is firmly fixed and stably held on the mounting board M against an operating force applied by an operator to the operating section 14.

Figure 23:
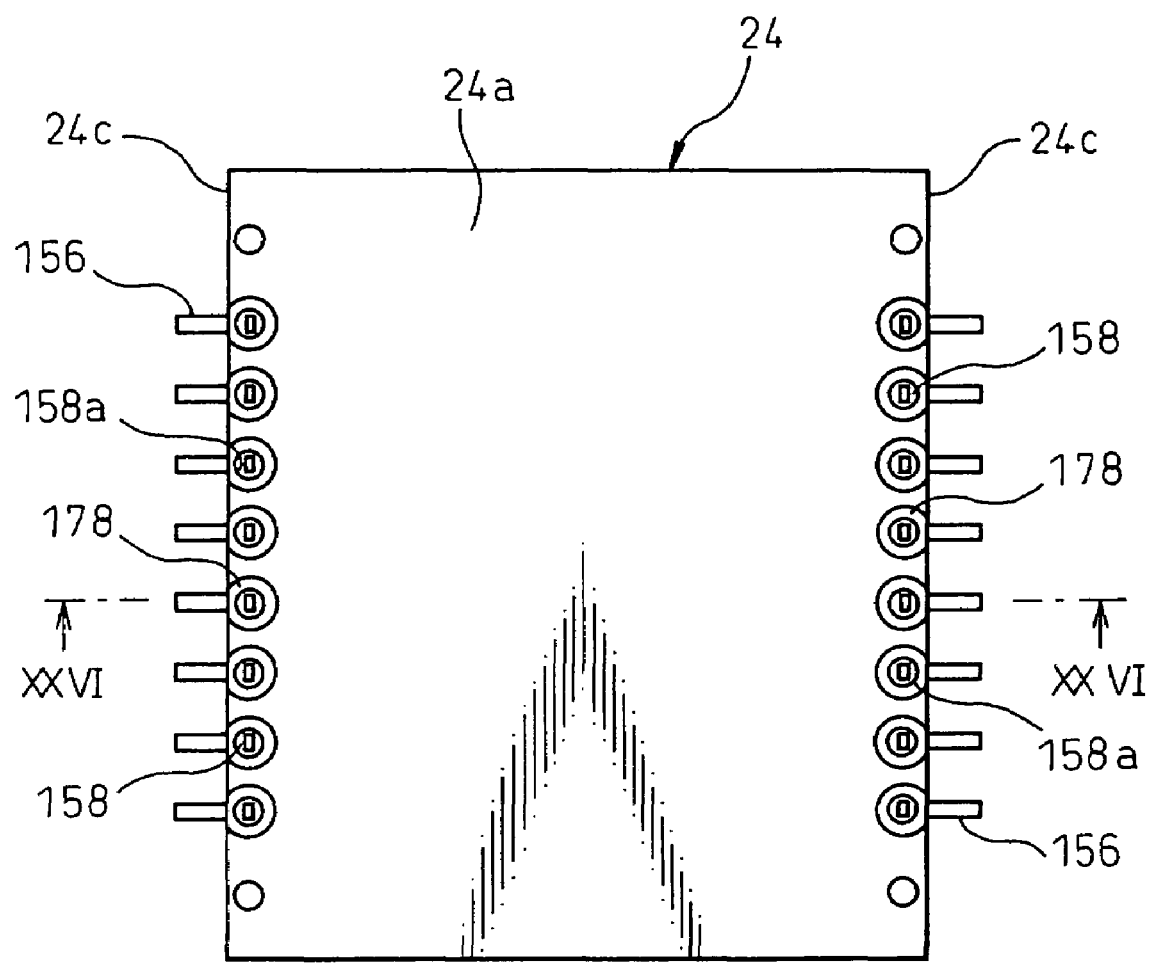
FIG. 23 is a plan view of a circuit board with a connector, arranged in the pointing device of FIG. 21.

In the pointing device 150, the circuit board 24 may be provided in association with the respective through holes 158 with lands having specific profiles, which can effectively increase a mounting area required for mounting various electronic parts on the circuit board 24. As shown in FIG. 23, for example, the circuit board 24 is provided on the surface 24a with lands 178 having specific profiles, respectively adjacent to opening edges 158a of the through holes 158. A portion of each land 178, disposed between the opening edge 158a of the corresponding through hole 158 and the outer peripheral edge 24c of the circuit board 24, has a width dimension smaller than that of a remaining portion of this land 178. The lands 178 having the above profiles allow for the through holes 158 to be formed close to the outer edge 24c of the circuit board 24 as much as possible, which causes an effective increase of the mounting area for electronic parts on the circuit board 24.

Figure 25A:
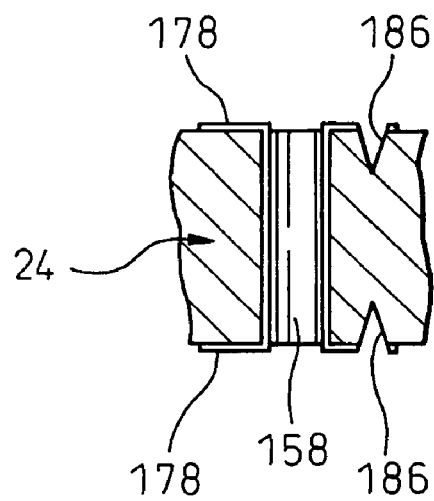
FIG. 25A is an enlarged sectional view of a part of the circuit board of FIG. 24.
Figure 25B:
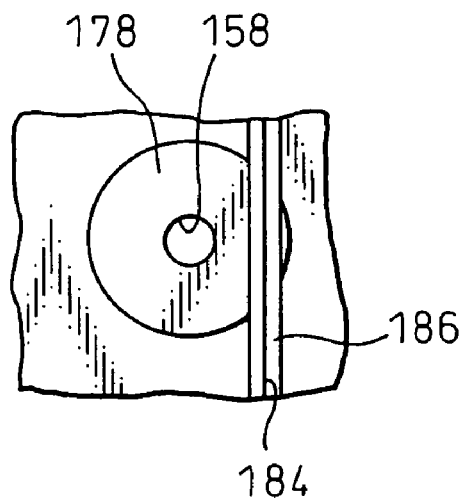
FIG. 25B is an enlarged plan view of a part of the circuit board of FIG. 24.
Figure 26:
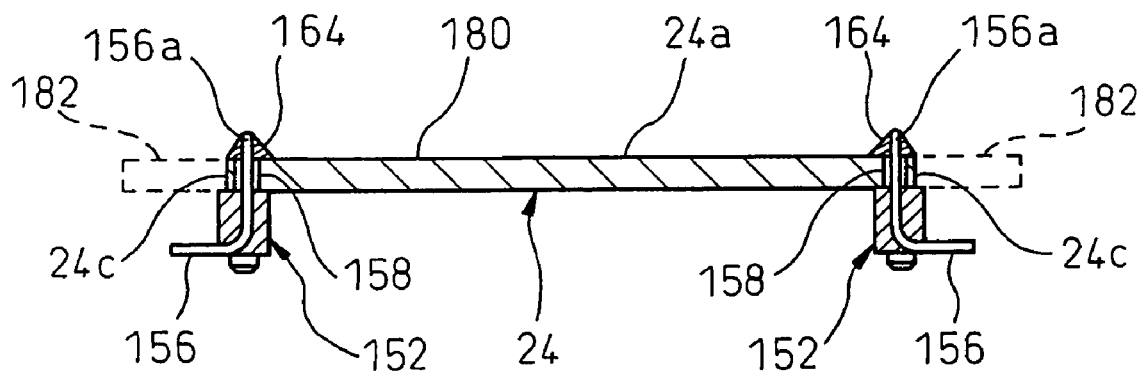
FIG. 26 is a sectional view of the circuit board, taken along a line XXVI-XXVI in FIG. 23.

An advantageous method for producing an assembled structure of the circuit board 24 and the connectors 152, the connectors 152 being connected to the through holes 158 with the lands 178 having specific profiles, is described below with reference to FIGS. 24 to 26.

Figure 24:
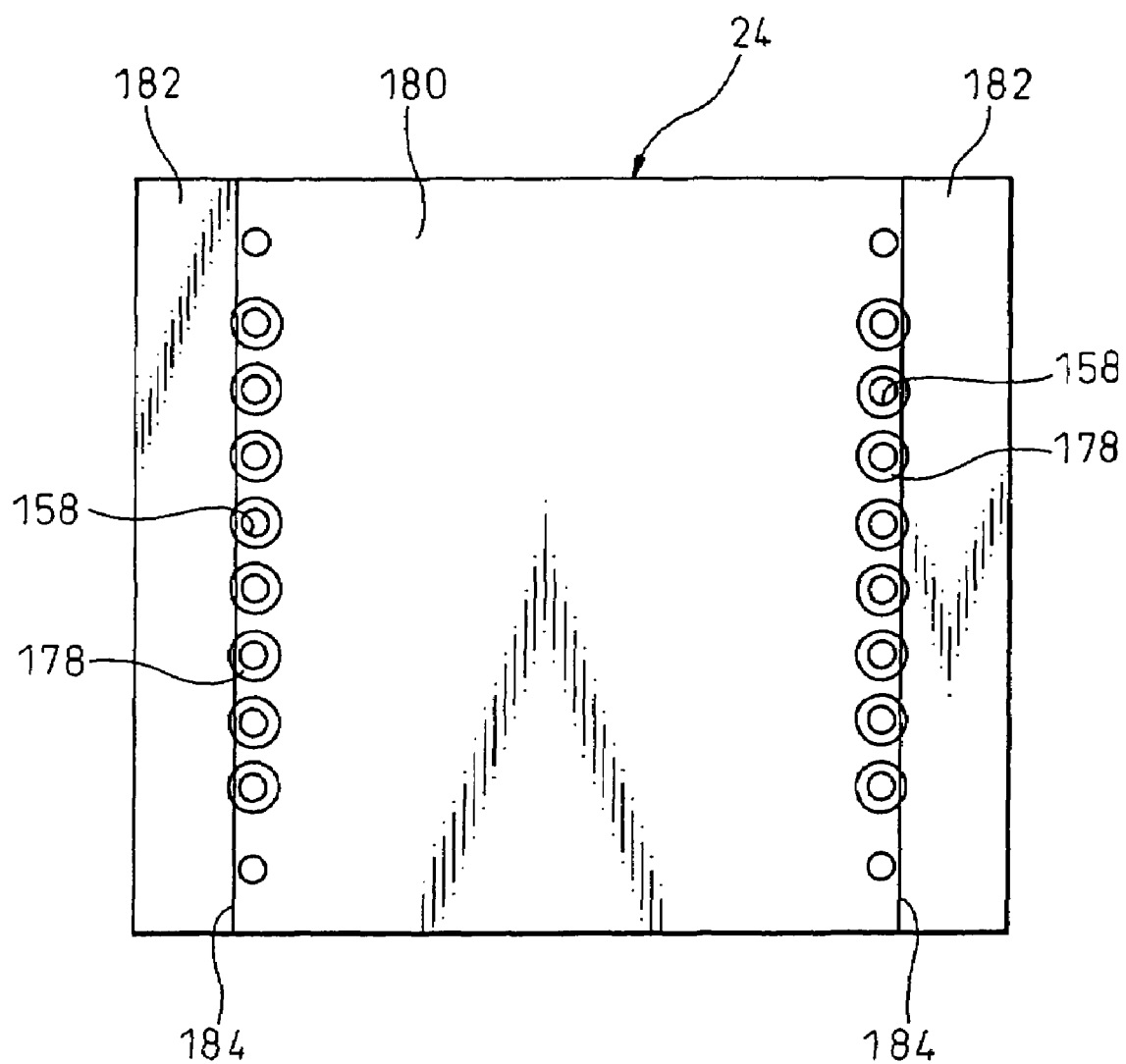
FIG. 24 is a plan view of the circuit board of FIG. 23, before the connector is attached thereto, for explaining a manufacturing process of the circuit board.

First, as shown in FIG. 24, an unfinished board structure of the circuit board 24, including a mounting region 180 on which electrical parts (not shown) are capable of being mounted and a pair of disposal regions 182 adjacent to the mounting region 180 along the opposed ends thereof, is provided. The disposal regions 182 are specific portions to which no electronic part is mounted and no circuit is formed, and are used for the mechanical support and positioning of the circuit board 24 during a period when the circuit board 24 is conveyed in a general mounting process of electronic parts. On the other hand, a pair of connectors 152 as described are provided.

Next, a plurality of through holes 158 with lands are formed in the mounting region 180 of the circuit board 24 along boundary lines 184 between the mounting region 180 and the disposal regions 182, in such a manner that each annular land 178 extends continuously from the mounting region 180 to the adjacent disposal region 182. In this regard, each through hole 158 may be formed as a double-sided plated-through hole having lands 178 on the both sides of the circuit board 24, as shown in FIG. 25A, through a conventional method of manufacturing a printed circuit board. It is also advantageous that, as shown in FIG. 25B, linear grooves 186 are formed on the both sides of the circuit board 24 so as to extend along the boundary lines 184.

Then, the terminals 156 of the connectors 152 are individually inserted at the ends 156a thereof into the through holes 158, and are soldered to the corresponding lands 178. As a result, the connectors 152 are fixed to the mounting region 180 of the circuit board 24 having the disposal regions 182. Finally, the disposal regions 182 are separated from the mounting region 180 by breaking the board on the grooves 186 formed along the boundary lines 184, while leaving the connectors 152 attached to the mounting region 180. In this manner, as shown in FIG. 26, the circuit board 24 including a pair of connectors 152 mounted along a pair of opposed outer edges 24c is produced.

In the above configuration, each of the through holes 158 with lands as described may be formed so as to partially open in the outer edge 24c of the circuit board 24, on the assumption that the fixing strength of the terminal 156 is surely and stably obtained by the solder 164. In this case, a C-shaped land is provided for each through hole 158.

While several preferred embodiments have been described with reference to the drawings, it should be noted that the present invention may have various forms other than the illustrated embodiments. For example, the characteristic structure of the operating section of the pointing device according to the invention may be effectively applied in a pointing device in which a positional correlation between the magnet 16 and the plural magneto-electro transducers 18 is reverse to the illustrated configuration, that is, wherein the magneto-electro transducers 18 provided in the operating section 14 are shifted relative to the magnet 16 provided in the base section 12, 62, 82, 102. In this alternative arrangement, it will be expected to obtain the same particular effects as in the illustrated embodiments. Also, the manufacturing method of the assembled structure of a circuit board and a connector, according to the invention, may be applied not only to the pointing device 150 but also to board-connecting structures in various electronic equipment.

Figure 27:
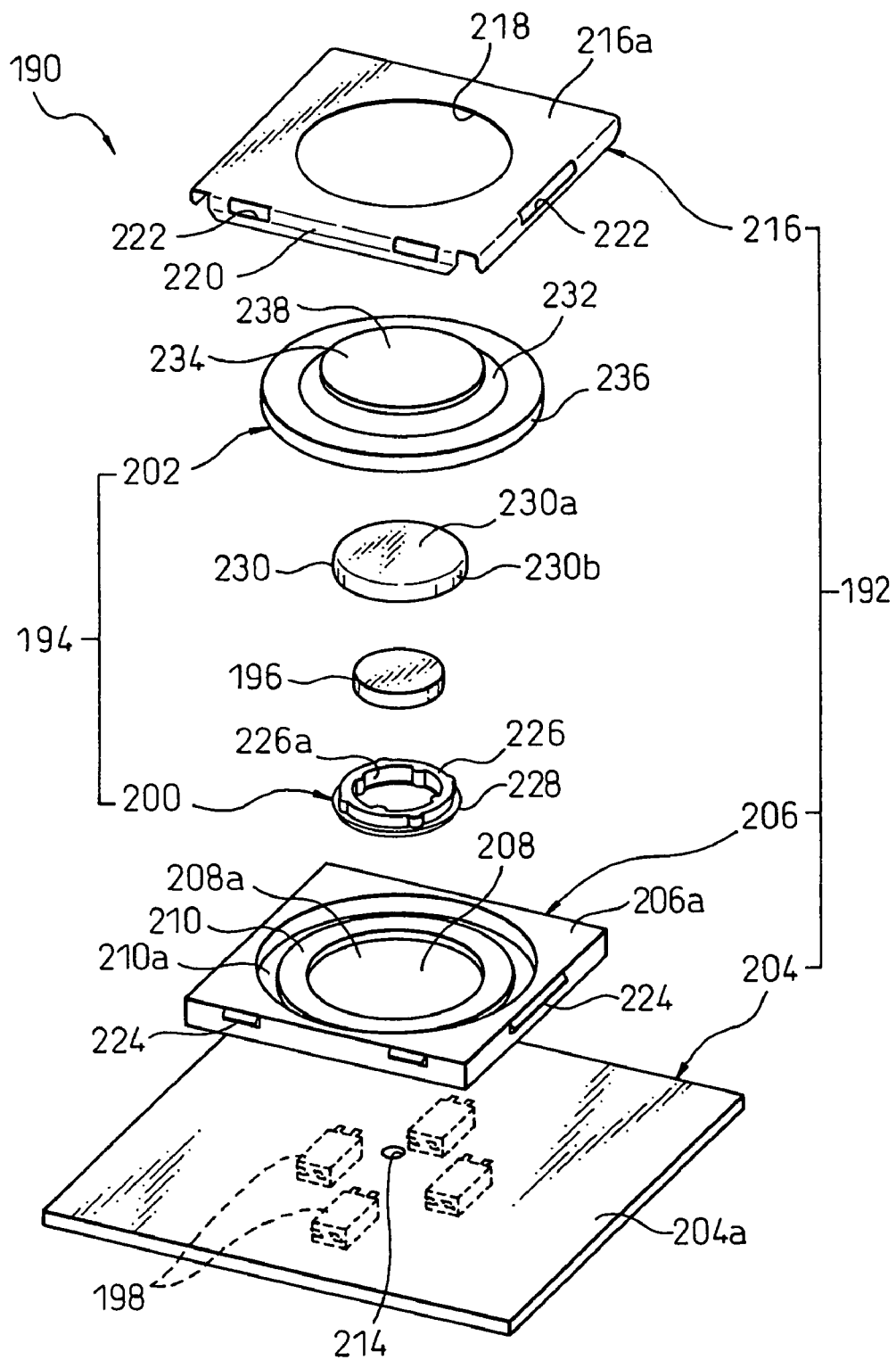
FIG. 27 is an exploded perspective view of a pointing device according to a sixth embodiment of the present invention.
Figure 28:
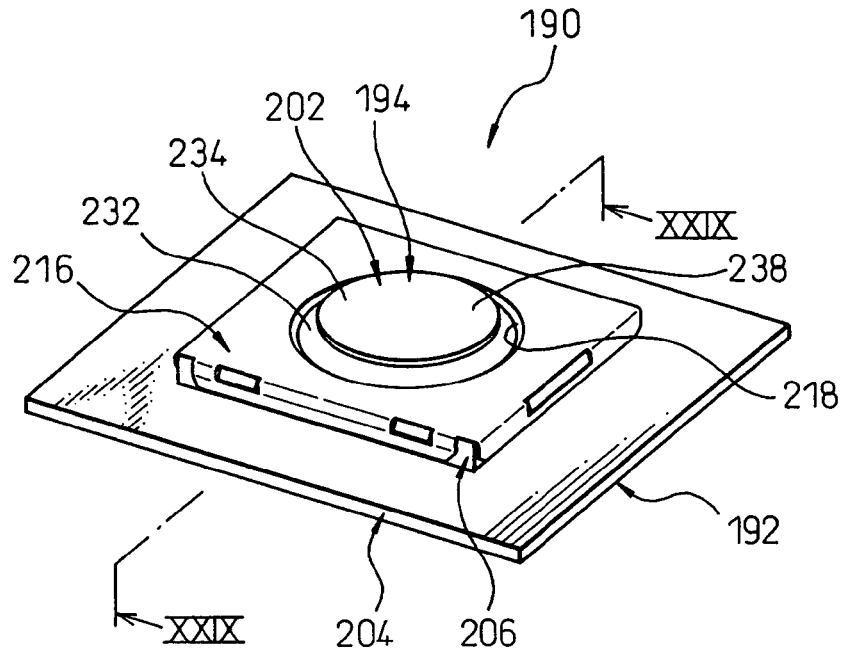
FIG. 28 is an assembled perspective view of the pointing device of FIG. 27.
Figure 29:
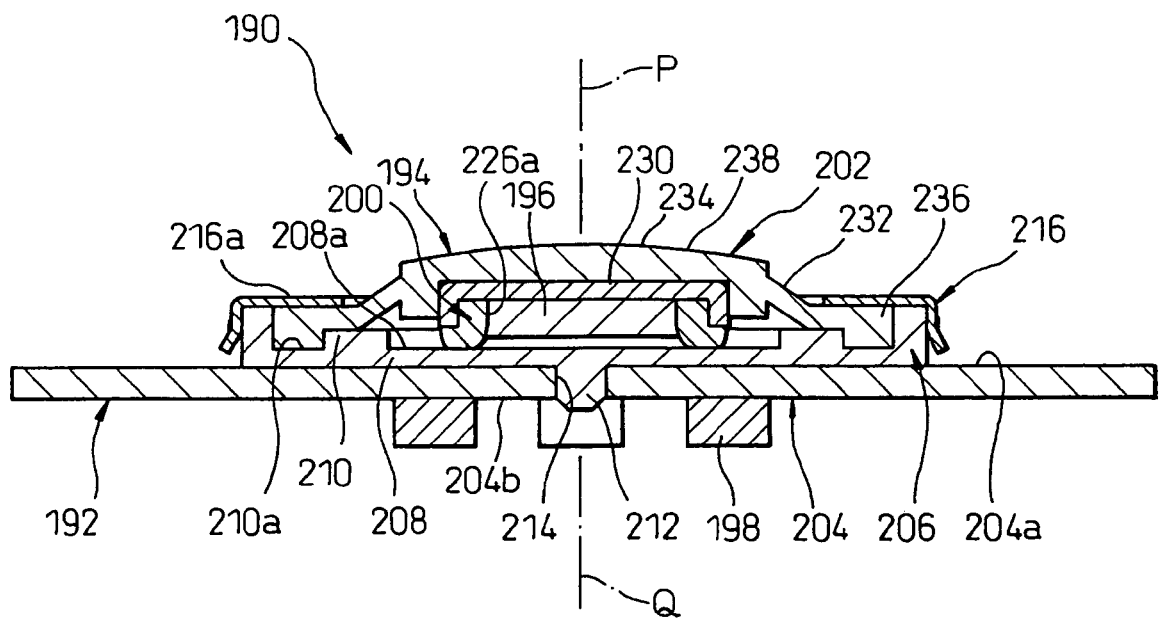
FIG. 29 is a vertical sectional view of the pointing device, taken along a line XXIX-XXIX in FIG. 28, showing an operating section at a home position.

It will be appreciated that a pointing device with a magneto-electro transducer, according to the present invention, may be installed, e.g., in a folding-type portable information apparatus such as a mobile phone, which includes a display and a keyboard, connected with each other through a hinge joint. In this case, it is desirable to decrease the projecting heights of various switches and the pointing device from the surface of a circuit board as much as possible, from the viewpoint of an effective reduction in entire thickness of the portable information apparatus in its folded mode, and thus of a significant improvement of the portability of the latter. FIGS. 27 to 29 show a pointing device 190 having a low-profile structure, according to the sixth embodiment of the present invention, which may be preferably installed in the keyboard of the folding-type portable information apparatus. The pointing device 190 also has substantially the same basic structure as the pointing device 10 of the first embodiment from the viewpoint of an operating function.

The pointing device 190 includes a base section 192, an operating section 194 supported on the base section 192 shiftably in a desired horizontal direction in relation to the base section 192, a disk-shaped magnet (such as a permanent magnet) 196 arranged in or carried on the operating section 194, and a plurality of magneto-electro transducers (such as Hall-effect elements) 198 arranged in or carried on the base section 192 at locations close to the magnet 196. The operating section 194 includes a first or holding part 200 securely holding the magnet 196 and supported on the base section 192 shiftably in a desired horizontal direction relative to the base section 192, and a second or elastic part 202 connected to the holding part 200 and elastically biasing the holding part 200 toward a home position in a horizontal shifting range during a period when the holding part 200 is horizontally shifted along the base section 192.

The base section 192 includes a circuit board 204, on which electronic components including a CPU (not shown) are mounted, and a support member 206 fixedly joined to the circuit board 204. The circuit board 204 has a generally flat major surface 204a. The support member 206 is a plate-like element having a generally square profile as shown in a plan view, and is mounted on the surface 204a of the circuit board 204 with substantially no gap defined between the support member 206 and the surface 204a. The support member 206 includes a support portion 208, in a generally circular center recessed region, for supporting the holding part 200 of the operating section 194 slidably in the desired horizontal direction. In the illustrated embodiment, the "horizontal direction" means a direction substantially parallel to the surface 204a of the circuit board 204, and thus the support portion 208 of the support member 206 is provided on an upper side thereof, facing away from the circuit board 204, with a flat circular support surface 208a extending substantially parallel to the surface 204a of the circuit board 204. The support surface 208a serves to support the holding part 200 slidably in the desired horizontal direction at a position projecting from the surface 204a of the circuit board 204.

The support member 206 further includes a cylindrical wall 210 extending in such a direction as to surround the support surface 208a, the wall 210 defining a horizontal shifting range of the holding part 200 of the operating section 194. The wall 210 is formed integrally with the support portion 208 to project to a position higher than the support surface 208a in relation to the surface 204a of the circuit board 204. The elastic part 202 is fitted to the support member 206 with a peripheral portion of the elastic part 202 surrounding the cylindrical wall 210, as described later. A center axis of the cylindrical wall 210, passing through a geometrical center of the support surface 208a, constitutes a center axis P of the pointing device 190 and defines a home position in the horizontal shifting range of the holding part 200 along the support surface 208a. The support member 206 is further provided integrally at a generally center of a back side of the support portion 208, opposite to the support surface 208a, with a positioning pin 212 projecting opposite to the wall 210. The support member 206 is securely assembled with the circuit board 204 at a predetermined position thereon, with the positioning pin 212 being fitted into an aperture 214 formed correspondingly in the circuit board 204. In this respect, an adhesive may be additionally used for firmly fix the support member 206 to the circuit board 204.

Four magneto-electro transducers 198 are mounted on the back surface 204b opposite to the surface 204a of the circuit board 204 at regular intervals in a circumferential direction about the center axis P. This configuration of the magneto-electro transducers 198 is provided for allowing the pointing device 190 to output an analog data signal in a two-dimensional coordinate system.

The base section 192 further includes a cover member 216 fixedly joined to the support member 206 so as to substantially cover or hide an outer peripheral region 206a of the support member 206. The cover member 216 is a thin plate element having a generally square profile as shown in a plan view, corresponding to the support member 206, and includes an end plate 216a defining, at a center region thereof, a generally circular center opening 218, through which a major operating portion of the operating section 194, as described later, is inserted in a horizontally shiftable manner. The cover member 216 is further provided integrally at an outer periphery thereof with extensions 220 disposed along four sides of the end plate 216a and extending generally orthogonal to the latter. Each extension 220 is provided with a fitting aperture 222 penetrating through the thickness of the extension 220. The cover member 216 is securely assembled with the support member 206, with laterally projecting plural pawls 224, formed respectively on four peripheral sides of the support member 206, being fitted into the corresponding apertures 222 of the extensions 220 in a snap-fit manner using the elastic deformation of the extensions 220. The cover member 216 serves to retain the operating section 194 so as to prevent the latter from being removed from the base section 192, in a condition where the major operating portion of the operating section 194 projects outward through the center opening 218. The cover member 216 having the above structure may be made of a desired sheet metal.

In the illustrated embodiment, the holding part 200 and the elastic part 202 of the operating section 194 are produced independently from each other as separate members, and are securely assembled together. The holding part 200 is a hollow cylindrical member, and has rigidity for substantially eliminating a deformation thereof during a period when the operating section 194 is operated to shift in the horizontal direction on the base section 192. The holding part 200 includes a cylindrical outer circumferential wall 226 and an annular flange portion 228 extending radially outward from an axial or lower end of the circumferential wall 226, a recess 226a for accommodating the magnet 196 being provided inside the circumferential wall 226. The magnet 196 may be fixed in the recess 226a of the holding part 200 by adhering or press-fitting the magnet 196. The holding part 200 is capable of shifting, in a parallel translation manner, on the support surface 208a of the support member 206 of the base section 192 so as to be two-dimensionally slidable over 360 degrees about the center axis P, with an axial end face of the flange portion 228 being uniformly abutted to the support surface 208a. This configuration can advantageously reduce friction in an interface between the holding part 200 and the support surface 208a, and thereby improves the horizontal shifting operability of the operating section 194.

A yoke 230 is fitted to the holding part 200 and is interposed between the magnet 196 and the elastic part 202. The yoke 230 is a cap-shaped member having a generally circular profile in a plan view, and includes a disk-shaped end wall 230a and a cylindrical circumferential wall 230b axially extending from the outer periphery of the end wall 230a. The yoke 230 covers or hides the magnet 196 received in the holding part 200 with the end wall 230a located over the magnet 196, and is fitted to the holding part 200 with the circumferential wall 230b encircling the circumferential wall 226 of the holding part 200. The yoke 230 may be fixed on the circumferential wall 226 of the holding part 200 by adhering or press-fitting the yoke 230. The yoke 230 is made of a desired magnetic metal, and serves to positively close a magnetic circuit between the magnet 196 and the magneto-electro transducers 198, so as to prevent a magnetic leakage through the elastic part 202 to the outside. The yoke 230 is thus effectively and advantageously incorporated into, especially, the low-profile type pointing device 190.

The elastic part 202 is a basin-shaped member, and has elasticity for permitting a relatively easy elastic deformation thereof during a period when the operating section 194 is operated to shift in the horizontal direction on the base section 192. The elastic part 202 is provided integrally with a major portion 232 extending around the holding part 200 with a gap defined therebetween, a first connecting portion 234 connected to the holding part 200 at one end of the major portion 232 and a second connecting portion 236 connected to the base section 192 at another end of the major portion 232. The major portion 232 of the elastic part 202 has a truncated conical or dome-shaped profile for surrounding substantially an entire circumference of the holding part 200 and is disposed coaxially with the holding part 200 during a non-load condition of the elastic part 202. Accordingly, the elastic part 202 is elastically deformed in the major portion 232 due to the horizontal shifting motion of the holding part 200 on the base section 192, and thereby exerts, in the major portion 232, an even elastic biasing force irrespective of the horizontal shifting direction of the holding part 200.

The first connecting portion 234 of the elastic part 202 extends integrally and projects axially convexly from a smaller diameter end of the major portion 232 having a truncated conical profile, so as to form a recess inside the first connecting portion 234, into which the yoke 130 attached to the holding part 200 is securely fitted. The first connecting portion 234 of the elastic part 202 may be fixed by an adhesion or a press-fit with the yoke 230. The first connecting portion 234 extends to cover the end and circumferential walls 230a, 230b of the yoke 230 in close contact therewith, and an operating surface 238, on which an operator touches with, e.g., his finger for the shifting operation of the operating section 194, is formed on the outer surface of the first connecting portion 234.

The second connecting portion 236 of the elastic part 202 extends integrally and projects axially and radially from a larger diameter end of the major portion 232 having a truncated conical profile, so as to form a thickened peripheral flange capable of being securely held and anchored between an outside annular groove region 210a of the cylindrical wall 210 of the support member 206 and the end plate 216a of the cover member 216, the members 206, 216 constituting the base section 192. The first and second connecting portions 234, 236 serve to fixedly connect the elastic part 202 to the holding part 200 and the base section 192, respectively, without substantially being deformed during the horizontal shifting motion of the holding part 200 on the base section 192.

The elastic part 202 may be made from various elastic materials, such as a synthetic rubber or a natural rubber. In consideration of a reflow soldering performed in a mounting process of the pointing device 190 onto a main circuit board of electronic equipment, it is advantageous that the elastic part 202 is made from a material having a certain heat resistance, such as a silicone rubber, for preventing a quality deterioration thereof in a high temperature environment. On the other hand, the holding part 200 may be made of plastic, metal, and so forth.

When the above-described components are properly assembled with each other, the operating section 194 is arranged in such a configuration that the major portion 232 and the first connecting portion 234 of the elastic part 202 are inserted through the center opening 218 of the cover member 216 of the base section 192 in a horizontally shiftable manner, and that the first connecting portion 234 connected through the yoke 230, to the holding part 200, is located to project outward from the end plate 216a of the cover member 216 of the base section 192. In this condition, an operator can manipulate the operating surface 238 provided in the first connecting portion 234 of the elastic part 202 with, e.g., his finger, so as to horizontally shift the holding part 200 on the base section 192.

As shown in FIG. 29, during a period when the elastic part 202 of the operating section 194 is a non-loaded or balanced condition, a center axis Q of the holding part 200 and the magnet 196 held in the recess 226a coincides with the center axis P of the pointing device 190. In this state, the holding part 200 is located at a home position in the horizontal shifting range on the support member 206 of the base section 192, and four magneto-electro transducers 198 mounted on the circuit board 204 are positioned equidistantly from the magnet 196. From this state, when the operator touches the operating surface 238 with his finger and shifts in a parallel translation manner the holding part 200 in a desired horizontal direction, the major portion 232 of the elastic part 202 is elastically deformed in correspondence with the shifting direction and shifting amount or distance of the holding part 200 in a circumferentially uneven mode. As a result, the elastic part 202 exerts a resultant elastic force in the major portion 232 in its entirety, so as to bias the holding part 200 in a direction opposite to the shifting direction. The operator thus manipulates the operating section 194 to horizontally shift it against a spring biasing force generated by the major portion 232 of the elastic part 202.

As described above, the pointing device 190 includes the base and operating sections 192, 194 having substantially the same function as the base and operating sections 12, 14 in the pointing device 10, so that it is possible to enter analogue information corresponding to the shifting direction and shifting amount of the operating section 194, in a shifting operation similar to the pointing device 10. Particularly, in the pointing device 190, the respective components of the base and operating sections 192, 194 are reduced in thickness, and the magneto-electro transducers 198 are mounted on the back surface 204b of the circuit board 204, which provides a lower-profile construction for the pointing device 190 in its entirety, in comparison with the pointing device 10.

Figure 30:
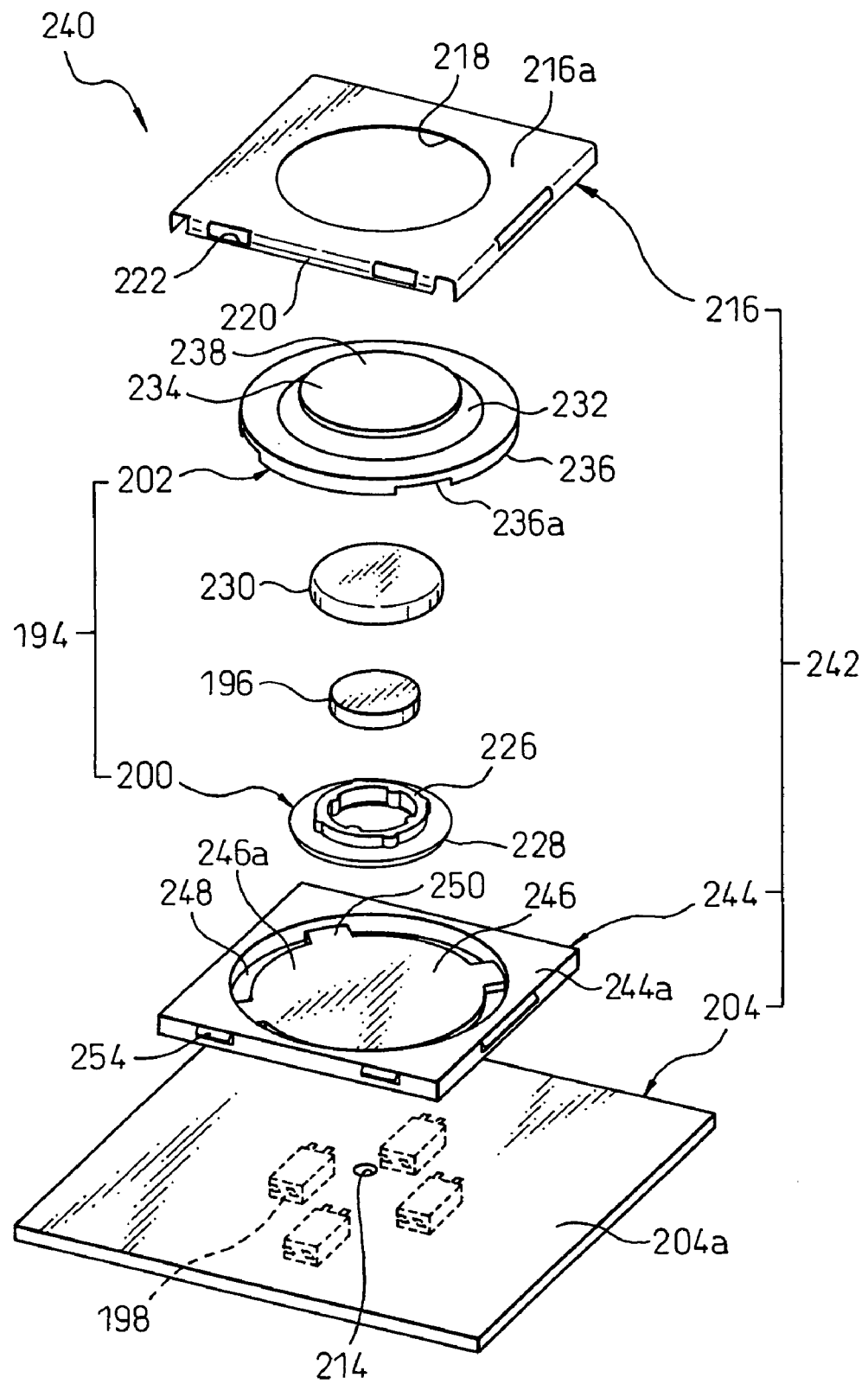
FIG. 30 is an exploded perspective view of a pointing device according to a seventh embodiment of the present invention.
Figure 31:
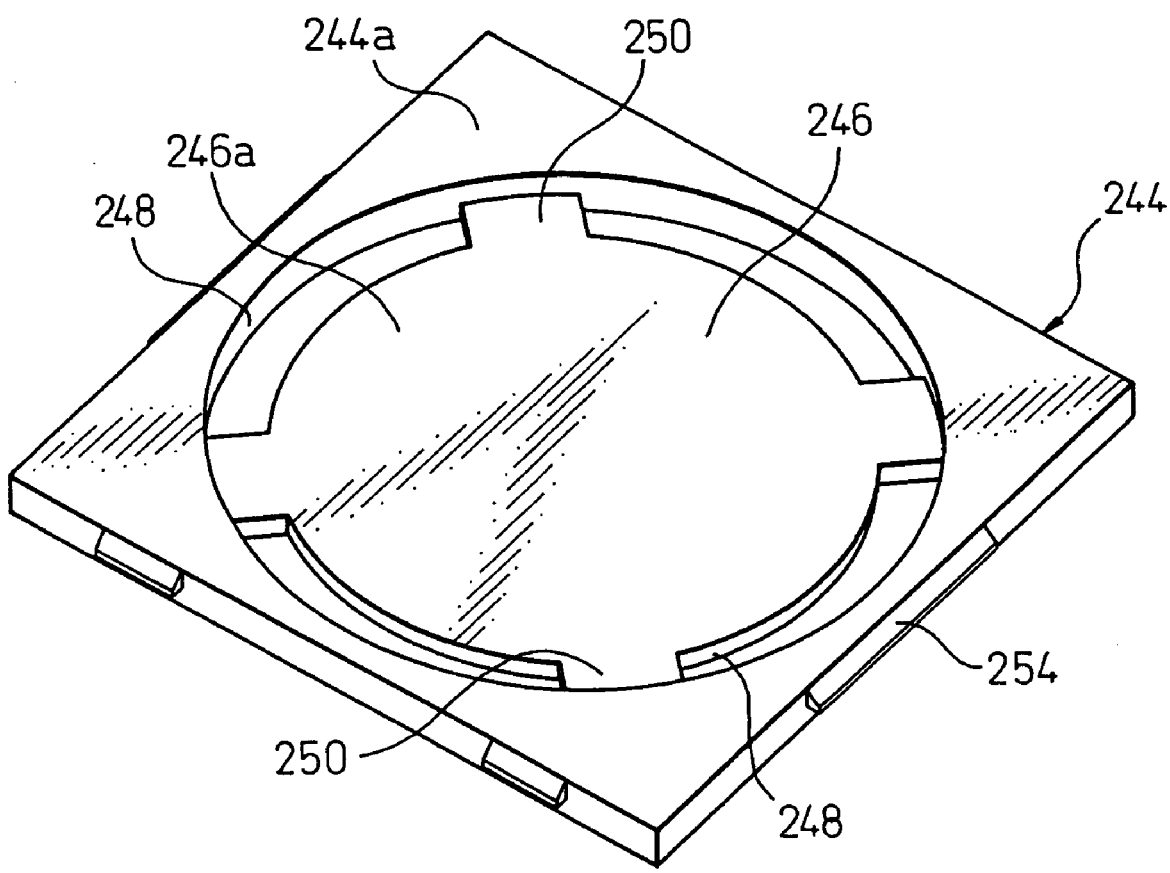
FIG. 31 is a perspective view of a support member arranged in the pointing device of FIG. 30.
Figure 32:
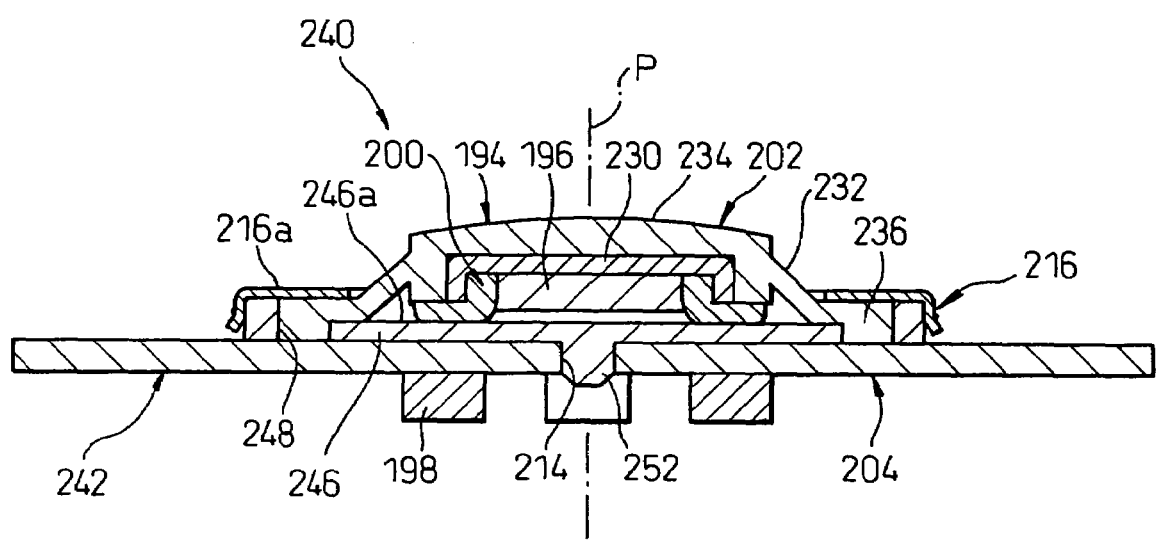
FIG. 32 is a vertical sectional view of the pointing device of FIG. 30, showing an operating section at a home position.

FIGS. 30 to 32 show a pointing device 240, according to the seventh embodiment of the present invention, capable of having a profile lower than the above-described pointing device 190. The pointing device 240 has substantially the same structure as the pointing device 190 of the sixth embodiment, except for the constitution of a support member joined to a circuit board of a base section, and thus corresponding components are denoted by the common reference numerals and an explanation thereof is not repeated.

The pointing device 240 includes a base section 242, an operating section 194 supported on the base section 242 shiftably in a desired horizontal direction in relation to the base section 242, a magnet 196 carried on the operating section 194, and a plurality of magneto-electro transducers 198 carried on the base section 242 at locations close to the magnet 196. The base section 242 includes a circuit board 204, on which electronic components including a CPU (not shown) are mounted, a support member 244 fixedly joined to the circuit board 204, and a cover member 216 fixedly joined to the support member 244 so as to substantially cover or hide an outer peripheral region 244a of the support member 244.

The support member 244 is a plate-like element having a generally square profile as shown in a plan view, and is mounted on the surface 204a of the circuit board 204 with substantially no gap defined between the support member 244 and the surface 204a. The support member 244 includes a support portion 246, in a generally circular center recessed region, for supporting the holding part 200 of the operating section 194 slidably in the desired horizontal direction. The support portion 246 of the support member 244 is provided on an upper side thereof, facing away from the circuit board 204, with a flat circular support surface 246a extending substantially parallel to the surface 204a of the circuit board 204. The support surface 246a serves to support the holding part 200 slidably in the desired horizontal direction at a position projecting from the surface 204a of the circuit board 204.

The support member 244 further includes a plurality (four, in the drawing) of arcuate grooves 248 extending in such a direction as to surround the support surface 246a, the grooves 248 defining a horizontal shifting range of the holding part 200 of the operating section 194. The grooves 248 are recessed to a position lower than the support surface 246a in relation to the surface 204a of the circuit board 204. In the illustrated embodiment, the support portion 246 and the outer peripheral region 244a of the support member 244 are joined integrally with each other through a plurality (four, in the drawing) of joint pieces 250 disposed at circumferential regular intervals around the support surface 246a, so that the grooves 248, spaced from each other through the joint pieces 250 along a common circle around the support surface 246a, are formed to penetrate through the thickness of the support member 244.

A center axis of the grooves 248, passing through a geometrical center of the support surface 246a, constitutes a center axis P of the pointing device 240 and defines a home position in the horizontal shifting range of the holding part 200 along the support surface 246a. The holding part 200 is capable of shifting, in a parallel translation manner, on the support surface 246a of the support member 244 so as to be two-dimensionally slidable over 360 degrees about the center axis P, with an axial end face of the flange portion 228 being uniformly abutted to the support surface 246a.

The support member 244 is further provided integrally with a positioning pin 252 projecting from a back side of the support portion 246, opposite to the support surface 246a, generally at the center thereof. The support member 244 is securely assembled with the circuit board 204 at a predetermined position thereon, with the positioning pin 252 being fitted into an aperture 214 formed correspondingly in the circuit board 204. Further, the cover member 216 is securely assembled with the support member 244, with laterally projecting plural pawls 254 formed respectively on four peripheral sides of the support member 244 being fitted into the corresponding apertures 222 of the extensions 220 in a snap-fit manner.

The elastic part 202 is fitted to the base section 242 through an interengagement between the second connecting portion 236 and the grooves 248. That is, the second connecting portion 236 of the elastic part 202 is inserted at the thickened peripheral flange thereof into the grooves 248 of the support member 244, so as to be securely held and anchored between the grooves 248 and the end plate 216a of the cover member 216. To this end, the second connecting portion 236 of the elastic part 202 is provided in the bottom face of the thickened peripheral flange with a plurality of cut-outs 236a for individually receiving the joint pieces 250 of the support member 244, located correspondingly to the joint pieces 250. The first and second connecting portions 234, 236 of the elastic part 202 serve to fixedly connect the elastic part 202 to the holding part 200 and the base section 242, respectively, without substantially being deformed during the horizontal shifting motion of the holding part 200 on the base section 242.

The pointing device 240 is capable of entering analogue data by operating the operating section 194 to horizontally shift it on the base section 242, in a way similar to the pointing device 190. Particularly, the pointing device 240 adopts the construction wherein the support member 244 of the base section 242 is provided with the grooves 248 recessed to a position lower than the support surface 246a, instead of the cylindrical wall 210 formed in the support member 206 of the pointing device 190, and the elastic part 202 is fitted to the support member 244 with the second connecting portion 236 being inserted into the grooves 248, so that it is possible to further reduce the thickness of the support member 244. Accordingly, in the pointing device 240, it is possible to more effectively reduce the dimensions thereof, especially in a height direction, in comparison with the pointing device 190.

Figure 33:
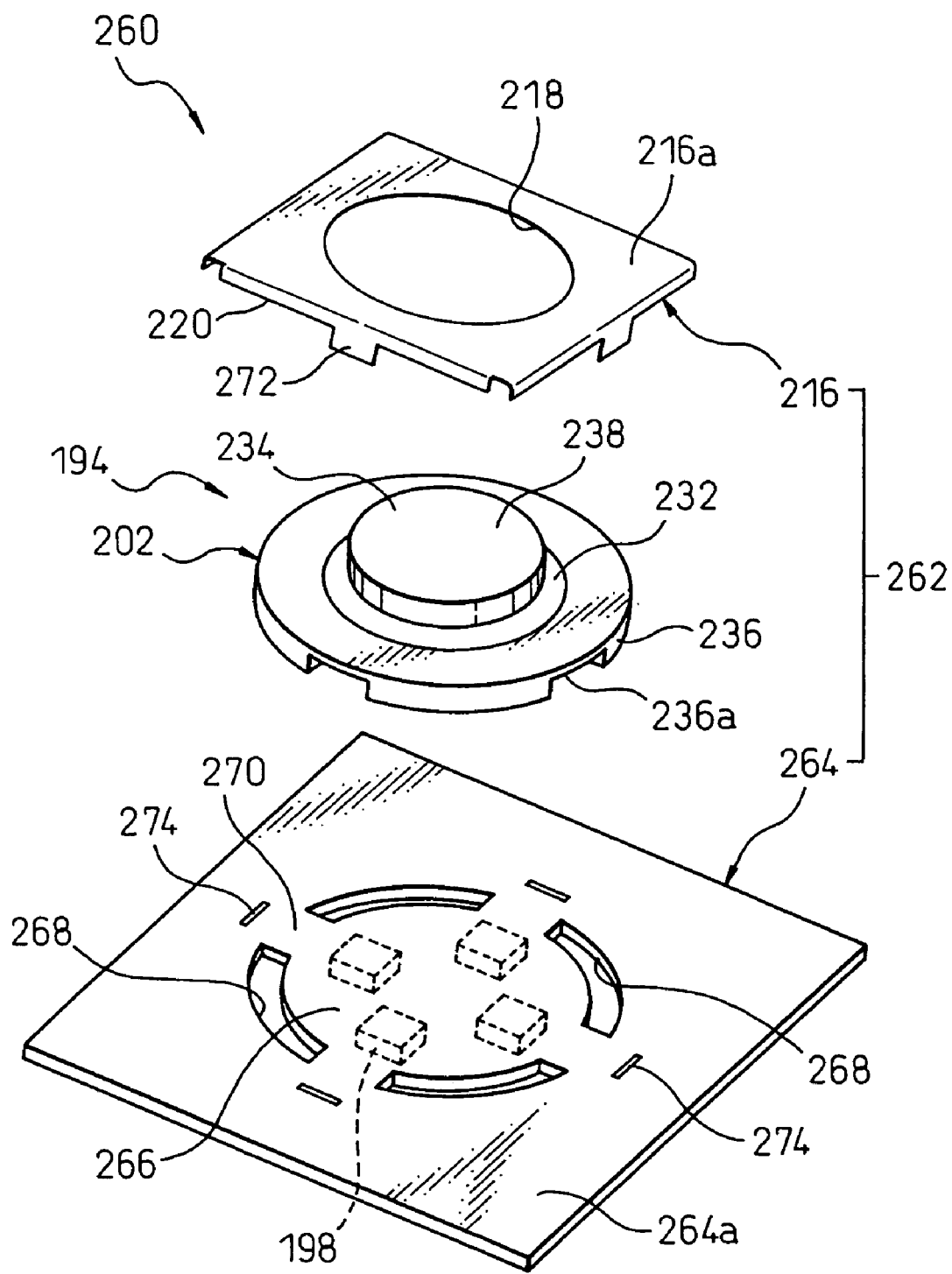
FIG. 33 is an exploded perspective view of a pointing device according to an eighth embodiment of the present invention.
Figure 34:
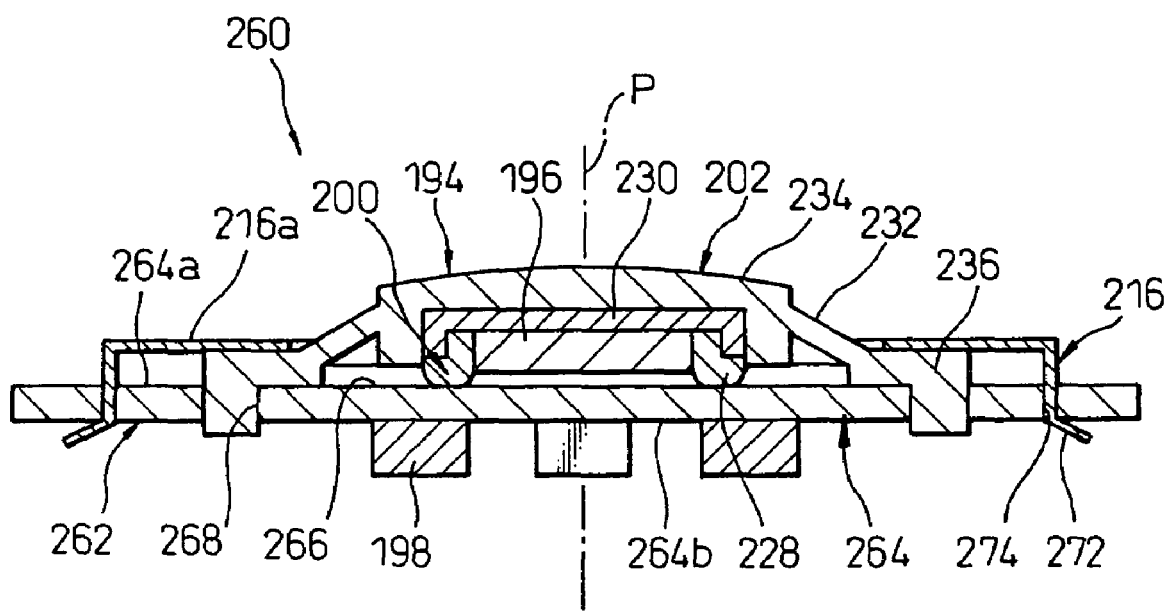
FIG. 34 is a vertical sectional view of the pointing device of FIG. 33, showing an operating section at a home position.
Figure 35:
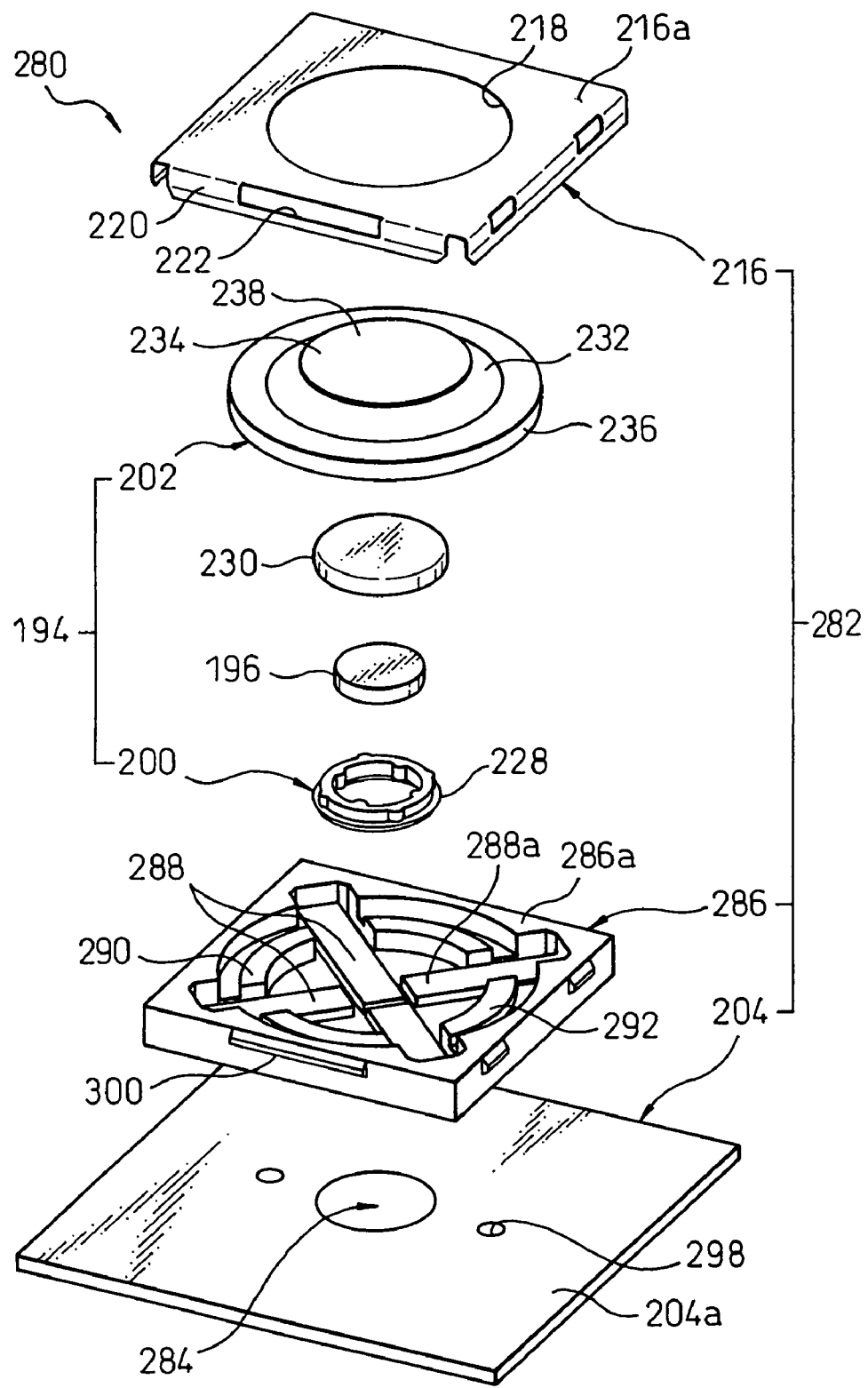
FIG. 35 is an exploded perspective view of a pointing device according to a ninth embodiment of the present invention.
Figure 36A:
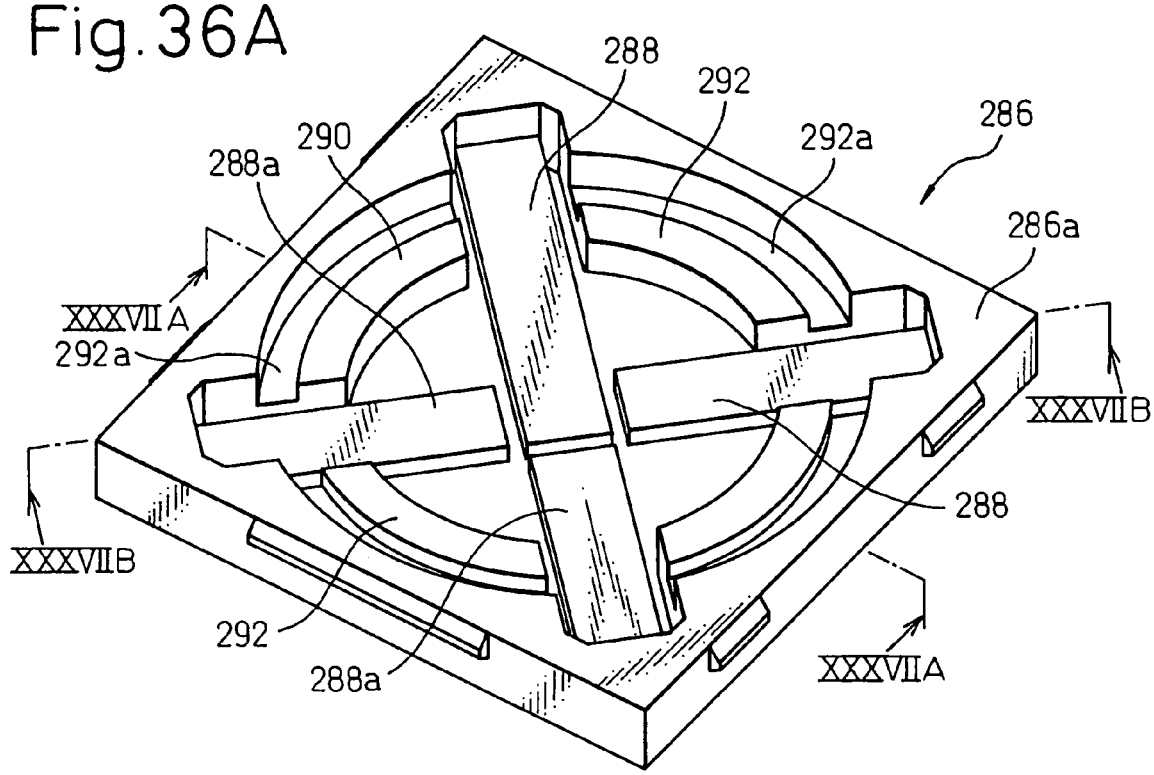
FIG. 36A is a top-side perspective view of a support member arranged in the pointing device of FIG. 35.
Figure 36B:
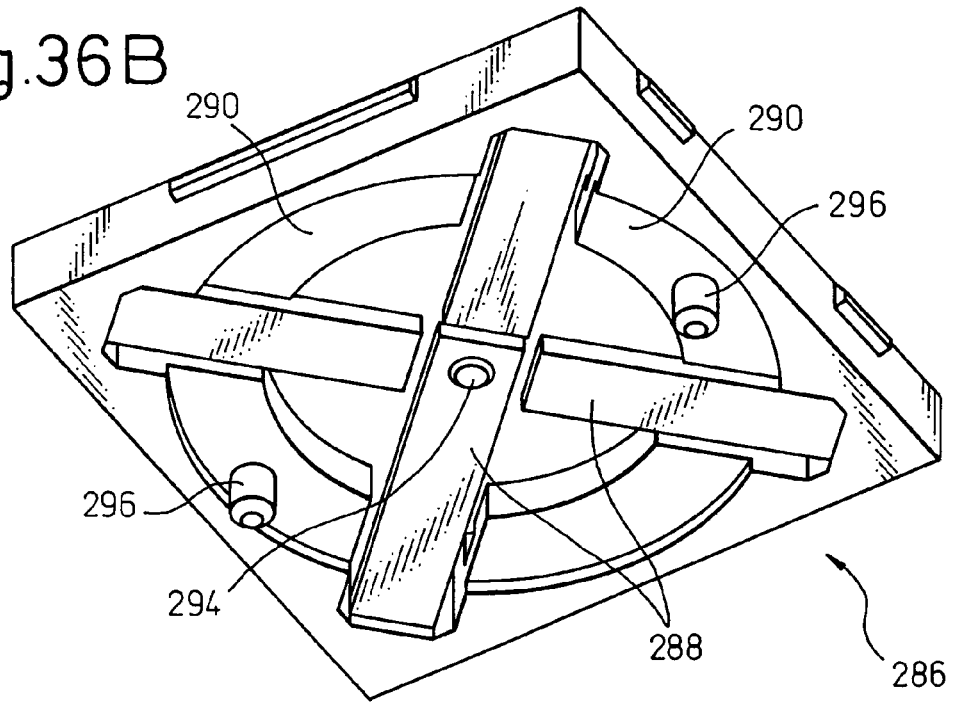
FIG. 36B is a bottom-side perspective view of the support member of FIG. 36A.

FIGS. 33 and 34 show a pointing device 260, according to the eighth embodiment of the present invention, capable of having a profile lower than the above-described pointing device 240. The pointing device 260 has substantially the same structure as the pointing device 190 of the sixth embodiment, except for the constitution of a base section, and thus corresponding components are denoted by the common reference numerals and an explanation thereof is not repeated.

The pointing device 260 includes a base section 262, an operating section 194 supported on the base section 262 and shiftable in a desired horizontal direction in relation to the base section 262, a magnet 196 carried on the operating section 194, and a plurality of magneto-electro transducers 198 carried on the base section 262 at locations close to the magnet 196. The base section 262 includes a circuit board 264, on which electronic components including a CPU (not shown) are mounted, and a cover member 216 fixedly joined to the circuit board 204 so as to securely connect the elastic part 202 of the operating section 194 with the base section 262. Therefore, no separate support member for slidably supporting the holding part 200 of the operating section 194 is provided in the base section 262.

The circuit board 264 is provided in a desired circular region in the surface 264a thereof with a flat support surface 266 for supporting the holding part 200 of the operating section 194 slidably in the desired horizontal direction. The circuit board 264 is also provided with a plurality (four, in the drawing) of arcuate slots 268 extending in such a direction as to surround the support surface 266, the slots 268 defining a horizontal shifting range of the holding part 200 of the operating section 194. The slots 268 are located along a common circle around the support surface 266 separately from each other, and are formed to penetrate through the thickness of the circuit board 264. The circuit board 264 is further provided as a part thereof with joint pieces 270 disposed between the circumferentially adjacent slots 268.

A center axis of the slots 268, passing through a geometrical center of the support surface 266, constitutes a center axis P of the pointing device 260 and defines a home position in the horizontal shifting range of the holding part 200 along the support surface 266. The holding part 200 is capable of shifting, in a parallel translation manner, on the support surface 266 of the circuit board 264 so as to be two-dimensionally slidable over 360 degrees about the center axis P, with an axial end face of the flange portion 228 being uniformly abutted to the support surface 266. Four magneto-electro transducers 198 are mounted on the back surface 264b opposite to the surface 264a of the circuit board 264 at regular intervals in a circumferential direction about the center axis P. In this embodiment, the cover member 216 includes inserts 272 projecting from the extensions 220 disposed along four sides of the end plate 216a, instead of the apertures 222 (FIG. 27). The cover member 216 is securely assembled with the circuit board 204 with the inserts 272 being respectively inserted into slits 274 formed correspondingly in the circuit board 264 and bent into a suitable shape.

The elastic part 202 is fitted to the base section 262 through an interengagement between the second connecting portion 236 and the slots 268. That is, the second connecting portion 236 of the elastic part 202 is inserted at the thickened peripheral flange thereof into the slots 268 of the circuit board 264, so as to be securely held and anchored between the slots 268 and the end plate 216a of the cover member 216. To this end, the second connecting portion 236 of the elastic part 202 is provided in the bottom face of the thickened peripheral flange with a plurality of cut-outs 236a for individually receiving the joint pieces 270 of the circuit board 264, located correspondingly to the joint pieces 270. The first and second connecting portions 234, 236 of the elastic part 202 serve to fixedly connect the elastic part 202 to the holding part 200 and the base section 262, respectively, without substantially being deformed during the horizontal shifting motion of the holding part 200 on the base section 262.

The pointing device 260 is capable of entering analogue data by operating the operating section 194 to horizontally shift it on the base section 262, in a way similar to the pointing device 190, 240. Particularly, the pointing device 260 is constructed so that the support member 206, 244 is eliminated and the support surface 266 is formed directly in the surface 264a of the circuit board 264 onto which the holding part 200 of the operating section 194 is directly placed, so that it is possible to more effectively reduce the dimension thereof, especially in a height direction, in comparison with the pointing device 190, 240.

FIGS. 35 to 37B show a pointing device 280, according to the ninth embodiment of the present invention, having a low-profile structure and a click function. The pointing device 280 has substantially the same structure as the pointing device 190 of the sixth embodiment, except for the constitution of a support member joined to a circuit board of a base section as well as the provision of a switch mechanism incorporated for an additional click operation, and thus corresponding components are denoted by the common reference numerals and an explanation thereof is not repeated. The pointing device 280 also has substantially the same basic structure as the pointing device 80 of the third embodiment from the viewpoint of an operating function.

The pointing device 280 includes a base section 282, an operating section 194 supported on the base section 282 shiftably in a desired horizontal direction in relation to the base section 282, a magnet 196 carried on the operating section 194, a plurality of magneto-electro transducers 198 carried on the base section 282 at locations close to the magnet 196, and a switch mechanism 284 arranged between the base section 282 and the operating section 194. The base section 282 includes a circuit board 204, on which electronic components including a CPU (not shown) are mounted, a support member 286 fixedly joined to the circuit board 204, and a cover member 216 fixedly joined to the support member 286 so as to substantially cover or hide the outer peripheral region 286a of the support member 286.

The support member 286 is a plate-like element having a generally square profile as shown in a plan view, and includes integrally, in a generally circular center recessed region thereof, a plurality (four, in the drawing) of elastic beams 288 located at a position spaced from the surface 204a of the circuit board 204. The elastic beams 288 cooperate with each other to constitute a support portion for supporting the holding part 200 of the operating section 194 slidably in the desired horizontal direction. The elastic beams 288 of the support member 286 are provided respectively on upper sides thereof, facing away from the circuit board 204, with flat support surfaces 288a extendable substantially parallel to the surface 204a of the circuit board 204 during non-loaded condition of the elastic beams 288. The support surfaces 288a serve to support the holding part 200 slidably in the desired horizontal direction at a position projecting from the surface 204a of the circuit board 204.

The elastic beams 288 of the support member 286 extend in a radial direction about the center axis P of the pointing device 280, and are capable of being elastically bent or displaced, independently from each other, with the radial outer ends thereof being fixed. Particularly, in this embodiment, the elastic beams 288 are fixed at the radial outer ends thereof to the respective four corner regions of the generally square profile of the support member 286 and radially extend therefrom, which makes it possible to provide a maximum length for each elastic beam 288 even in the support member 286 having reduced size and height. As a result, it is possible to increase the elasticity of the elastic beams 288 and to decrease a pressing force required for actuating the switch mechanism 284.

The support member 286 is further provided with fitting portions 290 having generally sectorial shapes, each fitting portion 290 extending between the proximal end regions of circumferentially adjacent two elastic beams 288 The fitting portions 290 are provided at the radial inner or distal ends thereof with arcuate upright walls 292 respectively extending in such a direction as to surround the support surfaces 288a of the elastic beams 288. The arcuate walls 292 are formed integrally with the fitting portions 290 so as to project to a position higher than the support surfaces 288a in relation to the surface 204a of the circuit board 204, and thereby define a horizontal shifting range of the holding part 200 of the operating section 194. The elastic part 202 is fitted to the support member 286 with the second connecting portion 236 surrounding all of the arcuate walls 292 of the fitting portions 290, as described later. The arcuate walls 292 are located along a common circle about the center axis P, and thus the center axis P defines a home position in the horizontal shifting range of the holding part 200 on the support surfaces 288*a*. The holding part 200 is capable of shifting, in a parallel translation manner, on the support surfaces 288*a* of the elastic beams 288 so as to be two-dimensionally slidable over 360 degrees about the center axis P, with an axial end face of the flange portion 228 being uniformly abutted to the support surfaces 288*a*.

Desired one of the elastic beams 288 is provided, at the radial inner or free end thereof, with a bump 294 as a pushing point, locally protruding from a back side opposite to the support surface 288*a*. The elastic beam 288 with the bump 294 has a radial length larger than those of the other elastic beams 288, so as to extend across the center axis P of the pointing device 280. As a result, the bump 294 is located on the center axis P of the pointing device 280.

The support member 286 is further provided integrally at the back sides of the mutually opposed fitting portions 290 with positioning pins 296 projecting oppositely to the arcuate walls 292. The support member 286 is securely assembled with the circuit board 204 at a predetermined position thereon, with the positioning pins 296 being fitted into apertures 298 formed correspondingly in the circuit board 204. The cover member 216 is securely assembled with the support member 286, with laterally projecting plural pawls 300 formed respectively on four peripheral sides of the support member 286 being fitted into the corresponding fitting apertures 222 of the extensions 220 in a snap-fit manner.

The second connecting portion 236 of the elastic part 202 is securely held and anchored at the thickened peripheral flange thereof between the outside annular groove regions 292*a* of the respective arcuate walls 292 of the support member 286 and the end plate 216*a* of the cover member 216. The first and second connecting portions 234, 236 of the elastic part 202 serve to fixedly connect the elastic part 202 to the holding part 200 and the base section 282, respectively, without substantially being deformed during the horizontal shifting motion of the holding part 200 on the base section 282.

The switch mechanism 284 for additionally providing a click function is mounted onto the surface 204*a* of the circuit board 204 within a space defined between the circuit board 204 and the elastic beams 288 of the support member 286. The switch mechanism 284 has a known make/break structure including a movable contact and a stationary contact, the contacts being located substantially on the center axis P of the pointing device 280. The movable contact of the switch mechanism 284 is thus positioned just under the bump or pushing point 294 formed on one elastic beam 288 of the supporting member 286. Then, four magneto-electro transducers 198 are mounted on the back side 204*b* of the circuit board 204, opposite to the switch mechanism 284, at regular intervals in a circumferential direction about the center axis P.

The switch mechanism 284 having various structures may be used, such as a mechanical switch including a spring-biased movable contact, a membrane switch including a pair of flexible circuit boards, and so forth. The switch mechanism 284 also may have a smaller dimension to allow the magneto-electro transducers 198 to be arranged in the space between the circuit board 204 and the elastic beams 288.

Figure 37A:
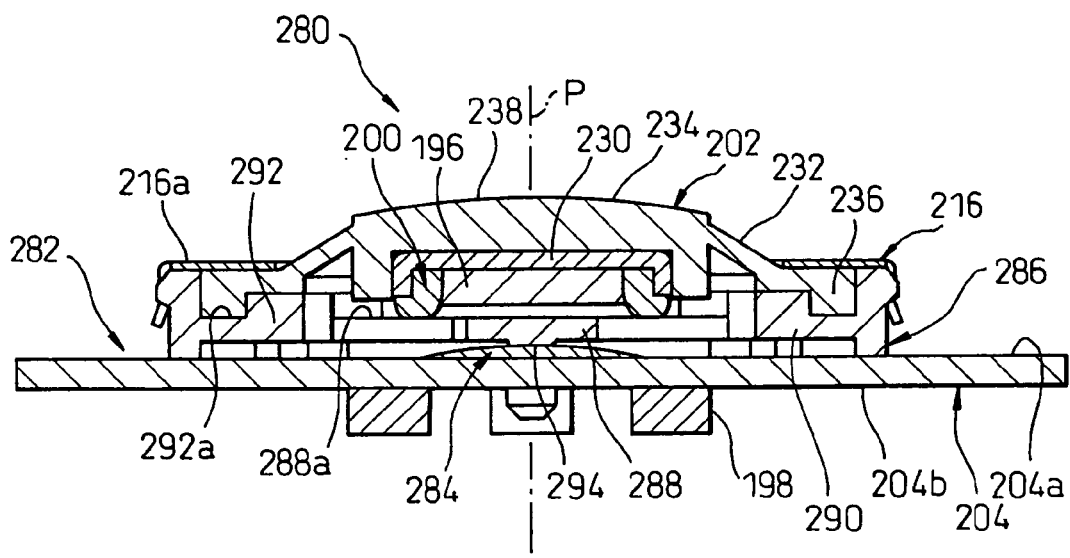
FIG. 37A is a vertical sectional view of the pointing device of FIG. 35, taken along a line XXXVIIA-XXXVIIA in FIG. 36A.
Figure 37B:
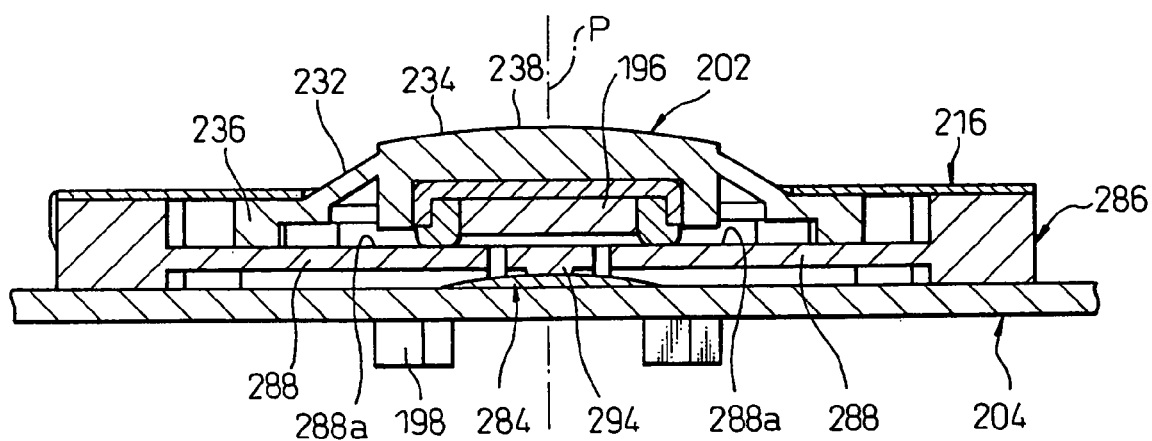
FIG. 37B is a vertical sectional view of the pointing device of FIG. 35, taken along a line XXXVIIB-XXXVIIB in FIG. 36A.

In the pointing device 280, it is possible for the operator to push the operating surface 238 of the operating section 194 downward with, e.g., his finger in the home position as shown in FIGS. 37A and 37B, and to force the flange portion 228 of the holding part 200 against the elastic beams 288, so as to make or close the switch mechanism 284 located beneath the elastic beams 288. In the illustrated embodiment, when the operating section 194 is pressed downward, the respective elastic beams 288 are elastically bent about the radial outer or proximal fixed ends thereof, and thereby the bump 294 formed on the longer elastic beam 288 pushes the underlying switch mechanism 284 to actuate the latter.

As described above, the pointing device 280 includes the base and operating sections 282, 194 having substantially the same function as the base and operating sections 82, 14 in the pointing device 80, so that it is possible to enter analogue information corresponding to the shifting direction and shifting amount of the operating section 194, as well as to perform, e.g., a click operation for a pointer on a display screen in electronic equipment into which the pointing device 280 is installed, in an operation similar to the pointing device 80. Particularly, in the pointing device 280, the respective components of the base and operating sections 282, 194 are reduced in thickness, which provides a lower-profile construction for the pointing device 280 in its entirety, in comparison with the pointing device 80.

Figure 38:
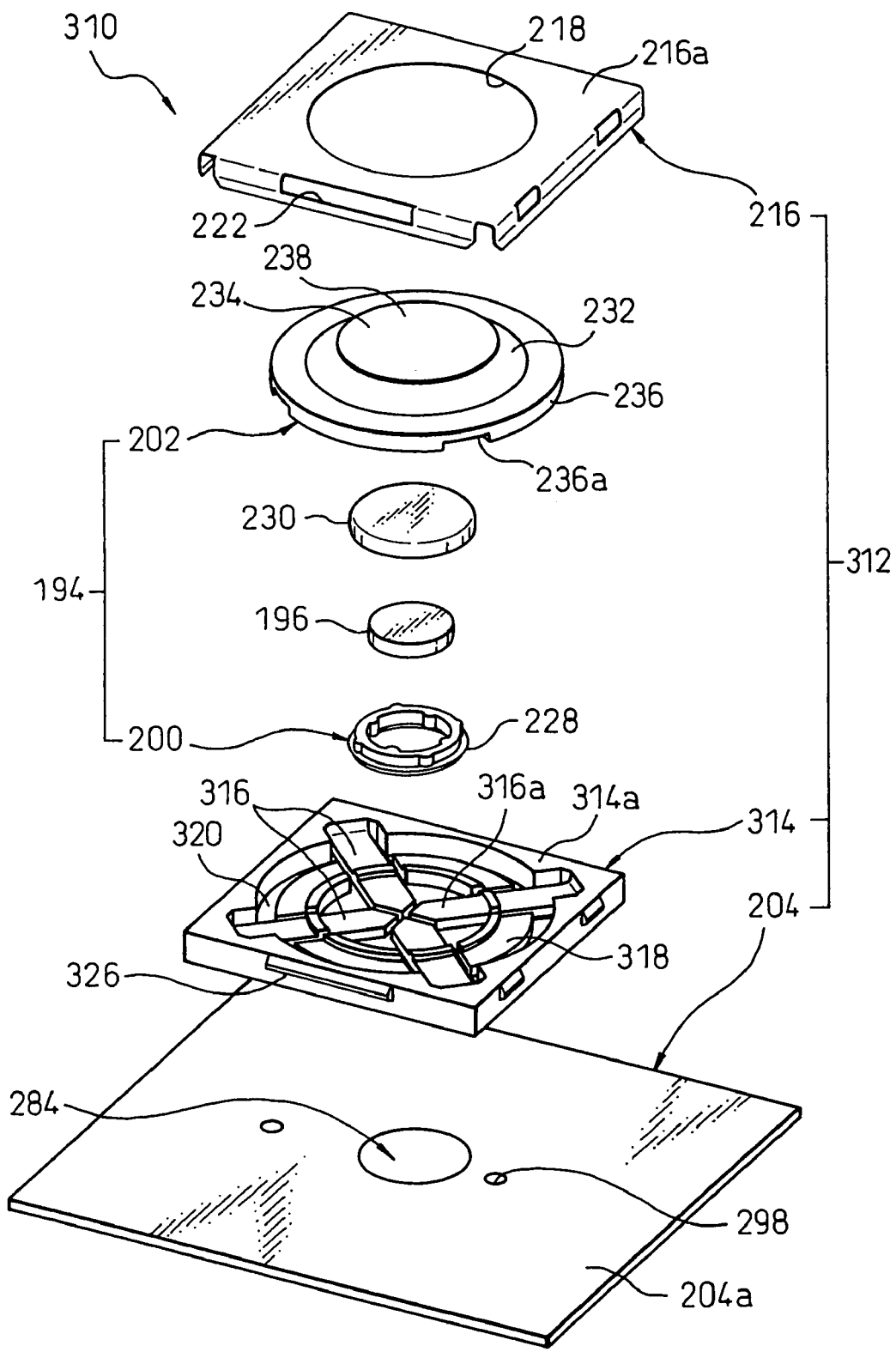
FIG. 38 is an exploded perspective view of a pointing device according to a tenth embodiment of the present invention.
Figure 39A:
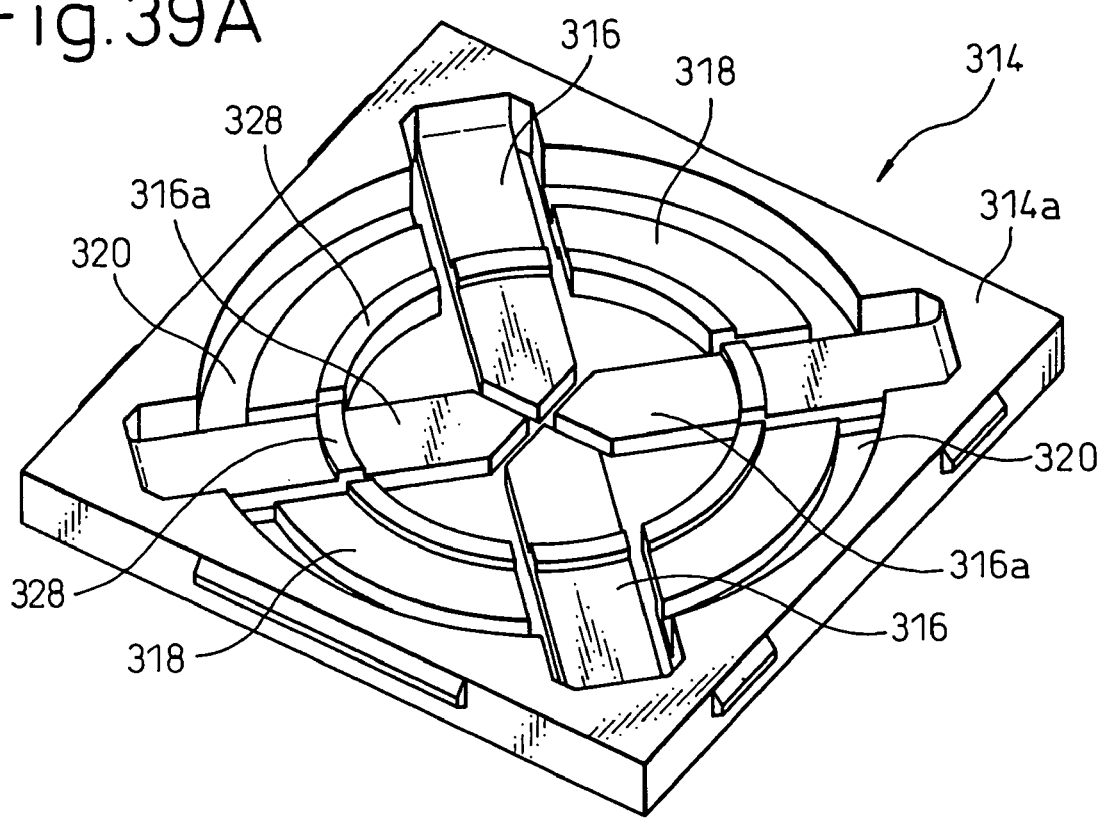
FIG. 39A is a top-side perspective view of a support member arranged in the pointing device of FIG. 38.
Figure 39B:
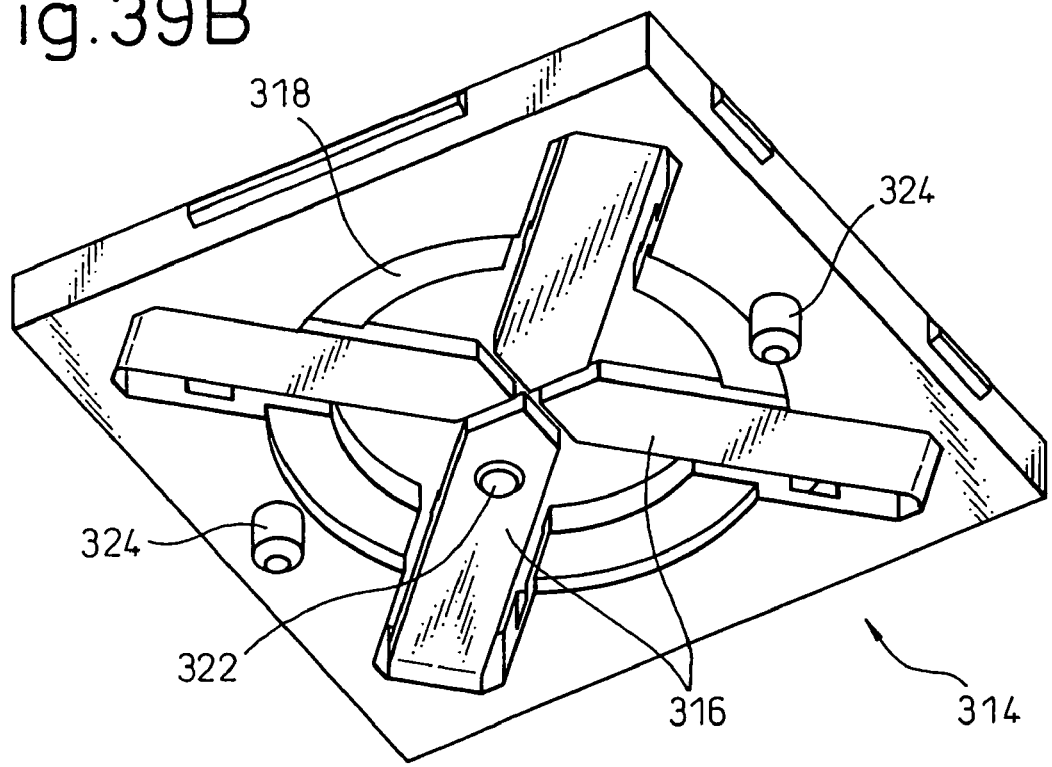
FIG. 39B is a bottom-side perspective view of the support member of FIG. 39A.
Figure 40A:
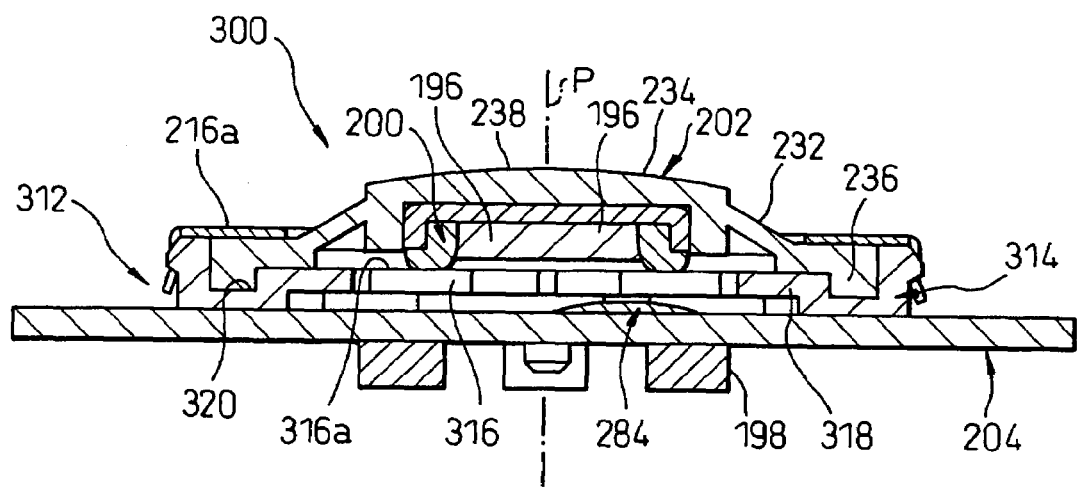
FIG. 40A is a vertical sectional view of the pointing device of FIG. 38, taken along a line XXXXA-XXXXA in FIG. 41.
Figure 40B:
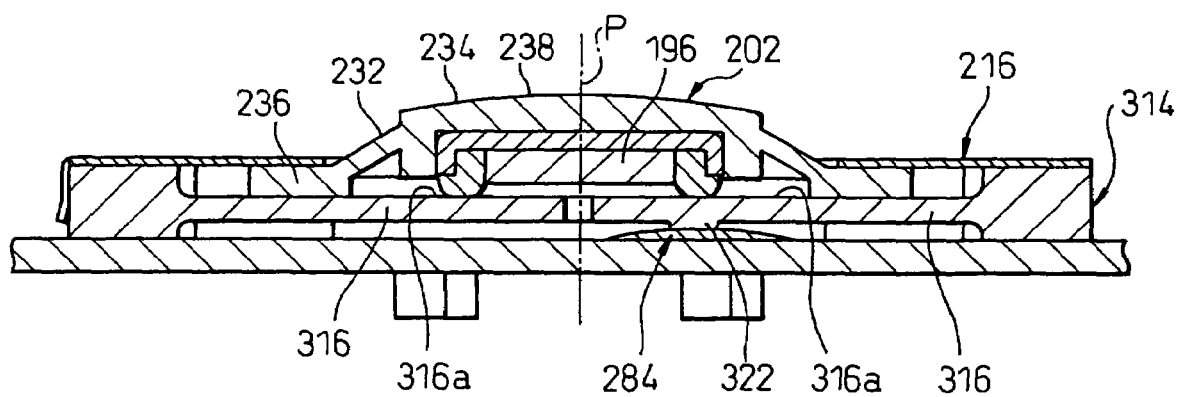
FIG. 40B is a vertical sectional view of the pointing device of FIG. 38, taken along a line XXXXB-XXXXB in FIG. 41.

FIGS. 38 to 40 show a pointing device 310, according to the tenth embodiment of the present invention, capable of having a profile lower than the above-described pointing device 280. The pointing device 310 has substantially the same structure as the pointing device 280 of the ninth embodiment, except for the constitution of a support member joined to a circuit board of a base section, and thus corresponding components are denoted by the common reference numerals and the explanation thereof is not repeated.

The pointing device 310 includes a base section 312, an operating section 194 supported on the base section 312 shiftably in a desired horizontal direction in relation to the base section 312, a magnet 196 carried on the operating section 194, a plurality of magneto-electro transducers 198 carried on the base section 312 at locations close to the magnet 196, and a switch mechanism 284 arranged between the base section 312 and the operating section 194. The base section 312 includes a circuit board 204, on which electronic components including a CPU (not shown) are mounted, a support member 314 fixedly joined to the circuit board 204, and a cover member 216 fixedly joined to the support member 314 so as to substantially cover or hide the outer peripheral region 314*a* of the support member 314.

The support member 314 is a plate-like element having a generally square profile as shown in a plan view, and includes integrally, in a generally circular center recessed region thereof, a plurality (four, in the drawing) of elastic beams 316 located at a position spaced from the surface 204*a* of the circuit board 204. The elastic beams 316 cooperate with each other to constitute a support portion for supporting the holding part 200 of the operating section 194 slidably in the desired horizontal direction. The elastic beams 316 of the support member 314 are provided respectively on upper sides thereof, facing away from the circuit board 204, with flat support surfaces 316*a* extendable substantially parallel to the surface 204*a* of the circuit board 204 during non-load condition of the elastic beams 316. The support surfaces 316*a* serve to support the holding part 200 slidably in the desired horizontal direction at a position projecting from the surface 204*a* of the circuit board 204.

The elastic beams 316 of the support member 314 extend in a radial direction about the center axis P of the pointing device 310, and are capable of being elastically bent or displaced, independently from each other, with the radial outer ends thereof being fixed. Particularly, in this embodiment, the elastic beams 316 are fixed at the radial outer ends thereof to the respective four corner regions of the generally square profile of the support member 314 and radially extend therefrom, which makes it possible to provide a maximum length for each elastic beam 316 even in the support member 314 having reduced size and height. As a result, it is possible to increase the elasticity of the elastic beams 316 and to decrease a pressing force required for actuating the switch mechanism 284. Also, in this embodiment, all the elastic beams 316 have identical radial lengths and are disposed symmetrically about the center axis P.

The support member 314 is further provided with fitting portions 318 having generally sectorial shapes, each fitting portion 318 extending between the proximal end regions of circumferentially adjacent two elastic beams 316. The fitting portions 318 are provided at the radial outer or proximal ends thereof with arcuate grooves 320 extending in such a direction as to surround the support surfaces 316a of the elastic beams 316. The grooves 320 are recessed to a position lower than the support surfaces 316a in relation to the surface 204a of the circuit board 204, and thereby define a horizontal shifting range of the holding part 200 of the operating section 194. The arcuate grooves 320 are located along a common circle about the center axis P, and thus the center axis P defines a home position in the horizontal shifting range of the holding part 200 on the support surfaces 316a. The holding part 200 is capable of shifting, in a parallel translation manner, on the support surfaces 316a of the elastic beams 316 so as to be two-dimensionally slidable over 360 degrees about the center axis P, with an axial end face of the flange portion 228 being uniformly abutted to the support surfaces 316a.

A desired one of the elastic beams 316 is provided at the radial inner or free end thereof with a bump 322 as a pushing point, locally protruding from a back side opposite to the support surface 316a. The bump 322 is located at a position radially displaced from the center axis P of the pointing device 310. On the other hand, the switch mechanism 284 mounted on the surface 204a of the circuit board 204 is positioned just under the bump 322 on one elastic beam 316 of the support member 314.

The support member 314 is further provided integrally at the back sides of the mutually opposed fitting portions 318 with positioning pins 324 projecting opposite to the arcuate grooves 320. The support member 314 is securely assembled with the circuit board 204 at a predetermined position thereon, with the positioning pins 324 being fitted into apertures 298 formed correspondingly in the circuit board 204. The cover member 216 is securely assembled with the support member 314, with laterally projecting plural pawls 326 formed respectively on four peripheral sides of the support member 314 being fitted into the corresponding fitting apertures 222 of the extensions 220 in a snap-fit manner.

The elastic part 202 is fitted to the base section 312 through an interengagement between the second connecting portion 236 and the grooves 320. That is, the second connecting portion 236 of the elastic part 202 is inserted at the thickened peripheral flange thereof into the grooves 320 of the support member 314, so as to be securely held and anchored between the grooves 320 and the end plate 216a of the cover member 216. To this end, the second connecting portion 236 of the elastic part 202 is provided in the bottom face of the thickened peripheral flange with a plurality of cut-outs 236a for individually receiving the proximal end regions of the elastic beams 316 of the support member 314, located correspondingly to the elastic beams 316. The first and second connecting portions 234, 236 of the elastic part 202 serve to fixedly connect the elastic part 202 to the holding part 200 and the base section 312, respectively, without substantially being deformed during the horizontal shifting motion of the holding part 200 on the base section 312.

The pointing device 310 is capable of entering analogue data by operating the operating section 194 to horizontally shift it on the base section 312, as well as of performing, e.g., a click operation for a pointer on a display screen in electronic equipment into which the pointing device 310 is installed, in a way similar to the pointing device 280. Particularly, the pointing device 310 adopts the construction wherein the support member 314 of the base section 312 is provided with the grooves 320 recessed to a position lower than the support surfaces 316a, instead of the arcuate walls 290 formed in the support member 286 of the pointing device 280, and the elastic part 202 is fitted to the support member 314 with the second connecting portion 236 being inserted into the grooves 320, so that it is possible to further reduce the thickness of the support member 314. Accordingly, in the pointing device 310, it is possible to more effectively reduce the dimension thereof, especially in a height direction, in comparison with the pointing device 280.

The pointing device 310 may be modified, as shown in FIG. 39A, so as to form arcuate ribs 328 projecting respectively on the elastic beams 316 and the fitting portions 318, for defining the horizontal shifting range of the holding part 200 of the operating section 194 on the support surfaces 316a. The ribs 328 do not contribute the fixation of the elastic part 202, which makes it possible to reduce the height of the ribs 328 projecting from the support surfaces 316a as much as possible, and therefore, a reduction in thickness of the support member 314 is not prevented due to the provision of the ribs 328.

Figure 41:
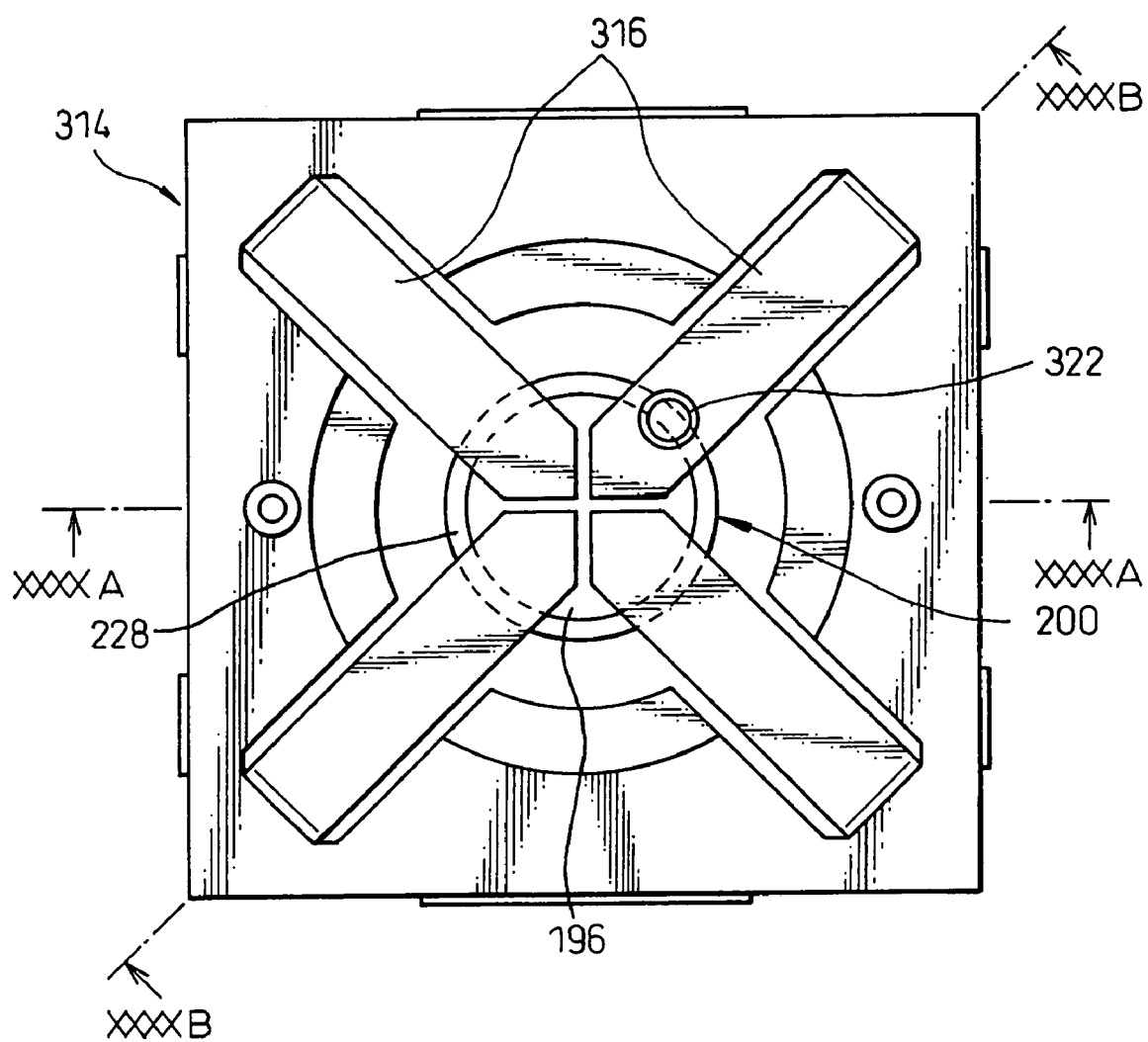
FIG. 41 is a bottom plan view of a support member arranged in a modification of the pointing device of FIG. 38.

Further, in the pointing device 310, all of the elastic beams 316 provided in the support member 314 have shapes and dimensions identical to each other and are symmetrically arranged about the center axis P, so that elastic biasing forces generated from the respective elastic beams 316 are balanced when the operator applies pressing force to the operating section 194, which advantageously makes it possible to perform an accurate pressing operation of the switch mechanism. Particularly, as shown in FIG. 41, in a case where the bump or pushing point 322 is provided on one elastic beam 316 at a location corresponding to the flange portion 228 of the holding part 200 positioned at the home position in the horizontal shifting range, it is possible to efficiently transmit a pressing force applied onto the elastic beams 316 from the holding part 200 of the operating section 194. As a result, a pressing force required for a switching operation is decreased, whereby the operability of the switch mechanism is improved.

Figure 42A:
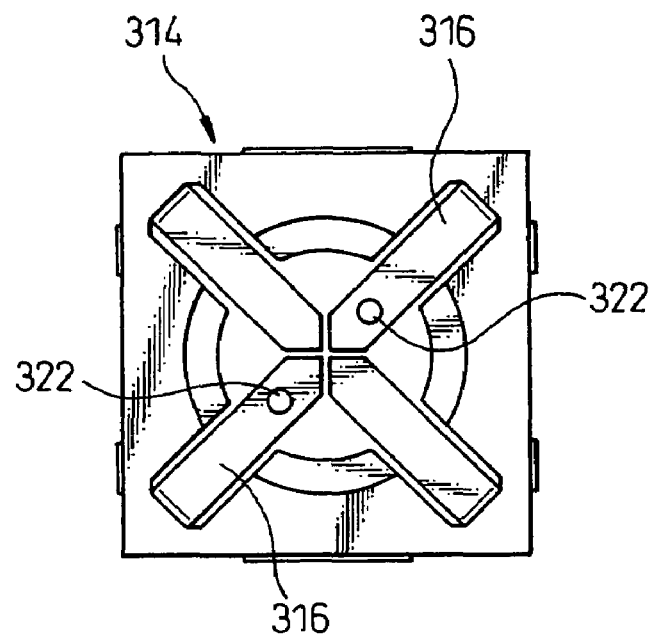
FIG. 42A is a bottom plan view of a support member arranged in another modification of the pointing device of FIG. 38.
Figure 42B:
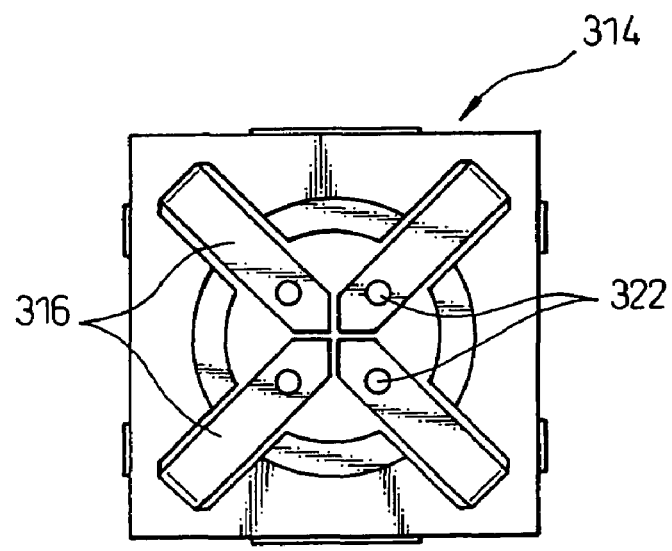
FIG. 42B is a bottom plan view of a support member arranged in a further modification of the pointing device of FIG. 38.

In the above-described configuration wherein the bump or pushing point 322 is located at a position radially displaced from the center axis P of the pointing device 310, it is necessary to mach the orientation of the support member 314 to the orientation of the circuit board 204 in an assembling process. Therefore, it is advantageous, from the viewpoint of improvement of assembling operability, that a pair of opposed elastic beams 316 are provided respectively with bumps 322 (FIG. 42A), or that all the elastic beams 316 are provided respectively with the bumps 322 (FIG. 42B).

In the pointing device 280, 310 having the click function, it is required, when the operating section 194 is pushed down, to correctly shift the operating section 194 in a vertical direction generally orthogonal to the horizontal shifting direction of the operating section 194 relative to the base section 282, 312 and the switch mechanism 284, in order to prevent any analogue data, such as cursor shifting data, from being unintentionally entered simultaneously with a click operation. To this end, the pointing device 280, 310 may be advantageously provided with a guide mechanism for guiding the operating section 194 accurately in a vertical direction in relation to the switch mechanism 284.

Figure 43:
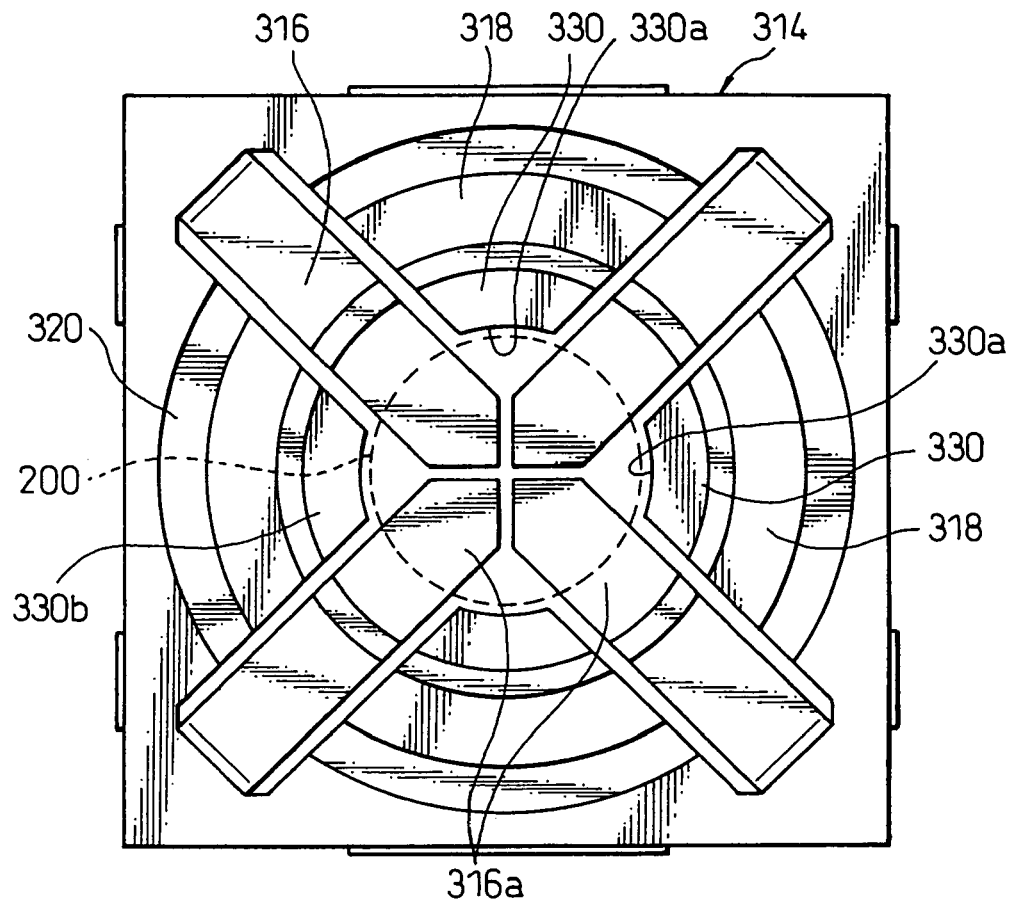
FIG. 43 is a top plan view of a support member arranged in a modification of the pointing device of FIG. 38.
Figure 44:
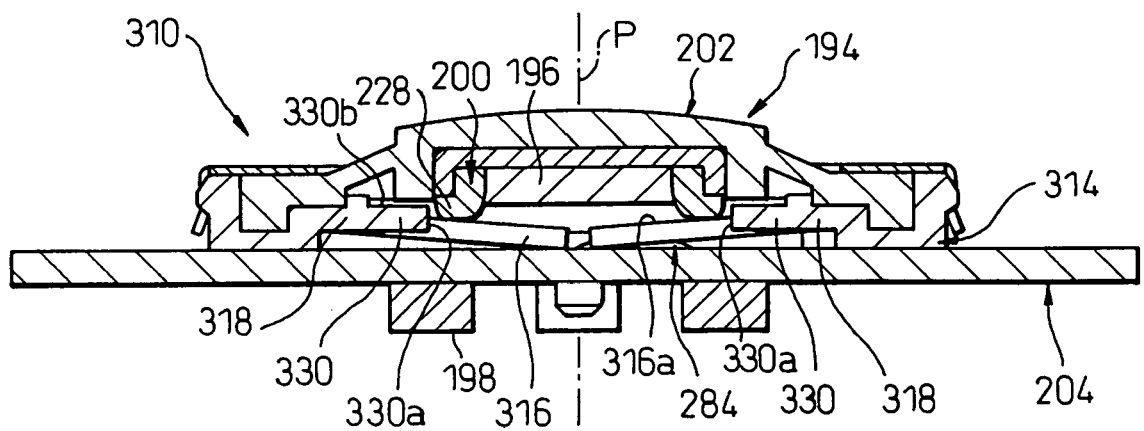
FIG. 44 is a vertical sectional view of a modification of the pointing device including the support member of FIG. 43.

FIGS. 43 and 44 show a modification of the pointing device 310 including such a guide mechanism. In this modification, each of the fitting portions 318 of the support member 314 is provided integrally with a guide element 330 having a generally sectorial shape and extending radially inward from the inner periphery of the fitting portion 318. The inner peripheral edges 330*a* of the guide elements 330 are located on a common circle, about the center axis P of the pointing device 310, having a diameter slightly larger than the outer diameter of the flange portion 228 of the holding part 200. Also, the upper surfaces 330*b* of the guide element 330 are located in the same plane as the support surfaces 316*a* of the elastic beams 316 during a non-loaded condition of the latter, and thus cooperate with the support surfaces 316*a* to support the holding part 200 slidably in the desired horizontal direction.

In this configuration, when the operating section 194 is operated to be pressed downward during a state where the holding part 200 is located at the home position in the horizontal shifting range, the holding part 200 is accurately guided at the flange portion 228 by the guide elements 330 of the support member 314 in the vertical direction relative to the switch mechanism 284. During this operation, the magnet 196 is surely prevented from shifting in the horizontal direction relative to the magneto-electro transducers 198, and thereby the unintentional input of any analogue data, such as cursor shifting data, is avoided. On the other hand, if the holding part 200 has been shifted from the home position in the horizontal shifting range prior to the pushing-down operation, it is not possible to force the elastic beams 316 to be elastically bent downward even when a pressing force is applied to the operating section 194, because the flange portion 228 of the holding part 200 collides with any of the guiding elements 330 of the support member 314. Accordingly, the above modification makes it possible to determine a manipulation position for a switching operation, such as a click operation, to only the home position of the holding part 200 in the horizontal shifting range.

In the case where a pointing device with a magneto-electro transducer, such as the pointing devices according to the above-described various embodiments of the invention, is installed into a portable information apparatus such as a mobile phone, it may be predicted that the handling of various components of the pointing device having a reduced dimension is complicated or troublesome, and thereby the operability for assembling the information apparatus is deteriorated. FIGS. 45A to 55 show respective major sections of portable information apparatuses, according to various embodiments of the invention, into which the pointing device of the invention is installed, and which are configured to improve the operability of the assembling process of the information apparatuses.

FIGS. 45A and 45B show a circuit board 340 and a key panel 342, as components of a portable information apparatus, such as a mobile phone, according to one embodiment of the invention. This portable information apparatus includes the pointing device 260 as the above-described eighth embodiment, installed with a characteristic structure for improving the operability of the assembling process, and thus corresponding components are denoted by the common reference numerals and an explanation thereof is not repeated.

As shown in FIG. 45A, the circuit board 340 is provided on the surface 340*a* thereof with a plurality of switches 344, as a main input section of the information apparatus, installed in a predetermined ordered arrangement. The circuit board 340 is also provided at predetermined positions on the surface 340*a* with a plurality (four, in the drawing) of arcuate slots 346 for fittings of the elastic part 202 of the pointing device 260. The slots 346 respectively correspond to the slots 268 of the circuit board 264 shown in FIG. 33, and thus define, in a circular region surrounded by the slots 346, a flat support surface 266 for supporting the holding part 200 of the operating section 194 slidably in the desired horizontal direction. Four magneto-electro transducers 198 are mounted on the back surface 340*b* of the circuit board 264, opposite to the support surface 266, at regular intervals in a circumferential direction about the center axis P of the pointing device 260 (FIG. 45B).

The key panel 342 is a thin-plate member integrally molded from an elastic material such as a rubber, and includes a plurality of key tops 348 projecting from the surface 342*a* at locations corresponding to the switches 344 of the circuit board 340. The key panel 342 also includes the elastic part 202 of the pointing device 260 integrally formed at a location corresponding to the support surface 266 of the circuit board 340. That is, the elastic part 202 is integrally connected through the second connecting portion 236 with the key panel 342 including the key tops 348. The major portion 232 and the first connecting portion 234 of the elastic part 202 are formed to project from the surface 342*a* of the key panel 342, and a plurality of thickened elements 236*b* of the second connecting portion 236 are formed to project from the back side 342*b* of the key panel 342.

Figure 46A:
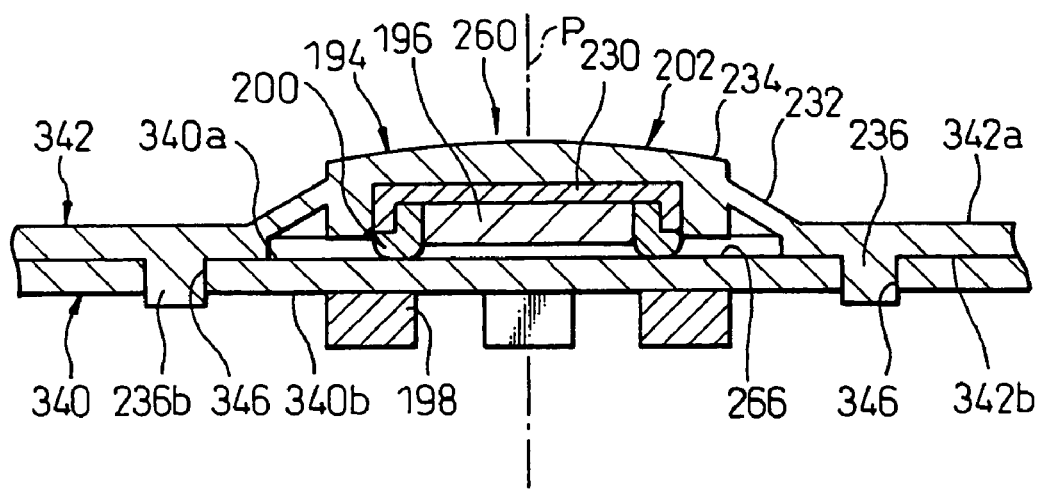
FIG. 46A is an assembled vertical sectional view of the main components of FIG. 45A, before they are assembled with a casing.
Figure 46B:
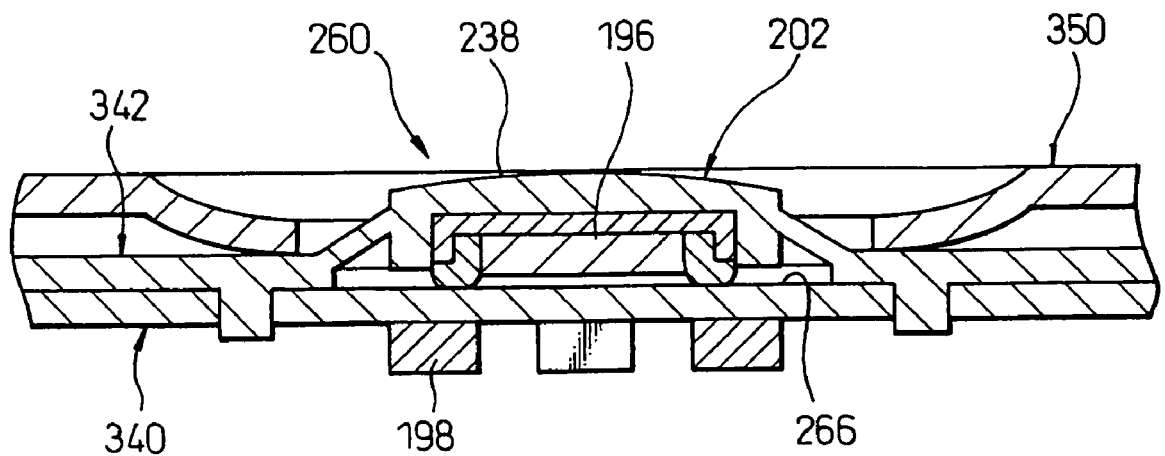
FIG. 46B is an assembled vertical sectional view of the main components of FIG. 45A, after they are assembled with a casing.

As shown in FIG. 46A, in the elastic part 202 formed in the key panel 342, the holding part 200 accommodating the magnet 196 and the yoke 230 fitted to the holding part 200 are securely received in a recess formed on the back side of the first connecting portion 234. In this state, the key panel 342 is assembled to the circuit board 340, with the back side 342*b* being in contact with the surface 340*a* of the circuit board 340, in a predetermined positional correlation wherein the key tops 348 are respectively aligned with the switches 344. Also, the thickened elements 236*b* of the second connecting portion 236 of the elastic part 202 are respectively fitted into the corresponding slots 346 of the circuit board 340. As a result, the holding part 200 is properly positioned and placed slidably on the support surface 266 of the circuit board 340. When a housing 350 of the information apparatus having an opening 352 and a recessed portion 353 (FIG. 46B) is attached to cover the key panel 342 assembled with the circuit board 340, the second connecting portion 236 of the elastic part 202 is securely held and anchored between the circuit board 340 and the housing 350 (FIG. 46B). In this manner, the pointing device 260 integrally incorporated in the portable information apparatus is completed.

According to the above structure, the elastic part 202 and the circuit board 264, as the inherent components of the pointing device 260, are respectively integrated with the key panel 342 and the circuit board 340, as the indispensable components of the portable information apparatus into which the pointing device 260 is installed, so that the number of separate inherent components of the pointing device 260 is effectively reduced. Also, during the assembling process of the pointing device 260, it is possible to assemble small-sized components to relatively large-sized key panel 342 and circuit board 340, both including major parts of the information apparatus, so that the operability of the assembling process of the pointing device 260 as well as the operability of the portable information apparatus including the pointing device 260 are significantly improved.

Figure 47A:
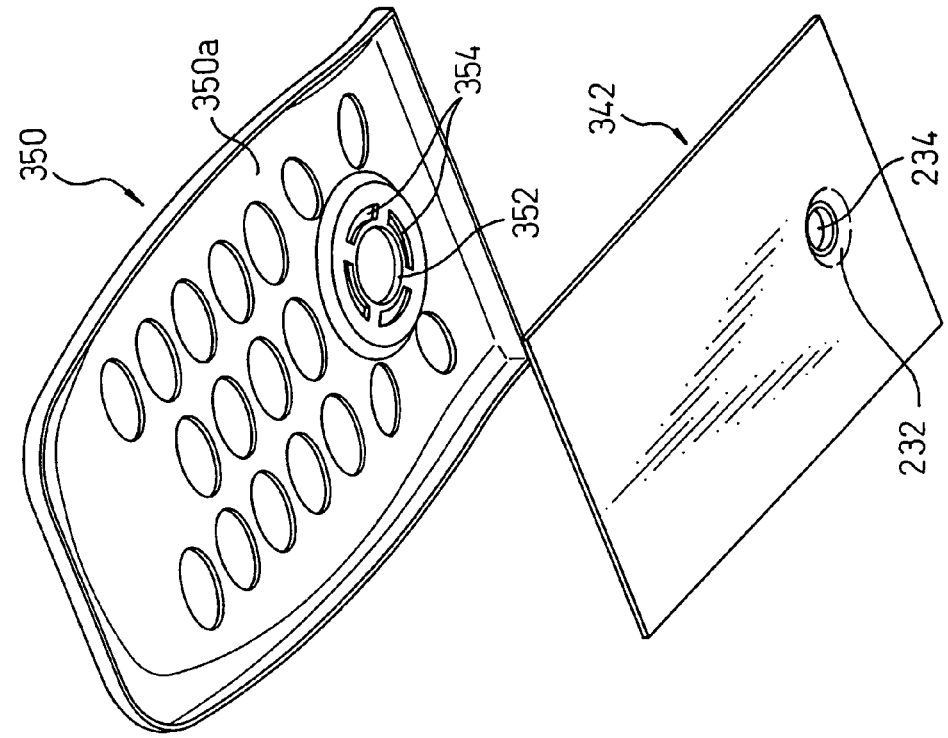
FIG. 47A is a top-side exploded perspective view of main components in a portable information apparatus according to another embodiment of the present invention.
Figure 47B:
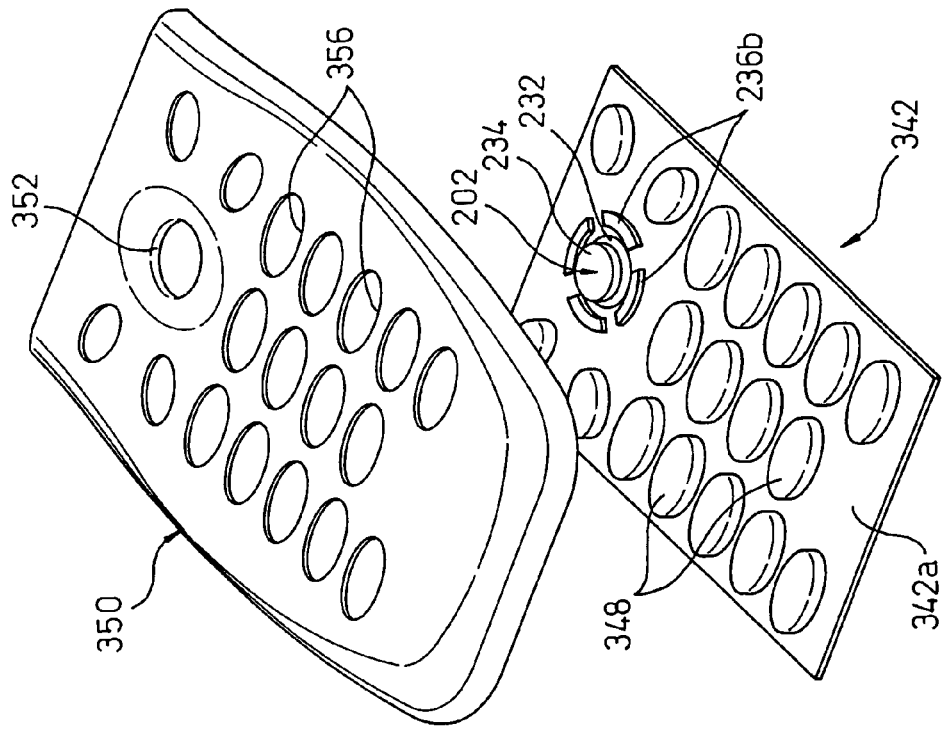
FIG. 47B is a bottom-side exploded perspective view of the main components of FIG. 47A.

The above-described portable information apparatus is assembled in such a procedure that, after the circuit board 340 and the key panel 342 are assembled together, the housing 350 is fitted thereto. Another procedure may be adopted, wherein the housing is first fitted to the key panel, and thereafter the key panel is assembled to the circuit board. FIGS. 47A and 47B show a modification of the key panel 342 and the housing 350, which has a configuration suitable for the latter procedure.

In this modification, the elastic part 202 formed integrally with the key panel 342 is provided in the second connecting portion 236 with thickened elements 236b projecting from the surface 342a of the key panel 342 (FIG. 47A). On the other hand, the housing 350 is provided on the back side 350a with grooves 354 formed around an opening 352 into which the elastic part 202 is inserted, the grooves 354 having shapes and dimensions for respectively receiving the thickened elements 236b of the second connecting portion 236 (FIG. 47B). Then, the key panel 342 is assembled to the housing 350 while the elastic part 202 and the key tops 348 are respectively inserted into the opening 352 and key holes 356 formed in the housing 350. In this step, the thickened elements 236b of the second connecting portion 236 of the elastic part 202 are respectively fitted into the corresponding grooves 354 of the housing 350.

Figure 48:
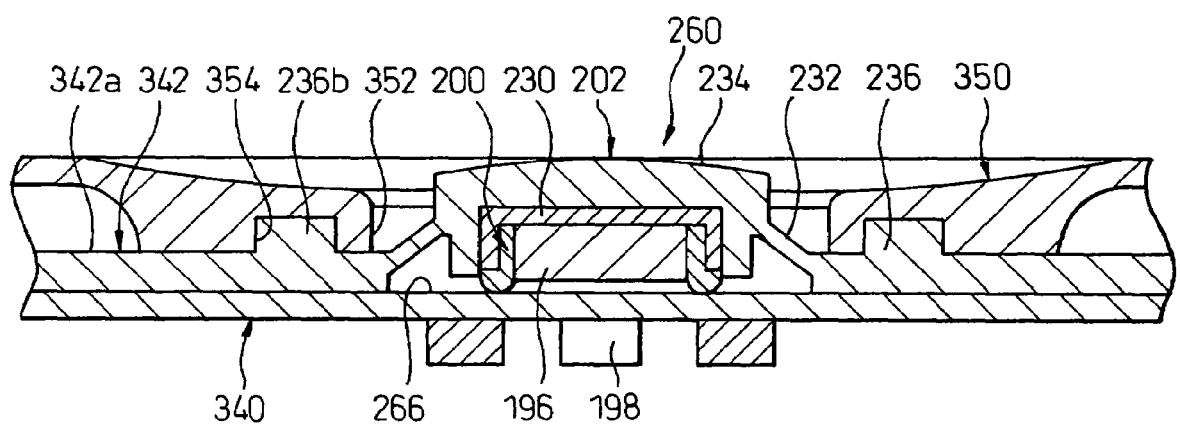
FIG. 48 is an assembled vertical sectional view of the main components of FIG. 47A.

The key panel 342 with the housing 350 being fitted thereto receives in the elastic part 202 the magnet 196, the holding part 200 and the yoke 230, and in this state, is assembled to the circuit board 340, with the back side 342b being in contact with the surface 340a of the circuit board 340, in a predetermined positional correlation wherein the key tops 348 are respectively aligned with the switches 344. As a result, the holding part 200 is properly positioned and placed slidably on the support surface 266 of the circuit board 340, and the second connecting portion 236 of the elastic part 202 is securely held and anchored between the circuit board 340 and the housing 350 (FIG. 48). In this manner, the pointing device 260, integrally incorporated in the portable information apparatus, is completed.

Figure 49:
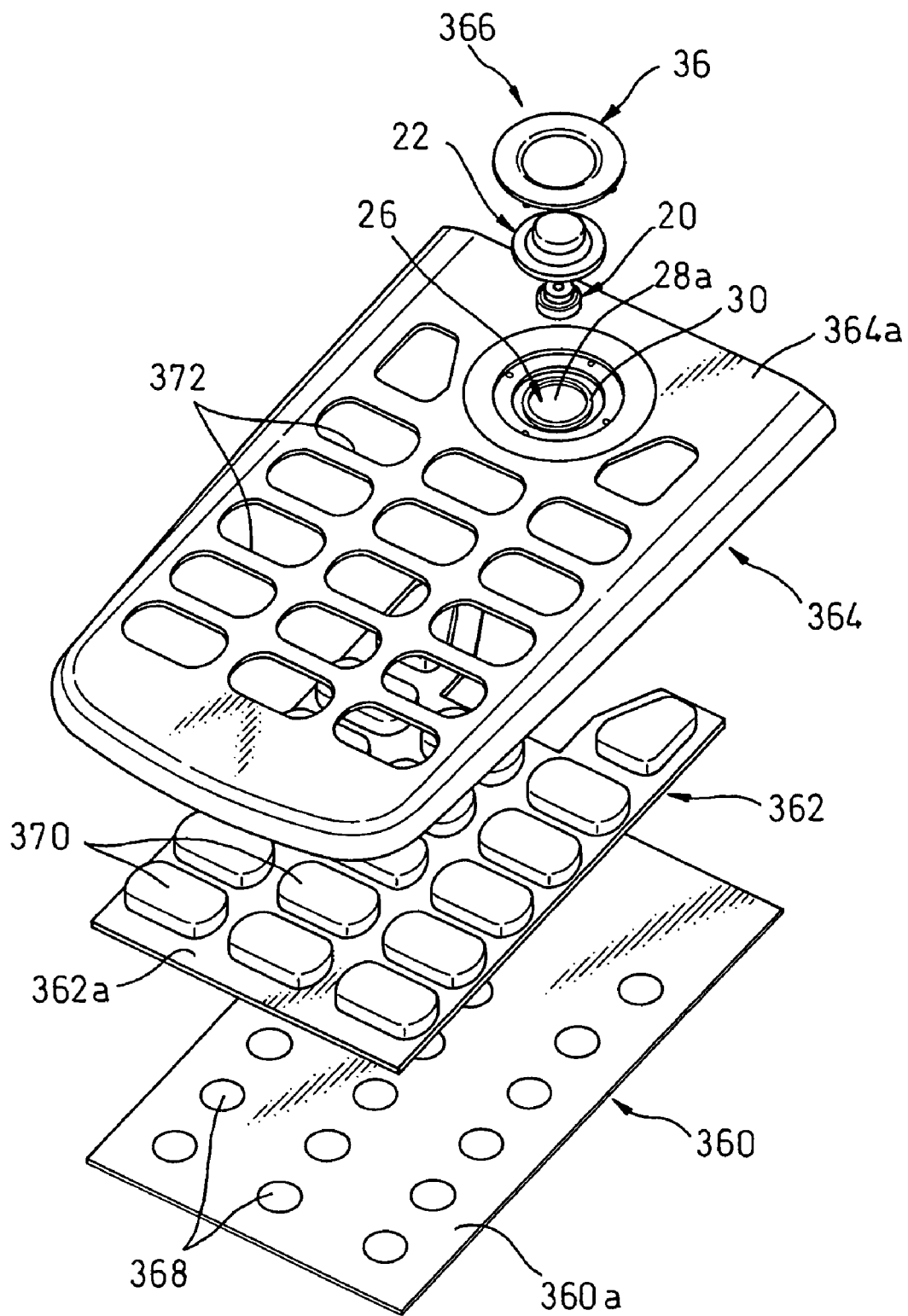
FIG. 49 is an exploded perspective view of main components in a portable information apparatus according to a further embodiment of the present invention.
Figure 50:
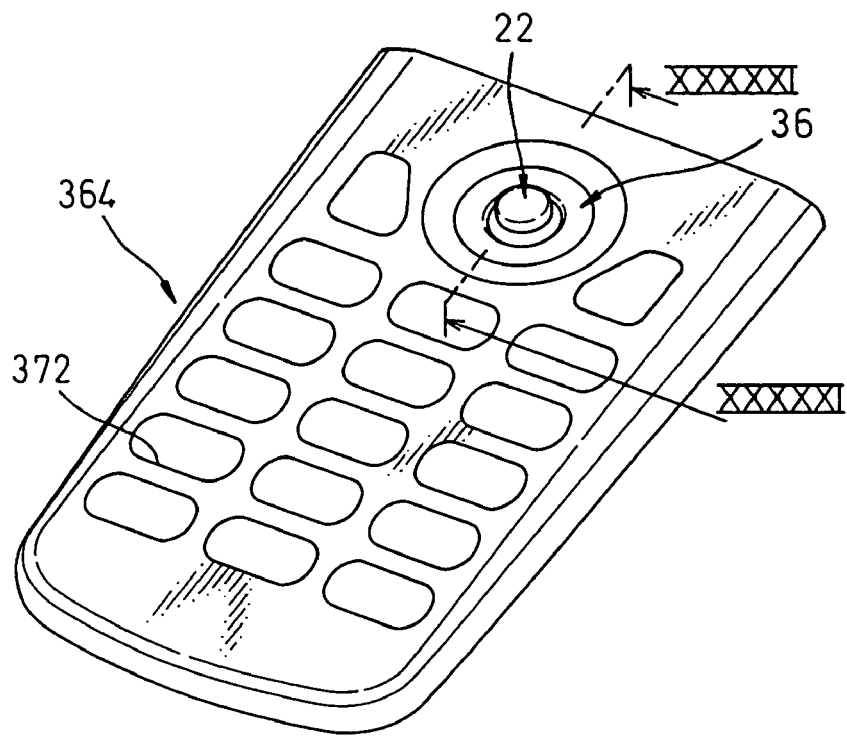
FIG. 50 is a perspective view showing components of a pointing device, being attached to a casing of FIG. 49.
Figure 51:
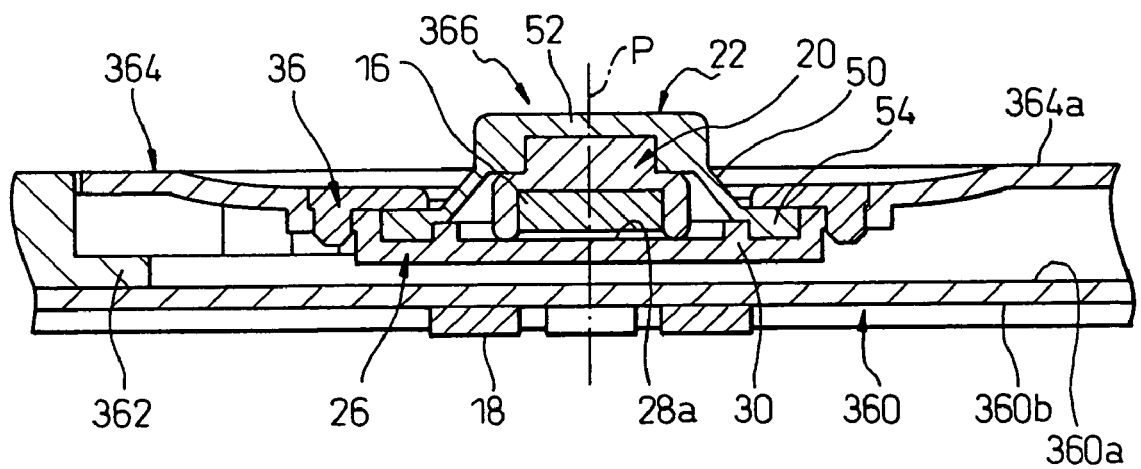
FIG. 51 is an assembled vertical sectional view of the main components of FIG. 49, taken along a line XXXXXI-XXXXXI in FIG. 50.

FIGS. 49 to 51 show a circuit board 360, a key panel 362 and a housing 364, as components of a portable information apparatus, such as a mobile phone, according to another embodiment of the invention. This portable information apparatus includes a pointing device 366 similar to the pointing device 10 as the above-described first embodiment, installed with a characteristic structure for improving the operability of the assembling process, and thus components corresponding to the pointing device 10 are denoted by the common reference numerals and an explanation thereof is not repeated.

As shown in FIG. 49, the circuit board 360 is provided on the surface 360a thereof with a plurality of switches 368, as a main input section of the information apparatus, installed in a predetermined ordered arrangement. The key panel 362 is a thin-plate member integrally molded from an elastic material such as a rubber, and includes a plurality of key tops 370 projecting from the surface 362a at locations corresponding to the switches 368 of the circuit board 360.

The housing 364 is a thin-plate member integrally molded from a resinous material, and includes a plurality of key holes 372 formed through the housing 364 at locations corresponding to the key tops 370 of the key panel 362. The housing 364 is also provided at a predetermined position on the surface 364a with a recessed region, the support member 26 of the pointing device 366 being integrally formed in the recessed region as a bottom portion of the latter. That is, the support member 26 is integrally connected through the outside region of the cylindrical wall 30 with the housing 364 including the key holes 372. The support surface 28a and the cylindrical wall 30 of the support member 26 are arranged adjacent to the surface 364a of the housing 364.

As shown in FIGS. 50 and 51, the holding part 20 accommodating the magnet 16 and the elastic part 22 fitted to the holding part 20 are installed on the support member 26 formed in the housing 364, with the axial end of the holding part 20 being slidably placed on the support surface 28a. The annular cover member 36 is fitted to the housing 364 so as to cover or hide the second connecting portion 54 of the elastic part 22, so that the second connecting portion 54 of the elastic part 22 is securely anchored on the housing 364.

In this state, the circuit board 360, the key panel 362 and the housing 364 are assembled with each other, in a predetermined positional correlation, wherein the switches 368, the key tops 370 and the key holes 372 are respectively aligned with each other. In this regard, the key panel 362 has such a profile as to not overlap the support member 26 formed in the housing 364. Also, four magneto-electro transducers 18 are mounted on the back side 360b of the circuit board 360, opposite to the support surface 28a of the support member 26, at regular intervals in a circumferential direction about the center axis P of the pointing device 366. In this manner, the pointing device 366 integrally incorporated in the portable information apparatus is completed.

According to the above structure, the support member 26 and the circuit board 24, as the inherent components of the pointing device 366, are respectively integrated with the housing 364 and the circuit board 360, as the indispensable components of the portable information apparatus into which the pointing device 366 is installed, so that the number of separate inherent components of the pointing device 366 is effectively reduced. Also, during the assembling process of the pointing device 366, it is possible to assemble small-sized components to relatively large-sized housing 364 and circuit board 360, both including major parts of the information apparatus, so that the operability of the assembling process of the pointing device 366 as well as the operability of the portable information apparatus including the pointing device 366 are significantly improved.

Figure 52:
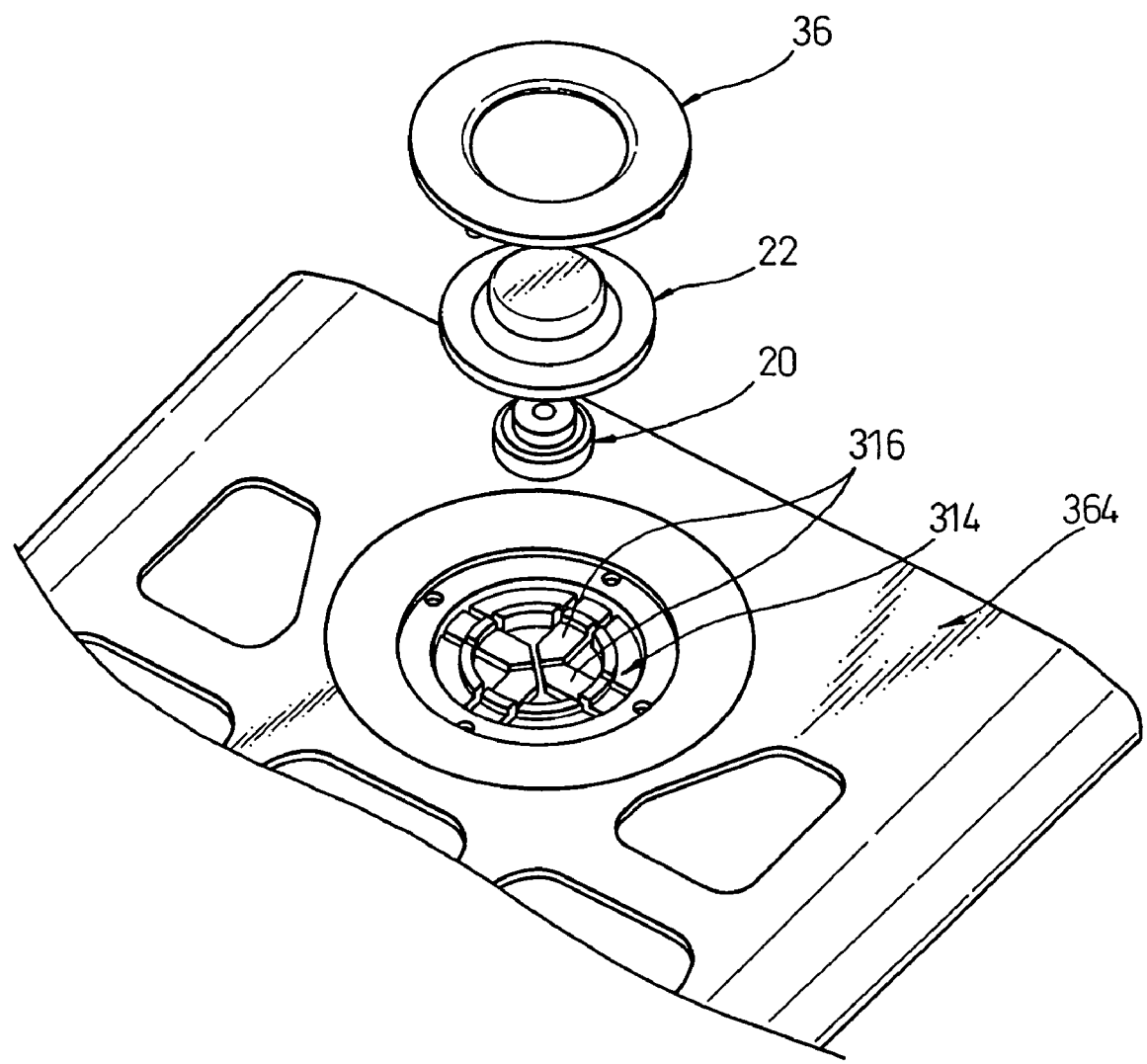
FIG. 52 is an enlarged perspective view showing a part of a modification of the casing of FIG. 49.

Further, in the above structure, it is possible, as shown in FIG. 51, to define a certain space between the surface 360a of the circuit board 360 and the support member 26 in the housing 364, which advantageously increases a mounting area for electronic parts on the circuit board 360. It will be appreciated that, in the case where a switch mechanism for a click function is added to the pointing device 366 in the above structure, the support member 314 having the elastic beams 316 in the pointing device 310 according to the tenth embodiment may be integrally formed with the housing 364, as shown in FIG. 52, instead of the support member 26.

Figure 53:
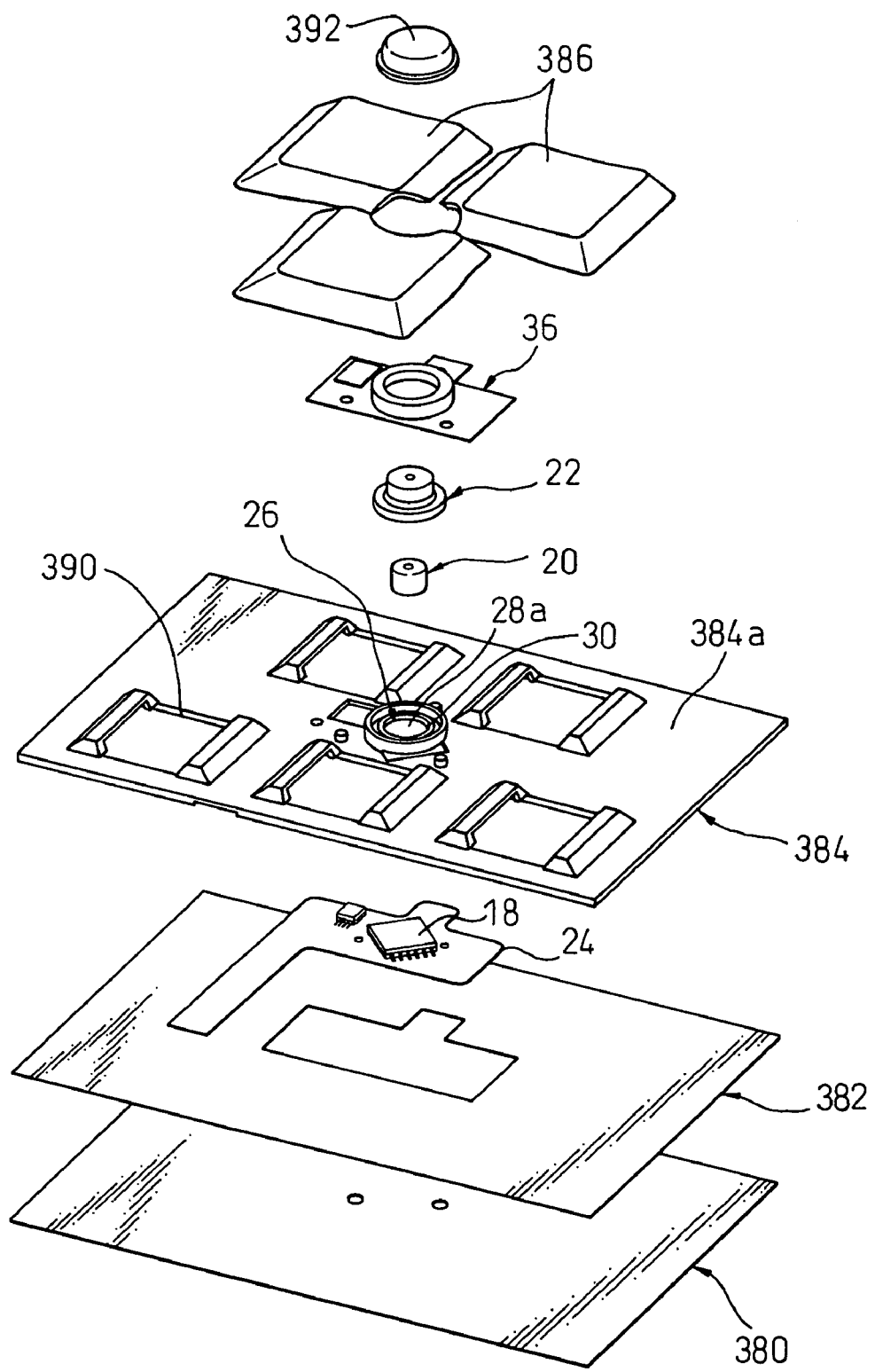
FIG. 53 is an exploded perspective view of main components in a portable information apparatus according to a yet further embodiment of the present invention.
Figure 54:
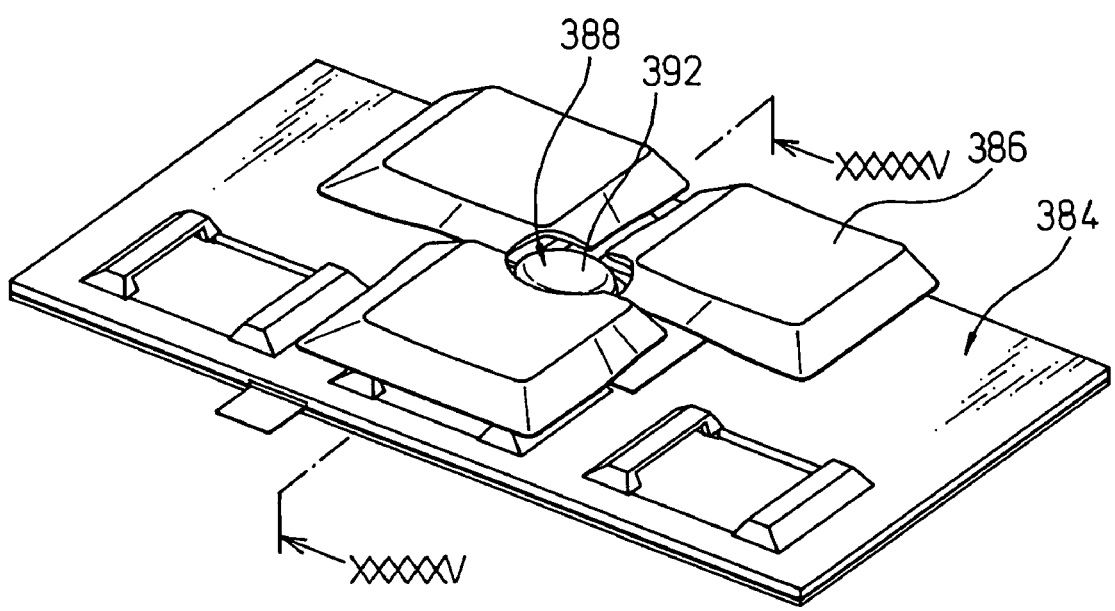
FIG. 54 is an assembled perspective view of the main components of FIG. 53.
Figure 55:
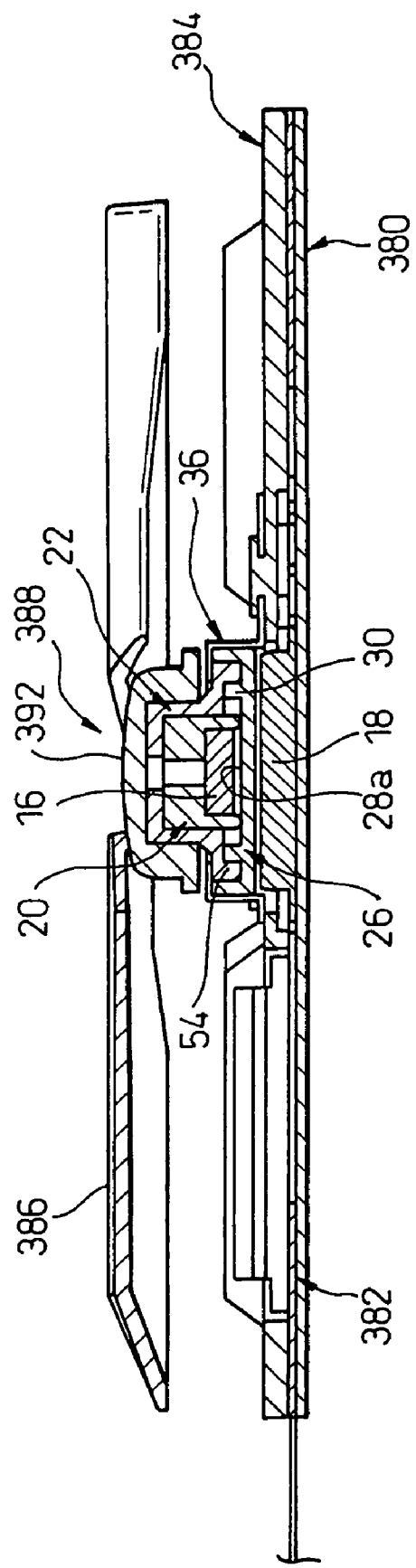
FIG. 55 is an assembled vertical sectional view of the main components of FIG. 53, taken along a line XXXXXV-XXXXXV in FIG. 54.

FIGS. 53 to 55 show a lower panel 380, a membrane sheet 382, a switch panel 384 and a key top 386, as components of a portable information apparatus, such as a mobile phone, according to a further embodiment of the invention. This portable information apparatus includes a pointing device 388 similar to the pointing device 10 as the above-described first embodiment, installed with a characteristic structure for improving the operability of the assembling process, and thus components corresponding to the pointing device 10 are denoted by the common reference numerals and the explanation thereof is not repeated.

As shown in FIG. 53, the switch panel 384 is a thin-plate member integrally molded from a resinous material, and includes a plurality of apertures 390 formed through the switch panel 384 at locations corresponding to a plurality of switches (not shown) provided in the membrane sheet 382. The switch panel 384 is also provided at a predetermined position on the surface 384a with a protruding region, the support member 26 of the pointing device 388 being integrally formed in the protruding region as a bottom portion of the latter. That is, the support member 26 is integrally connected through the outside region of the cylindrical wall 30 with the switch panel 384 including the apertures 390. The support surface 28a and the cylindrical wall 30 of the support member 26 are arranged adjacent to the surface 384a of the switch panel 384.

As shown in FIGS. 54 and 55, the holding part 20 accommodating the magnet 16 and the elastic part 22 fitted to the holding part 20 are installed on the support member 26 formed in the switch panel 384, with the axial end of the holding part 20 being slidably placed on the support surface 28a. The cover member 36 is fitted to the switch panel 384 so as to cover or hide the second connecting portion 54 of the elastic part 22, so that the second connecting portion 54 of the elastic part 22 is securely anchored on the switch panel 384.

In this state, the membrane sheet 382 and the switch panel 384 are assembled with each other, in a predetermined positional correlation, wherein the switches and the apertures 390 are respectively aligned with each other, and then are placed on the lower panel 380. In this regard, the circuit board 24, onto which a magneto-electro transducer 18 is mounted, is disposed between the membrane sheet 382 and the switch panel 384 with the magneto-electro transducer 18 being inserted within a space defined at a side opposite to the support surface 28a of the support member 26. The key tops 386 are respectively assembled with corresponding switch-actuating mechanisms (not shown) provided inside the apertures 290 of the switch panel 384, and a key top 392 is fitted to the elastic part 22 of the pointing device 388. In this manner, the pointing device 388 integrally incorporated in the portable information apparatus is completed.

According to the above structure, the support member 26, as the inherent component of the pointing device 388, is integrated with the switch panel 384, as the indispensable component of the portable information apparatus into which the pointing device 388 is installed, so that the number of separate inherent components of the pointing device 388 is effectively reduced. Also, the operability of the assembling process of the pointing device 388 as well as the operability of the portable information apparatus including the pointing device 388 are significantly improved.

The pointing device 80, 100, 280, 310 with a click function, as the various embodiments of the invention, has a construction wherein the switch mechanism 84, 284 is actuated by operating the operating section 14, 194 to be pushed downward in the vertical direction relative to the base section 82, 102, 282, 312. In this construction, when the operating section 14, 194 is pushed downward, the magnet 16, 196 held in the holding part 20, 200 is inevitably displaced in relation to the magneto-electro transducers 18, 198 provided in the base section 82, 102, 282, 312. If the direction of the displacement of the magnet 16, 196 includes a horizontal component relative to the magneto-electro transducers 18, 198, the output voltages of the magneto-electro transducers may vary and thereby the signal of analogue data, such as cursor shifting data, may be output from the pointing device 80, 100, 280, 310, just before a click operation is effected. Therefore, in order to perform an accurate click operation, it is necessary to push down the operating section 14, 194 accurately in a vertical direction in relation to the base section 82, 102, 282, 312, which in turn requires the provision of an additional guide mechanism or, otherwise, the skill of the operator.

Figure 56:
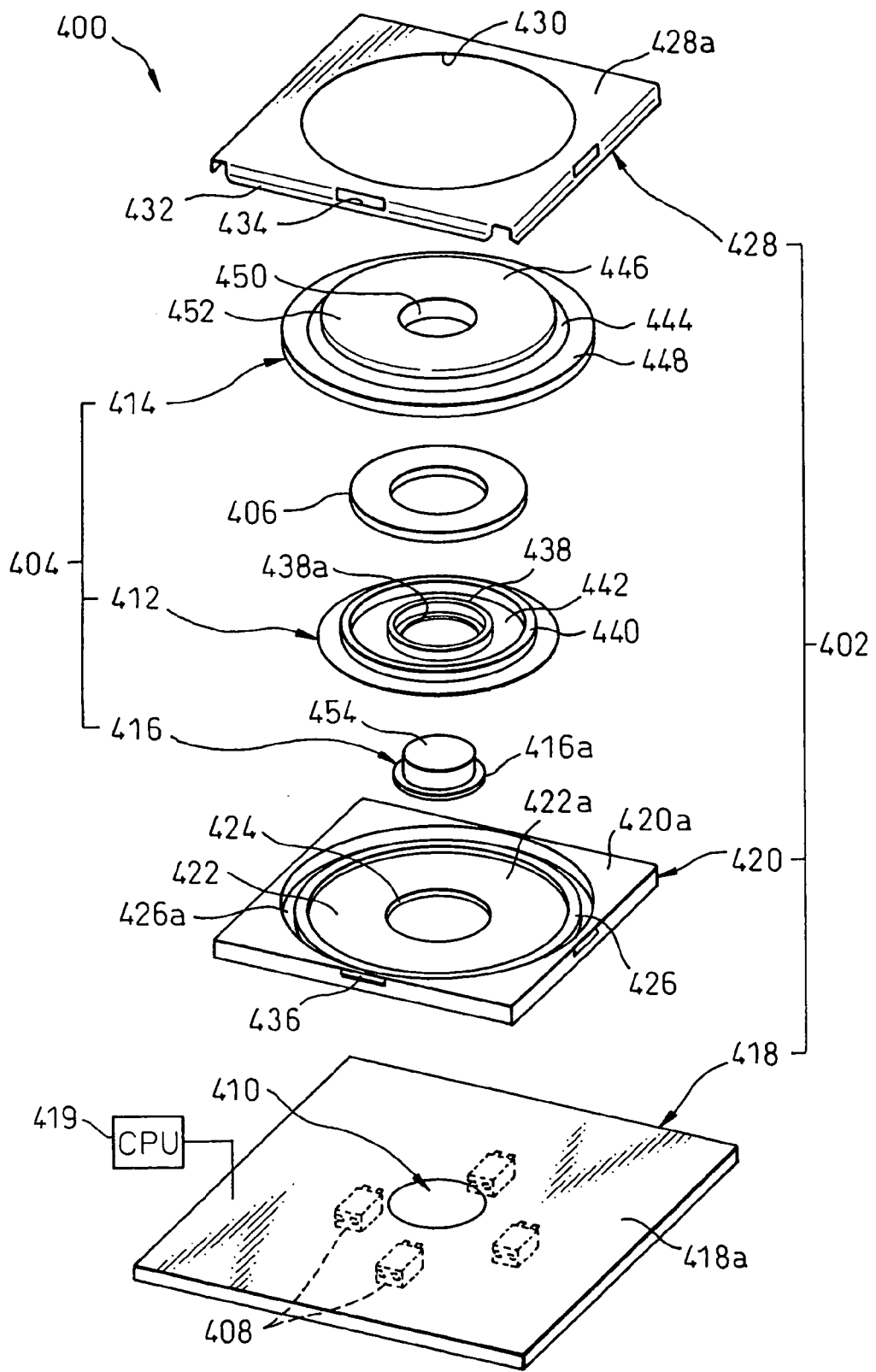
FIG. 56 is an exploded perspective view of a pointing device according to an eleventh embodiment of the present invention.
Figure 57:
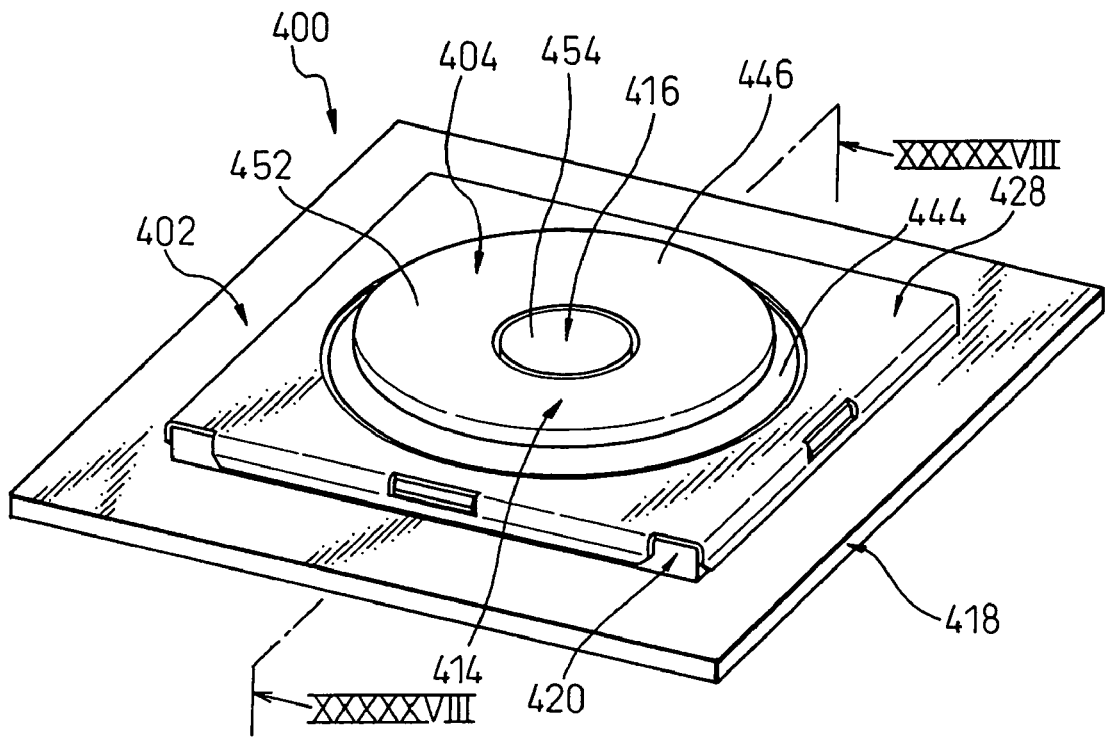
FIG. 57 is an assembled perspective view of the pointing device of FIG. 56.
Figure 58:
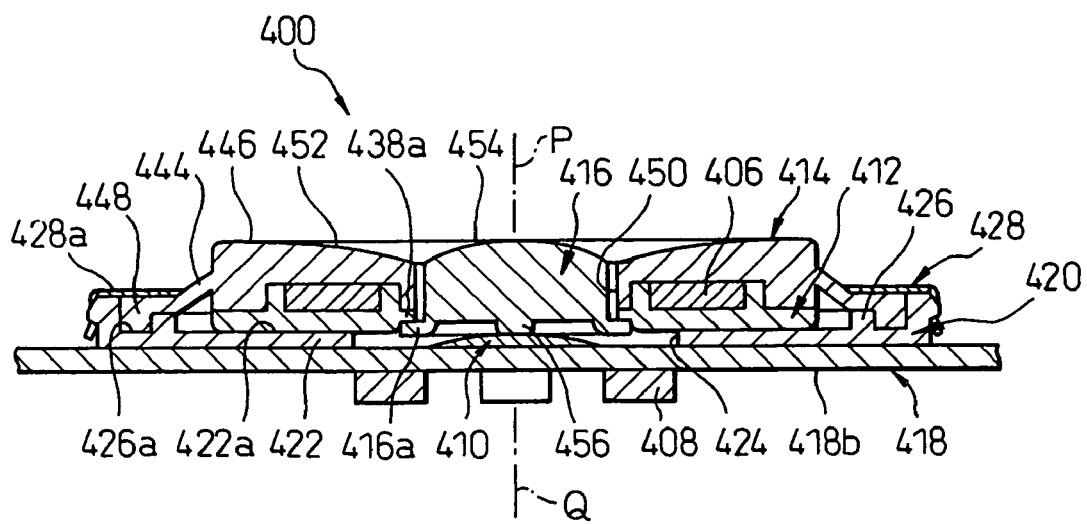
FIG. 58 is a vertical sectional view of the pointing device, taken along a line XXXXXVIII-XXXXXVIII in FIG. 57, showing an operating section at a home position.

Contrary to the above construction, FIGS. 56 to 58 show a pointing device 400, according to the eleventh embodiment of the invention, having a low-profile structure and capable of significantly easily performing the accurate click operation. The pointing device 400 includes a base section 402, an operating section 404 supported on the base section 402 shiftably in a desired horizontal direction in relation to the base section 402, a circular-ring-shaped magnet (such as a permanent magnet) 406 arranged in or carried on the operating section 404, a plurality of magneto-electro transducers (such as Hall-effect elements) 408 arranged in or carried on the base section 402 at locations close to the magnet 406, and a switch mechanism 410 arranged between the base section 402 and the operating section 404. The operating section 404 includes a first or holding part 412 securely holding the magnet 406 and supported on the base section 402 shiftably in a desired horizontal direction relative to the base section 402, a second or elastic part 414 connected to the holding part 412 and elastically biasing the holding part 412 toward a home position in a horizontal shifting range during a period when the holding part 412 is horizontally shifted along the base section 402, and a third or actuating part 416 disposed independently of the holding part 412 on the base section 402 shiftably in a vertical direction generally orthogonal to the horizontal direction.

The base section 402 includes a circuit board 418, on which electronic components including a CPU 419 are mounted, and a support member 420 fixedly joined to the circuit board 418. The circuit board 418 has a generally flat major surface 418a. The support member 420 is a plate-like element having a generally square profile as shown in a plan view, and is mounted on the surface 418a of the circuit board 418 with substantially no gap defined between the support member 420 and the surface 418a. The support member 420 includes an annular support portion 422, in a generally circular center recessed region, for supporting the holding part 412 of the operating section 404 slidably in the desired horizontal direction, the switch mechanism 410 being inserted within a circular opening 424 formed at a center of the support portion 422. In the illustrated embodiment, the "horizontal direction" means a direction substantially parallel to the surface 418a of the circuit board 418, and thus the support portion 422 of the support member 420 is provided on an upper side thereof, facing away from the circuit board 418, with a flat annular support surface 422a extending substantially parallel to the surface 418a of the circuit board 418. The support surface 422a serves to support the holding part 412 slidably in the desired horizontal direction at a position projecting from the surface 418a of the circuit board 418.

The support member 420 further includes a cylindrical wall 426 extending in such a direction as to surround the support surface 422a, the wall 426 defining a horizontal shifting range of the holding part 412 of the operating section 404. The wall 426 is formed integrally with the support portion 422 to project to a position higher than the support surface 422a in relation to the surface 418a of the circuit board 418. The elastic part 414 is fitted to the support member 420 with a peripheral portion of the elastic part 414 surrounding the cylindrical wall 426, as described later. A center axis of the cylindrical wall 426, passing through a geometrical center of the opening 424, constitutes a center axis P of the pointing device 400 and defines a home position in the horizontal shifting range of the holding part 412 along the support surface 422a. The support member 420 is securely assembled with the circuit board 418 at a predetermined position thereon by using, e.g., an adhesive.

The switch mechanism 410 having a generally circular profile in a plan view is mounted on the surface 418a of the circuit board 418 concentrically about the center axis P. Four magneto-electro transducers 408 are mounted on the back surface 418b opposite to the surface 418a of the circuit board 418 at regular intervals in a circumferential direction about the center axis P. This configuration of the magneto-electro transducers 408 is provided for allowing the pointing device 400 to output an analog data signal in a two-dimensional coordinate system.

The base section 402 further includes a cover member 428 fixedly joined to the support member 420 so as to substantially cover or hide an outer peripheral region 420a of the support member 420. The cover member 428 is a thin plate element having a generally square profile as shown in a plan view, corresponding to the support member 420, and includes an end plate 428a defining, at a center region thereof, a generally circular center opening 430 through which a major operating portion of the operating section 404, as described later, is inserted in a horizontally shiftable manner. The cover member 428 is further provided integrally at an outer periphery thereof with extensions 432 disposed along four sides of the end plate 428a and extending generally orthogonal to the latter. Each extension 432 is provided with a fitting aperture 434 penetrating through the thickness of the extension 432. The cover member 428 is securely assembled with the support member 420, with laterally projecting plural pawls 436 formed respectively on four peripheral sides of the support member 420 being fitted into the corresponding apertures 434 of the extensions 432 in a snap-fit manner using the elastic deformation of the extensions 432. The cover member 428 serves to retain the operating section 404 so as to prevent the latter from being removed from the base section 402, in a condition where the major operating portion of the operating section 404 projects outward through the center opening 430. The cover member 428 having the above structure may be made of a desired sheet metal.

In the illustrated embodiment, the holding part 412 and the elastic part 414 of the operating section 404 are produced independently from each other as separate members, and are securely assembled together. The holding part 412 is a circular-ring-shaped member, and has rigidity for substantially eliminating a deformation thereof during a period when the operating section 404 is operated to shift in the horizontal direction on the base section 402. The holding part 412 includes a cylindrical inner circumferential wall 438 and a cylindrical intermediate wall 440, coaxially projecting on an axial or upper end of the holding part 412, with an annular recess 442 for accommodating the magnet 406 being defined between the inner and intermediate walls 438, 440. The magnet 406 may be fixed in the annular recess 442 of the holding part 412 by adhering or press-fitting the magnet 406. The holding part 412 is capable of shifting, in a parallel translation manner, on the support surface 422a of the support member 420 of the base section 402 so as to be two-dimensionally slidable over 360 degrees about the center axis P, with an axial or lower end face of the holding part 412 being uniformly abutted to the support surface 422a.

The elastic part 414 is a basin-shaped member, and has elasticity for permitting a relatively easy elastic deformation thereof during a period when the operating section 404 is operated to shift in the horizontal direction on the base section 402. The elastic part 414 is provided integrally with a major portion 444 extending around the holding part 412 with a gap defined therebetween, a first connecting portion 446 connected to the holding part 412 at one end of the major portion 444 and a second connecting portion 448 connected to the base section 402 at another end of the major portion 444. The major portion 444 of the elastic part 414 has a truncated conical or dome-shaped profile for surrounding substantially an entire circumference of the holding part 412 and is disposed coaxially with the holding part 412 during a non-loaded condition of the elastic part 414. Accordingly, the elastic part 414 is elastically deformed in the major portion 444 due to the horizontal shifting motion of the holding part 412 on the base section 402, and thereby exerts in the major portion 444 an even elastic biasing force irrespective of the horizontal shifting direction of the holding part 412.

The first connecting portion 446 of the elastic part 414 extends integrally and radially inward in a circular-ring shape from a smaller diameter end of the major portion 444 having a truncated conical profile, so as to form a recess inside the first connecting portion 446, into which the inner and intermediate walls 438, 440 of the holding part 412 holding the magnet 406 therebetween is securely fitted. The first connecting portion 446 of the elastic part 414 may be fixed by an adhesion or a press-fit with the holding part 412. The first connecting portion 446 also includes a cylindrical receptive bore 450 penetrating through a center region of the connecting portion 446 and formed coaxially with the inner and intermediate walls 438, 440 of the holding part 412. The first connecting portion 446 extends to cover axial end faces of the holding part 412 and the magnet 406 in close contact therewith, and an operating surface 452, on which an operator touches with, e.g., his finger for the shifting operation of the operating section 404, is formed on the outer surface of the first connecting portion 446.

The second connecting portion 448 of the elastic part 414 extends integrally and projects axially and radially from a larger diameter end of the major portion 444 having a truncated conical profile, so as to form a thickened peripheral flange capable of being securely held and anchored between an outside annular groove region 426a of the cylindrical wall 426 of the support member 420 and the end plate 428a of the cover member 428, the members 420, 428 constituting the base section 402. The first and second connecting portions 446, 448 serve to fixedly connect the elastic part 414 to the holding part 412 and the base section 402, respectively, without substantially being deformed during the horizontal shifting motion of the holding part 412 on the base section 402.

The elastic part 414 may be made from various elastic materials, such as a synthetic rubber or a natural rubber. In consideration of a reflow soldering performed in a mounting process of the pointing device 400 onto a main circuit board of electronic equipment, it is advantageous that the elastic part 414 is made from a material having a certain heat resistance, such as a silicone rubber, for preventing a quality deterioration thereof in a high temperature environment. On the other hand, the holding part 412 may be made of plastic, metal, and so forth.

The actuating part 416 is a circular-ring-shaped member, and has rigidity for substantially eliminating a deformation thereof during a period when the actuating part 416 is operated to shift in the vertical direction on the base section 402. The actuating part 416 is provided integrally at one axial or lower end thereof with a flange portion 416a extending radially outward. The actuating part 416 is also provided in another axial or upper end thereof with a press-operating surface 454, on which an operator touches with, e.g., his finger for the pushing-down operation of the actuating part 416. The actuating part 416 is separated from the elastic part 414, and is received into the receptive bore 450 in the first connecting portion 446 of the elastic part 414 through a certain gap. In this respect, the actuating part 416 is oriented so that the flange portion 416a is capable of being engaged with a shoulder 438a slightly projecting radially inward from the inner wall 438 of the holding part 412 at a side opposite to the magnet 406. In a state where the flange portion 416a of the actuating part 416 is engaged with the shoulder 438a of the holding part 412, the press-operating surface 454 of the actuating part 416 is located so as to slightly protrude at a center of the operating surface 452 of the elastic part 414.

The actuating part 416 is provided in an axial or lower end face thereof with a bump 456 as a pushing point, locally protruding at a center of the lower end face. The bump 456 is located on the center axis P of the pointing device 400. When the operating section 404 is properly assembled with the base section 402, the actuating part 416 is supported on the switch mechanism 410 disposed within the opening 424 of the support member 420, shiftably in the vertical direction in the operating section 404, with the bump 456 being abutted to the switch mechanism 410.

The switch mechanism 410 is mounted onto the surface 418a of the circuit board 418, for providing a click function. The switch mechanism 410 has a known make/break structure including a movable contact located substantially on the center axis P of the pointing device 400. In this respect, the switch mechanism 410 having various structures may be used, such as a mechanical switch including a spring-biased movable contact, a membrane switch including a pair of flexible circuit boards, and so forth. The switch mechanism 410 also may have a smaller dimension for enabling the magneto-electro transducers 408 being arranged within the opening 424 of the support member 420.

When the above-described components are properly assembled with each other, the operating section 404 is arranged in such a configuration that the major and first connecting portions 444, 446 of the elastic part 414 as well as a portion of the actuating part 416 including the press-operating surface 454 are inserted through the center opening 430 of the cover member 428 of the base section 402 in a horizontally shiftable manner and are located to project outward from the end plate 428a of the cover member 428. In this condition, an operator can manipulate the operating surface 452 provided in the first connecting portion 446 of the elastic part 414 with, e.g., his finger, so as to horizontally shift the holding part 412 on the base section 402. Also, an operator can manipulate the press-operating surface 454 of the actuating part 416 with, e.g., his finger, so as to vertically shift the actuating part 416 on the base section 402.

Figure 59A:
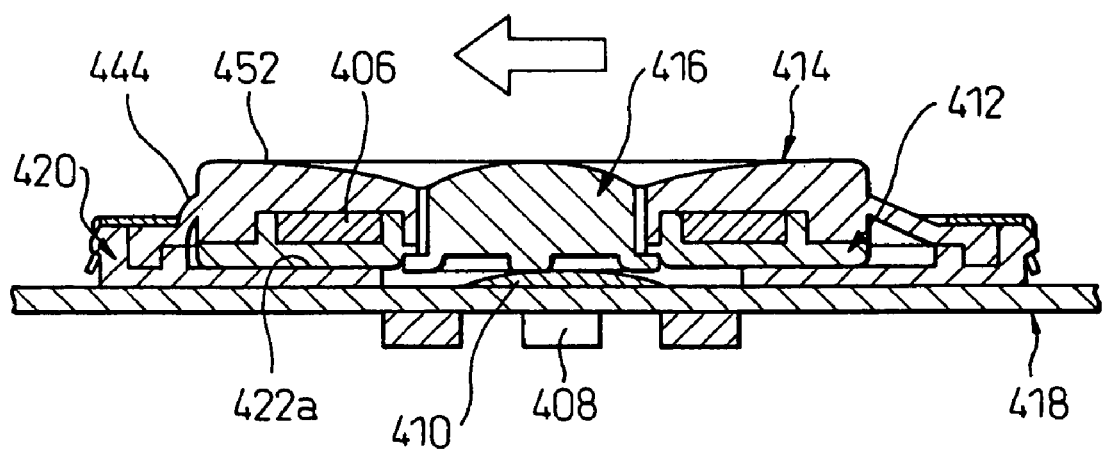
FIG. 59A is a vertical sectional view of the pointing device of FIG. 56, showing the operating section being shifted in a horizontal direction.

As shown in FIG. 58, during a period when the elastic part 414 of the operating section 404 is a non-loaded or balanced condition, a center axis Q of the holding part 412 and the magnet 406 held in the annular recess 442 as well as of the actuating part 416 coincides with the center axis P of the pointing device 400. In this state, the holding part 412 is located at a home position in the horizontal shifting range on the support member 420 of the base section 402, and four magneto-electro transducers 408 mounted on the circuit board 418 are positioned equidistantly from the magnet 406. From this state, when the operator touches the operating surface 452 with his finger and shifts in a parallel translation manner the holding part 412 in a desired horizontal direction, the major portion 444 of the elastic part 414 is elastically deformed in correspondence with the shifting direction and shifting amount or distance of the holding part 412 in a circumferentially uneven mode (FIG. 59A). As a result, the elastic part 414 exerts a resultant elastic force in the major portion 444 in its entirety, so as to bias the holding part 412 in a direction opposite to the shifting direction. The operator thus manipulates the operating section 404 to horizontally shift it against a spring biasing force generated by the major portion 444 of the elastic part 414.

Figure 59B:
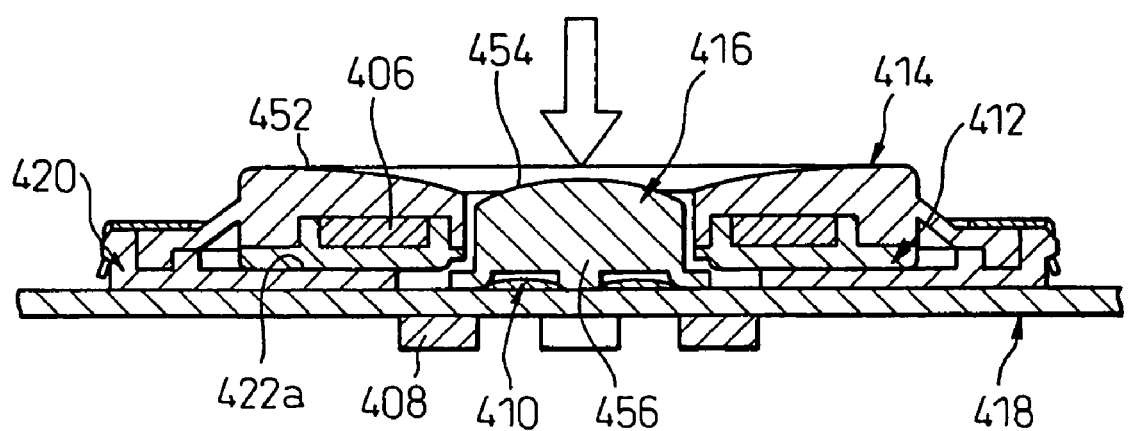
FIG. 59B is a vertical sectional view of the pointing device of FIG. 56, showing the operating section being shifted in a vertical direction.

Further, in the pointing device 400, it is possible for the operator to push the press-operating surface 454 of the actuating part 416 of the operating section 404 downward with, e.g., his finger in the home position as shown in FIG. 58, and to force the bump 456 against the switch mechanism 410, so as to make or close the switch mechanism 410 (FIG. 59B). During this operation, the holding part 412 is supported on the support surface 422a of the support member 420 in a stationary state, so that it is possible to surely prevent the holding part 412 and the magnet 406 from being shifted in the vertical direction even when the operator applies a pressing force to the operating surface 452 of the elastic part 414.

As described above, it is possible, in the pointing device 400, to enter analogue information corresponding to the shifting direction and shifting amount of the holding part 412 by applying an operating force in substantially the horizontal direction to the operating section 404, as well as to perform, e.g., a click operation for a pointer on a display screen in electronic equipment into which the pointing device 400 is installed, by applying a press-operating force in substantially the vertical direction to the operating section 404 located in the home position. Particularly, in the press-down operation, it is possible to surely prevent the holding part 412 from being shifted in the vertical direction relative to the base section 402, which eliminates the relative displacement between the magnet 406 and the magneto-electro transducers 408. Accordingly, the pointing device 400 is capable of performing a proper and accurate click operation in a very simple manipulation.

Also, in the pointing device 400, the respective components of the base and operating sections 402, 404 are reduced in thickness, which provides a lower-profile construction for the pointing device 400 in its entirety, similar to the pointing device 280 according to the above-described ninth embodiment. In this regard, when an annular groove is formed in the support member 420 for the fitting of the second connecting portion 448 of the elastic part 414, instead of the cylindrical wall 426, in a way similar to the pointing device 310 as the tenth embodiment, it is possible to more effectively reduce the dimension, especially in a height direction, of the pointing device 400.

Figure 60:
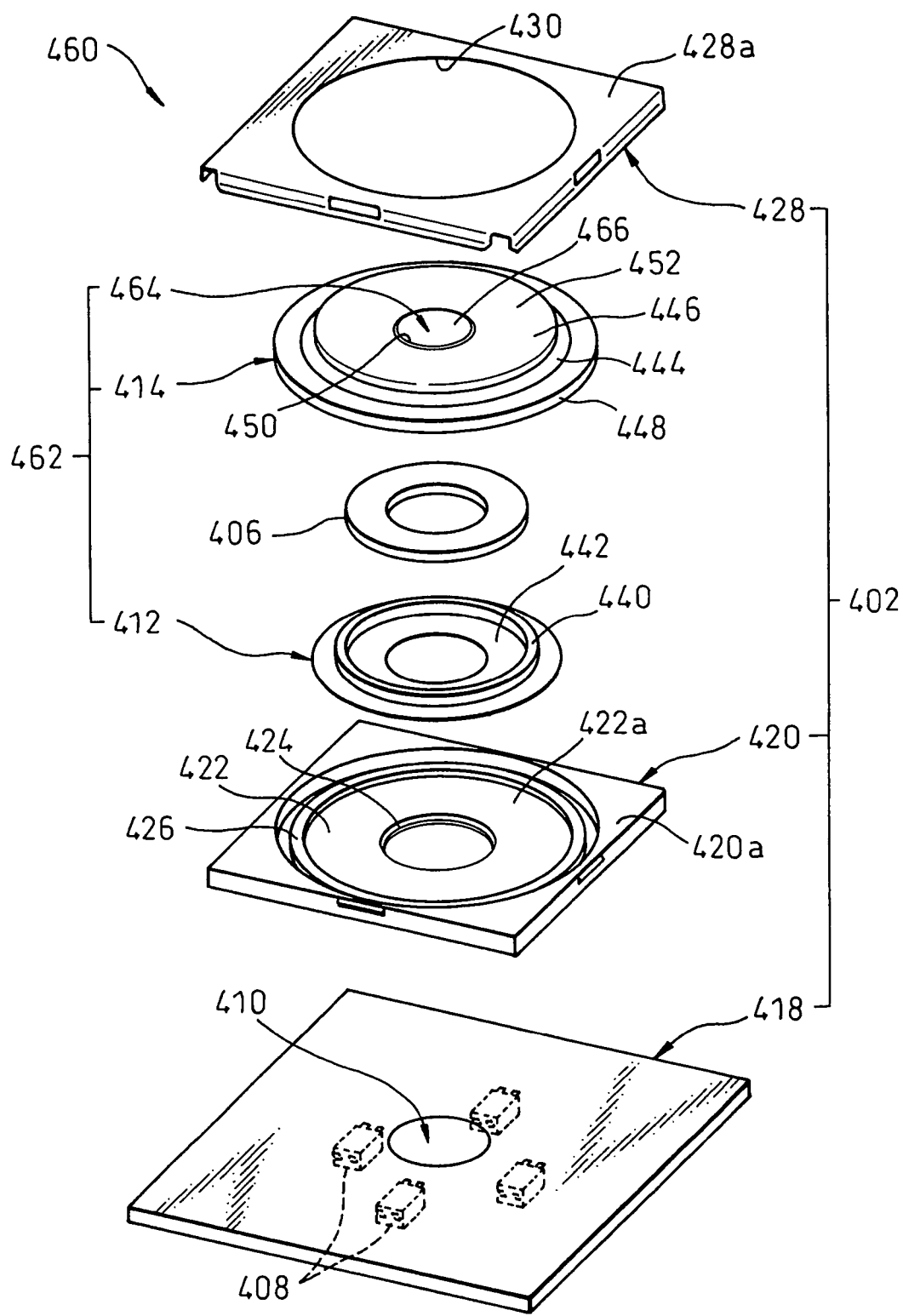
FIG. 60 is an exploded perspective view of a pointing device according to a twelfth embodiment of the present invention.
Figure 61:
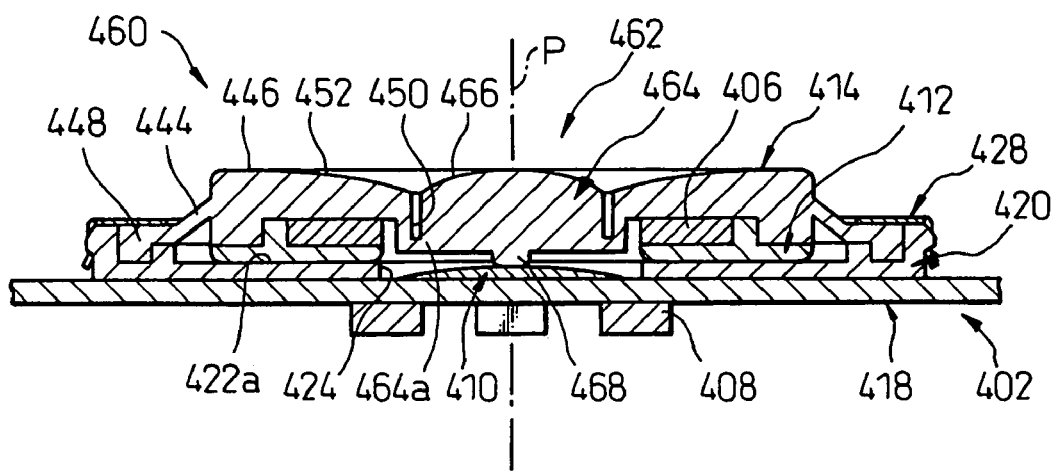
FIG. 61 is an assembled perspective view of the pointing device of FIG. 60.

FIGS. 60 and 61 show a pointing device 460, according to the twelfth embodiment of the present invention, having a low-profile structure and capable of significantly easily performing the accurate click operation. The pointing device 460 has substantially the same structure as the pointing device 400 of the eleventh embodiment, except for the constitution of an actuating part in the operating section, and thus corresponding components are denoted by the common reference numerals and the explanation thereof is not repeated.

The pointing device 460 includes a base section 402, an operating section 462 supported on the base section 402 shiftably in a desired horizontal direction in relation to the base section 402, a magnet 406 carried on the operating section 462, a plurality of magneto-electro transducers 408 carried on the base section 402 at locations close to the magnet 406, and a switch mechanism 410 arranged between the base section 402 and the operating section 462. The base section 402 includes a circuit board 418, on which electronic components including a CPU (not shown) are mounted, a support member 420 fixedly joined to the circuit board 418, and a cover member 428 fixedly joined to the support member 420 so as to substantially cover or hide an outer peripheral region 420a of the support member 420.

The operating section 462 includes a first or holding part 412 securely holding the magnet 406 and supported on the base section 402 shiftably in a desired horizontal direction, a second or elastic part 414 elastically biasing the holding part 412 toward a home position in a horizontal shifting range, and a third or actuating part 464 disposed independently of the holding part 412 on the base section 402 shiftably in a vertical direction generally orthogonal to the horizontal direction. The actuating part 464 is integrally joined to the first connecting portion 446 of the elastic part 414, and is received into the receptive bore 450 provided in the first connecting portion 446. More particularly, the actuating part 464 is provided integrally at one axial or lower end thereof with a flange portion 464a extending radially outward, and is molded, at the flange portion 464a integrally with the inner circumferential wall defining the receptive bore 450 of the first connecting portion 446 of the elastic part 414, from, e.g., a material identical to the elastic part 414.

The actuating part 464 is also provided in another axial or upper end thereof with a press-operating surface 466, on which an operator touches with, e.g., his finger for the pushing-down operation of the actuating part 464. In a state where no pushing-down force is applied to the actuating part 464, the press-operating surface 466 of the actuating part 464 is located so as to slightly protrude at a center of the operating surface 452 of the elastic part 414. When a certain pushing-down force is applied to the actuating part 464, the actuating part 464 is shifted in the vertical direction inside the receptive bore 450 of the elastic part 414 with the mutual connecting portion between the elastic part 414 and the actuating part 464 being elastically deformed. It is preferred, as illustrated, that the inner circumferential wall 438 (FIG. 56) of the holding part 412 is omitted, so as to allow the mutual connecting portion between the elastic part 414 and the actuating part 464 being elastically deformed with no difficulty when the pushing-down force is applied to the actuating part 464.

The actuating part 464 is provided in an axial or lower end face thereof with a bump 468 as a pushing point, locally protruding at a center of the lower end face. The bump 468 is located on the center axis P of the pointing device 460. When the operating section 462 is properly assembled with the base section 402, the actuating part 464 is supported on the switch mechanism 410 disposed within the opening 424 of the support member 420, shiftably in the vertical direction in the operating section 462, with the bump 468 being abutted to the switch mechanism 410.

Figure 62A:
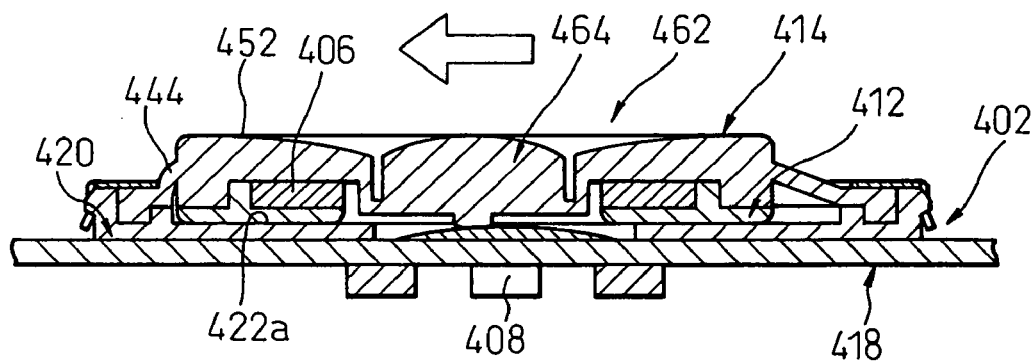
FIG. 62A is a vertical sectional view of the pointing device of FIG. 60, showing the operating section being shifted in a horizontal direction.
Figure 62B:
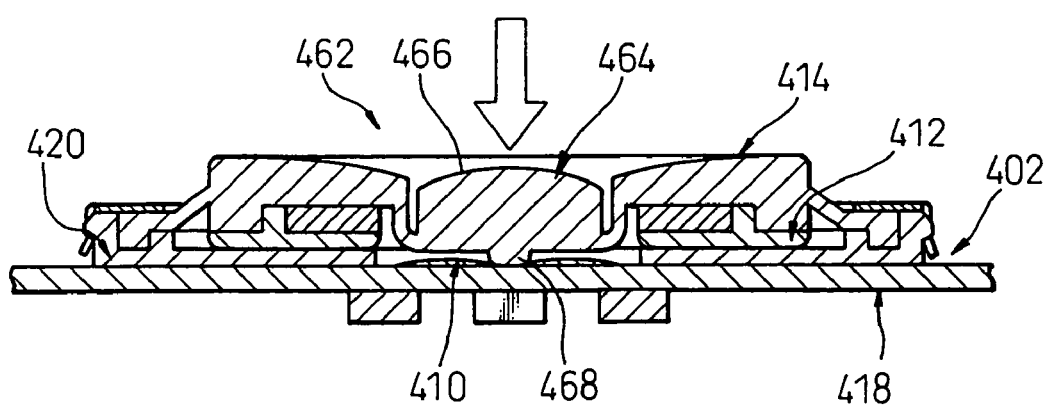
FIG. 62B is a vertical sectional view of the pointing device of FIG. 60, showing the operating section being shifted in a vertical direction.

In the pointing device 460 having the above structure, it is possible to enter analogue information corresponding to the shifting direction and shifting amount of the holding part 412 on the base section 402 by applying an operating force in substantially the horizontal direction to the operating section 462, in a way similar to the pointing device 400 (FIG. 62A). Also, in the pointing device 460, it is possible for the operator to push the press-operating surface 466 of the actuating part 464 of the operating section 462 downward with, e.g., his finger in the home position as shown in FIG. 61, and to force the bump 468 of the actuating part 464 against the switch mechanism 410, so as to make or close the switch mechanism 410 (FIG. 62B). In this press-down operation, the holding part 412 is surely prevented from being shifted in the vertical direction relative to the base section 402, so that it is possible to significantly easily perform a proper click operation for, e.g., a pointer on a display screen in electronic equipment into which the pointing device 460 is installed. Particularly, in the pointing device 460, the elastic part 414 and the actuating part 464 of the operating section 462 are integrated with each other, which advantageously decreases the number of components and improves the operability of assembling process.

In the pointing device 400, 460 including the actuating part 416, 464 exclusively used for the pushing-down operation, it is required, in the pushing-down operation, not only to correctly shift the actuating part 416, 464 in the vertical direction but also to prevent the holding part 412 from being involuntarily shifted in the horizontal direction on the support member 420, in order to eliminate the unintentional input of any analogue data, such as cursor shifting data. To this end, the pointing device 400, 460 may be advantageously provided with a guide mechanism for guiding the actuating part 416, 464 in a vertical direction only at a limited position just above the switch mechanism 410.

Figure 63A:
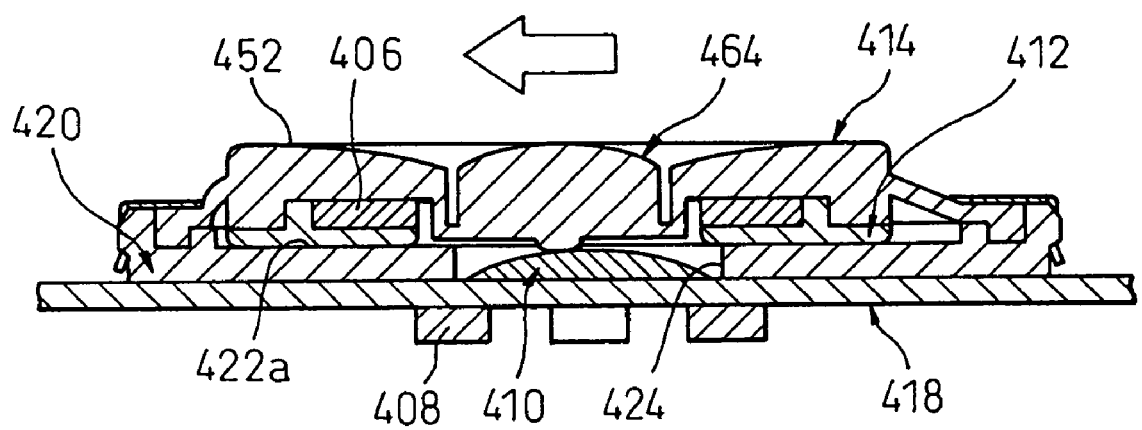
FIG. 63A is a vertical sectional view of a modification of the pointing device of FIG. 60, showing the operating section being shifted in a horizontal direction.
Figure 63B:
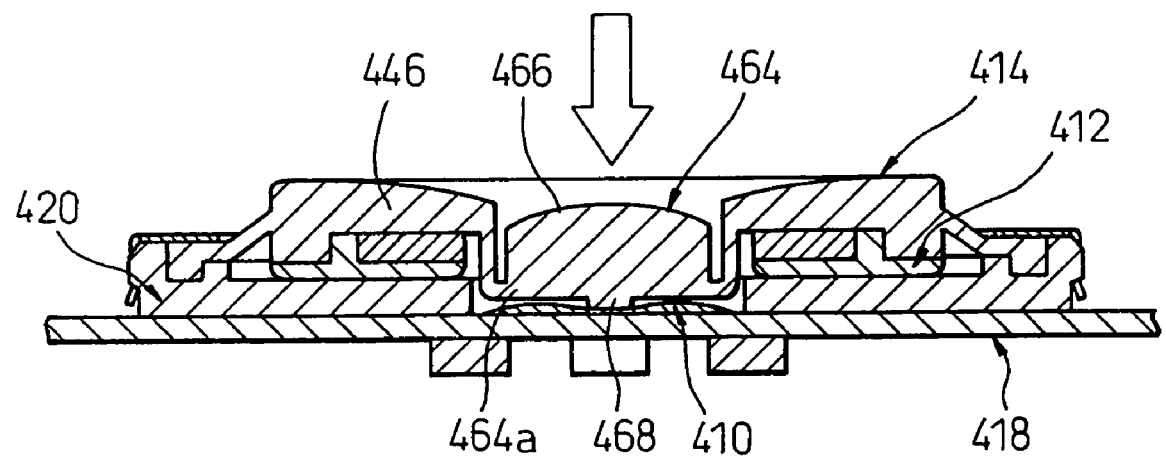
FIG. 63B is a vertical sectional view of the modification of FIG. 63A, showing the operating section being shifted in a vertical direction.

FIGS. 63A and 63B show a modification of the pointing device 460 including such a guide mechanism. In this modification, the opening 424 provided in the support member 420 is formed to have a diameter dimension slightly larger than the outer diameter of the flange portion 464a of the actuating part 464. Also, during a state where no pushing-down force is applied to the actuating part 464, the bottom face of the actuating part 464 is designed to be located at a certain distance from the surface 418a of the circuit board 418 further than the support surface 422a of the support member 420.

In this configuration, when an operator operates the operating section 462 to shift it in the horizontal direction while controlling a pressing force so as not to be applied to the actuating part 464, the holding part 412 is smoothly shifted slidably on the support surface 422a in the desired horizontal direction with no interference between the actuating part 464 and the support member 420 (FIG. 63A). Even when the operator applies a pressing force to the actuating part 464 during the horizontal motion of the holding part 412, the actuating part 464 collides with the support surface 422a of the support member 420, which effectively prevents the switch mechanism 410 from being actuated. On the other hand, when the actuating part 464 is operated to be pressed downward during a state where the holding part 412 is located at the home position in the horizontal shifting range, the actuating part 464 is accurately guided at the flange portion 464a by the peripheral edge of the opening 424 of the support member 420 in the vertical direction just above the switch mechanism 410. During this operation, even when a certain horizontal component of the pressing force is involuntarily applied to the operating section 462, the actuating part 464 collides with the support member 420 inside the opening 424, which effectively prevents the holding part 412 from being shifted in the horizontal direction. Accordingly, the above modification makes it possible to determine a manipulation position for a switching operation, such as a click operation, to only the home position of the holding part 412 in the horizontal shifting range, as well as to surely avoid the unintentional input of any analogue data, such as cursor shifting data, during the switching operation.

Figure 64:
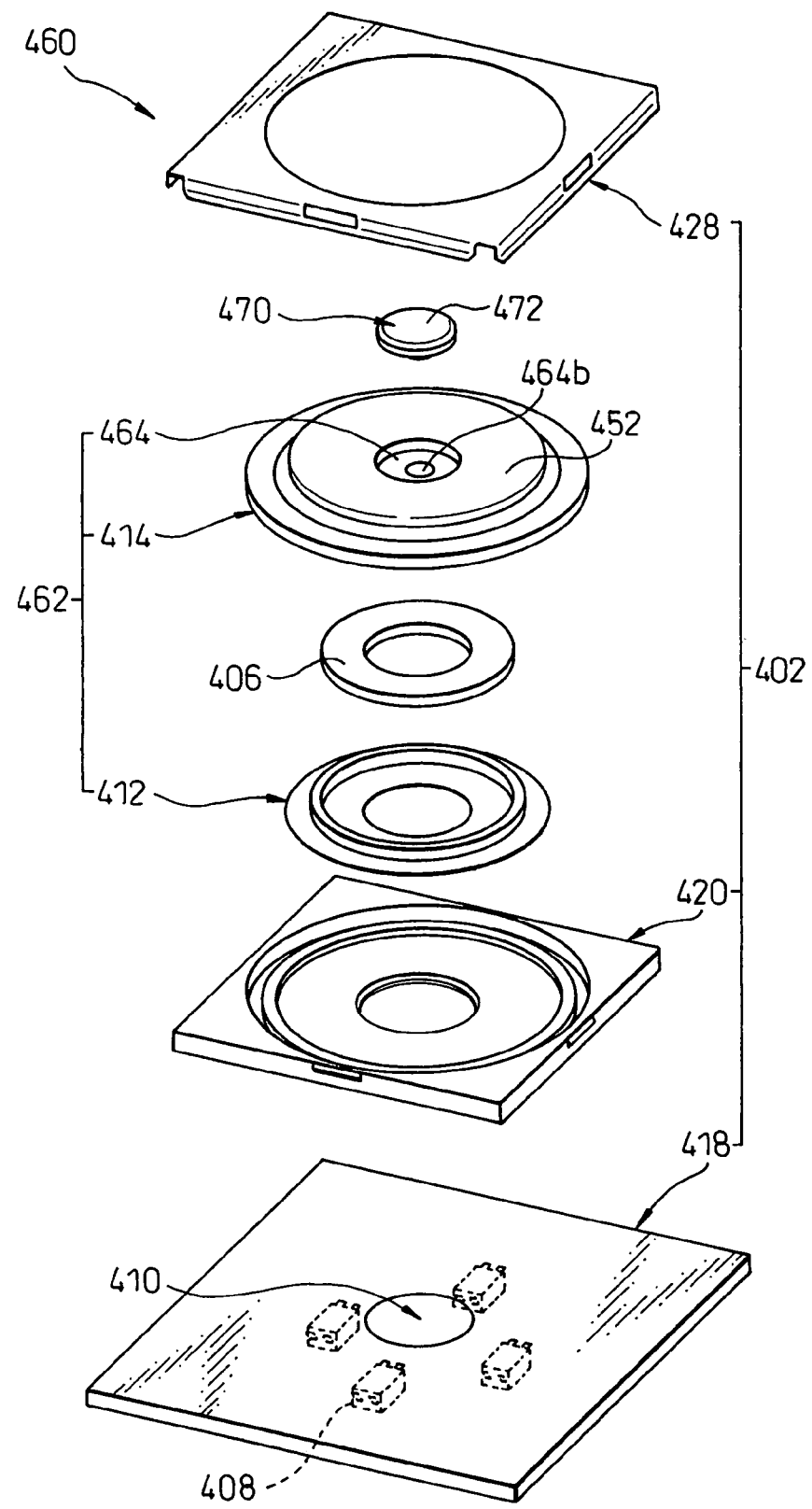
FIG. 64 is an exploded perspective view of another modification of the pointing device of FIG. 60.
Figure 65A:
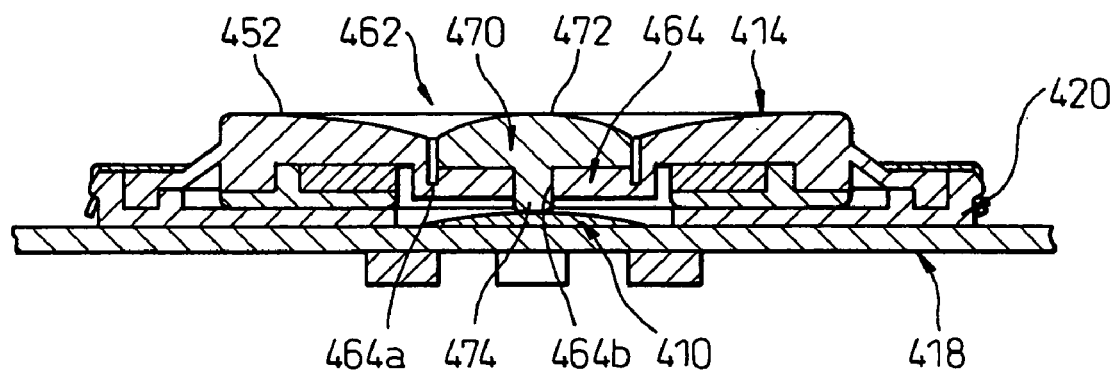
FIG. 65A is a vertical sectional view of the modification of FIG. 64.
Figure 65B:
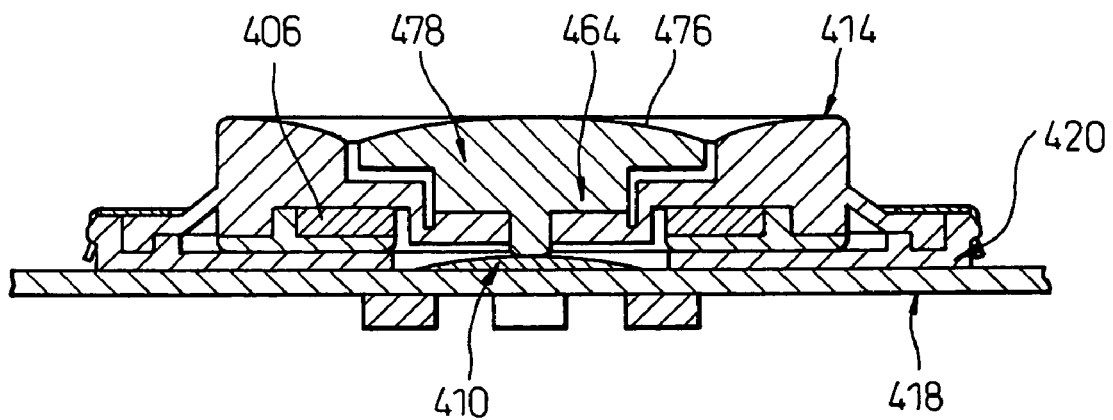
FIG. 65B is a vertical sectional view of a further modification.

In another modification of the pointing device 460 including the actuating part 464 formed integrally with the elastic part 414, as shown in FIG. 64, the actuating part 464 may be provided with a key top 470 separately from the elastic part 414. In this modification, the actuating part 464 may be structured so that only a portion adjacent to the flange portion 464a joined to the elastic part 414 is molded integrally with the elastic part 414 and the key top 470 is fixed to this integrally molded portion on the side thereof adjacent to the operating surface 452 of the elastic part 414 (FIG. 65A). The key top 470 is provided at an axial end face, located close to the operating surface 452, with a press-operating surface 472 for the pressing operation of the actuating part 464 in the vertical direction.

In the above structure, when the key top 470 is made of a material different from the elastic part 414, it is possible to improve a visibility and pressing operability of the actuating part 464 as well as an appearance or design of the operating section 462 in its entirety. Particularly, as illustrated, it is preferred that a pushing pin 474 is formed to protrude on the axial bottom end face of the key top 470 at the center thereof, and is inserted into a through hole 464b formed in the integrally molded portion of the actuating part 464 so that the distal end of the pin 474 projects from the actuating part 464 toward the switch mechanism 410. In this arrangement, it is possible to correctly actuate the switch mechanism 410 by using the pushing pin 474 of the key top 470 made of a material harder than the elastic part 414.

Moreover, in the case where the operating section 462 is allowed to increase in size to some extent, a key top 478 including a press-operating surface 476 having an outer diameter larger than the inner diameter of the magnet 406 may be provided for the actuating part 464. In this structure, it is possible to further improve the visibility and pressing operability of the actuating part 464.

Figure 66:
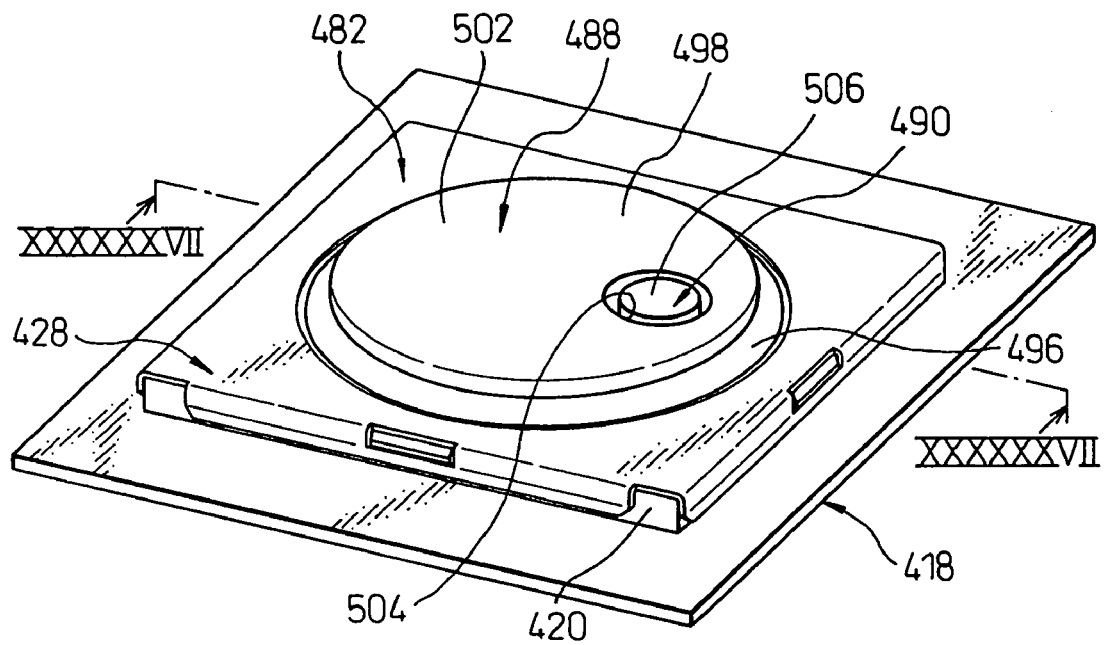
FIG. 66 is an assembled perspective view of a pointing device according to a thirteenth embodiment of the present invention.
Figure 67:
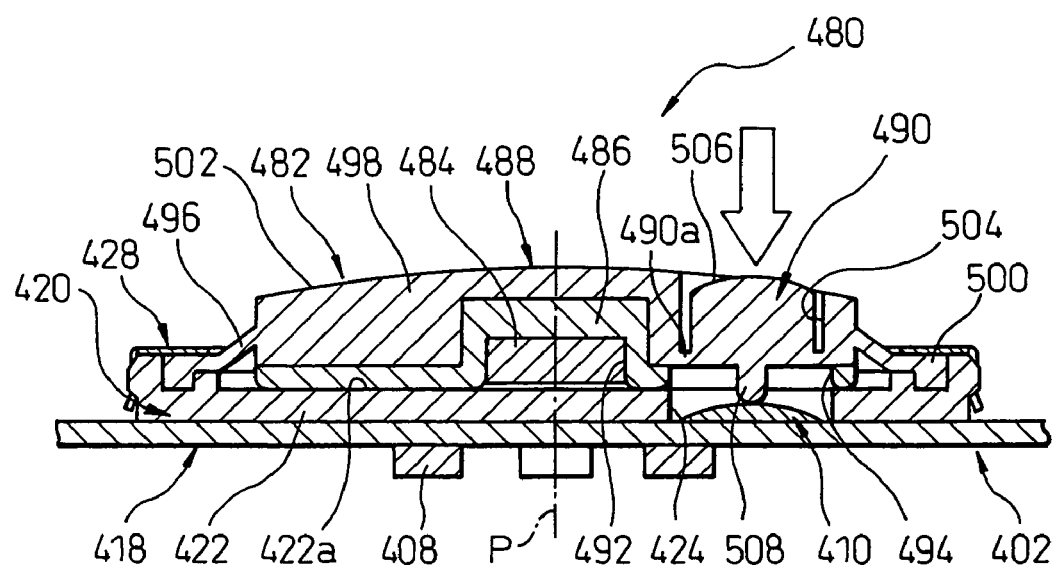
FIG. 67 is a vertical sectional view of the pointing device, taken along a line XXXXXXVII-XXXXXXVII in FIG. 66.

FIGS. 66 and 67 show a pointing device 480, according to the thirteenth embodiment of the present invention, having an actuating part exclusively used for a pushing-down operation. The pointing device 480 has substantially the same structure as the pointing device 400 of the eleventh embodiment, except for the constitution of an operating section, and thus corresponding components are denoted by the common reference numerals and an explanation thereof is not repeated.

The pointing device 480 includes a base section 402, an operating section 482 supported on the base section 402 shiftably in a desired horizontal direction in relation to the base section 462, a magnet 484 carried on the operating section 482, a plurality of magneto-electro transducers 408 carried on the base section 402 at locations close to the magnet 484, and a switch mechanism 410 arranged between the base section 402 and the operating section 482. The base section 402 includes a circuit board 418, on which electronic components including a CPU (not shown) are mounted, a support member 420 fixedly joined to the circuit board 418, and a cover member 428 fixedly joined to the support member 420 so as to substantially cover or hide an outer peripheral region 420a of the support member 420. The switch mechanism 410 is mounted on the circuit board 418 at a position deviated from the center axis P of the pointing device 480, and the support member 420 is provided at a position corresponding to the switch mechanism 410 with an opening 424.

The operating section 482 includes a first or holding part 486 securely holding the magnet 484 and supported on the base section 402 shiftably in a desired horizontal direction, a second or elastic part 488 elastically biasing the holding part 486 toward a home position in a horizontal shifting range, and a third or actuating part 490 disposed independently of the holding part 486 on the base section 402 shiftably in a vertical direction generally orthogonal to the horizontal direction. The holding part 486 is a plate-like member having a receptive groove 492 at a center thereof, and is provided near the receptive groove 492 with an opening 494 shaped and dimensioned correspondingly to the opening 424 in the support member 420. The opening 494 in the holding part 486 is located in alignment with the opening 424 in the support member 420 during a period when the holding part 486 is located at the home position in the horizontal shifting range on the base section 402. The holding part 486 securely accommodates the disk-shaped magnet 484 in the receptive groove 492 and is fitted to the elastic part 488. The holding part 486 is capable of shifting, in a parallel translation manner, on the support surface 422a of the support member 420 so as to be two-dimensionally slidable over 360 degrees about the center axis P, with an axial lower end face of the holding part 486 being uniformly abutted to the support surface 422a.

The elastic part 488 is provided integrally with a major portion 496 extending around the holding part 486 with a gap defined therebetween, a first connecting portion 498 connected to the holding part 486 at one end of the major portion 496 and a second connecting portion 500 connected to the base section 402 at another end of the major portion 496. The elastic part 488 is elastically deformed in the major portion 496 due to the horizontal shifting motion of the holding part 486 on the base section 402, and thereby exerts, in the major portion 496, an even elastic biasing force corresponding to the amount of deformation, irrespective of the horizontal shifting direction of the holding part 486. The elastic part 488 is provided in the first connecting portion 498 with an operating surface 502, on which an operator touches with, e.g., his finger for the shifting operation of the operating section 482. The first connecting portion 498 is also provided with a cylindrical receptive bore 504 at a location corresponding to the opening 494 in the holding part 486.

The actuating part 490 is integrally joined at a flange portion 490a extending radially outward at one axial or lower end of the actuating part 490 to the first connecting portion 498 of the elastic part 488, and is received into the receptive bore 504 provided in the first connecting portion 498. The actuating part 490 is also provided in another axial or upper end thereof with a press-operating surface 506, on which an operator touches with, e.g., his finger for the pushing-down operation of the actuating part 490. The actuating part 490 is further provided in the axial or lower end face thereof with a bump 508 as a pushing point, locally protruding at a center of the lower end face. When the operating section 482 is properly assembled with the base section 402, the actuating part 490 is supported on the switch mechanism 410 disposed within the opening 424 of the support member 420, shiftably in the vertical direction in the operating section 482, with the bump 508 being abutted to the switch mechanism 410.

In the pointing device 480 having the above structure, it is possible to enter analogue information corresponding to the shifting direction and shifting amount of the holding part 486 on the base section 402 by applying an operating force in substantially the horizontal direction to the operating section 482, in a way similar to the pointing device 460. Also, in the pointing device 480, it is possible for the operator to push the press-operating surface 506 of the actuating part 490 of the operating section 482 downward with, e.g., his finger in the home position as shown in FIG. 67, and to force the bump 508 of the actuating part 490 against the switch mechanism 410, so as to make or close the switch mechanism 410. In this press-down operation, the holding part 486 is surely prevented from being shifted in the vertical direction relative to the base section 402, so that it is possible to significantly easily perform a proper click operation for, e.g., a pointer on a display screen in electronic equipment into which the pointing device 480 is installed. Particularly, in the pointing device 480, the actuating part 490 is located at a position deviated from the center axis P, it is possible to advantageously use the magnet 484 having a simple circular shape. Moreover, the pointing device 480 makes it possible to mount a plurality of switch mechanisms 410 on the circuit board 418 and to provide a plurality of actuating parts 490 in the operating section 482 correspondingly to the switch mechanisms 410, which effectively imparts a multi-functionality to the pointing device 480.

Figure 68:
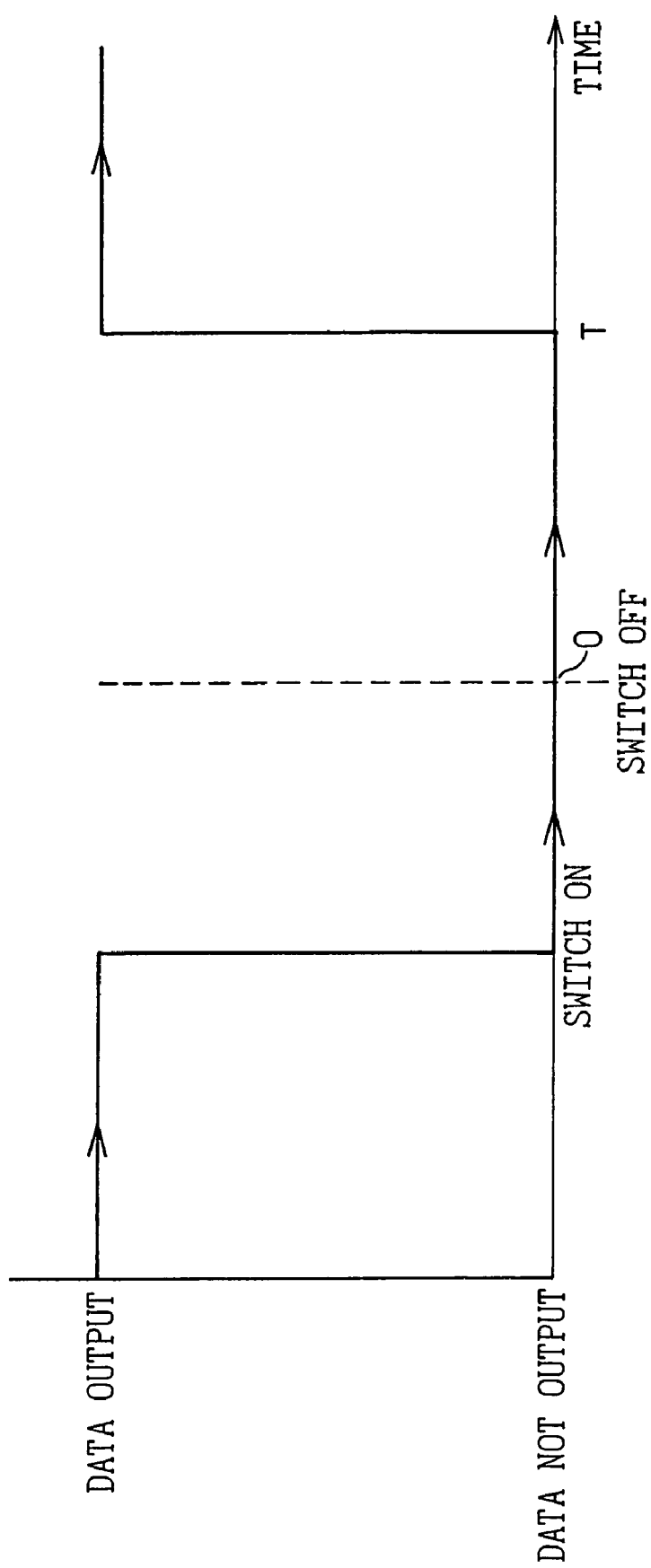
FIG. 68 is a diagram showing a signal processing procedure in a pointing device according to an embodiment of the present invention.

In the pointing device with a click function, according to the above-described various embodiments of the invention, it is possible to prevent the unintentional input of analogue data in the switching operation by using a structural solution such as the provision of the guide mechanism for enabling the accurate shifting operation of the operating section in the vertical direction. In place of, or in supplementary addition to the guide mechanism, it is also possible to prevent the unintentional input of analogue data in the switching operation by providing an electrical solution in an operation for processing a signal output from the pointing device. FIG. 68 shows a signal processing procedure in a pointing device, according to an embodiment of the present invention, embodying the above electrical solution.

For example, in the pointing device 400 as the eleventh embodiment shown in FIG. 56, when the actuating part 416 in the operating section 404 is pushed downward to actuate the switch mechanism 410, the CPU 419, as a processing part, mounted on the circuit board 418 processes an on-signal generated from the switch mechanism 410 as a click signal, and outputs it to a processing circuit in a data processor into which the pointing device 400 is installed. In this arrangement, as shown in FIG. 68, a signal-processing program stored for the CPU 419 is constructed so that the CPU 419 suspends processing an analogue signal (or a cursor shifting data signal) generated from a signal generating part structured by the magnet 406 and the magneto-electro transducers 408 and thus does not output analogue data, during a time when the switch mechanism 410 is actuated (or switched on). In this manner, it is possible to effectively prevent the unintentional input of analogue data in the switching operation.

In the pointing device 400, if the holding part 412 is involuntarily shifted in the horizontal direction just after the pressing operation of the actuating part 416 is released, the cursor shifting data signal is output. As an optional solution to this, as shown in FIG. 68, it is advantageous to construct a signal-processing program stored for the CPU 419 so that the CPU 419 suspends processing the analogue signal generated from the signal generating part by the horizontal shifting motion of the holding part 412 and thus does not output analogue data, during a predetermined time T after the switch mechanism 410 is shifted from an actuated condition to a non-actuated condition (or switched off). In this manner, it is possible to effectively prevent the unintentional input of analogue data just after the switching operation is released. The time T in the above solution may be variously determined in consideration of the operability of the pointing device. It is possible, for example, to determine the time T to a certain time generally required for holding a pointer at a constant position on a display screen during a double-click operation conventionally performed in a personal computer, and so on.

While several preferred embodiments, for mainly improving a low-profile structure and an operability, have been described with reference to the drawings, it should be noted that these embodiments may also have various forms other than the illustrated forms. For example, the characteristic structure of the pointing device having a low-profile structure according to the invention may be effectively applied in a pointing device in which a positional correlation between the magnet and the plural magneto-electro transducers is reverse to the illustrated configuration, that is, wherein the magneto-electro transducers provided in the operating section are shifted relative to the magnet provided in the base section. In this alternative arrangement, it can be expected to obtain the same particular effects as in the illustrated embodiments. Also, the manufacturing method of the assembled structure of a circuit board and a connector, according to the invention, may also be applied to the above-described various pointing devices having low-profile structures. Further, the signal processing procedure in a pointing device, according to the present invention, may also be applied to pointing devices having various signal generating parts other than the above-described signal generating part including the magneto-electro transducer.

While the invention has been particularly shown and described with reference to preferred embodiments thereof, it will be understood by those skilled in the art that various changes and modifications may be made without departing from the spirit and scope of the following claims.

What is claimed:

1. A portable information apparatus, comprising:
   a pointing device comprising:
      a base section;
      an operating section shiftably supported on said base section;
      a magnet carried on said operating section; and
      a magneto-electro transducer carried on said base section at a location close to said magnet; and
   a housing structure incorporating therein said pointing device;
   wherein said operating section of said pointing device includes a holding part securely holding said magnet and shiftably supported on said base section, and an elastic part connected to said holding part and exerting an elastic force for returning said holding part to a home position in a shifting range, while accompanying a shifting operation of said holding part on said base section, said holding part and said elastic part being formed separately from and assembled to each other, and
   wherein said elastic part is provided with a major portion surrounding substantially an entire circumference of said holding part, a first connecting portion connected to said holding part at one end of said major portion and extending to be laid over said holding part, and a second connecting portion at another end of said major portion, said first connecting portion and said second connecting portion being formed integrally with said major portion, said major portion exerting an even elastic biasing force irrespective of a shifting direction of said holding part on said base section;
   wherein said base section of said pointing device includes a part interposing between and separating said magnet and said magneto-electro transducer;
   wherein said housing structure includes an opening, through which said holding part of said operating section shiftably penetrates, a recessed portion formed at a location surrounding said opening and depressed toward said base section, and a portion adjacent to said recessed portion and securely holding said second connecting portion of said elastic part.

2. A portable information apparatus as set forth in claim 1, further comprising a key panel including a plurality of key tops, said key panel being formed integrally with said elastic part of said operating section of said pointing device.

* * * * *